(12) United States Patent
Becke et al.

(10) Patent No.: US 10,980,173 B2
(45) Date of Patent: Apr. 20, 2021

(54) RIDING MOWER WITH REMOVEABLE BATTERY MODULE

(71) Applicant: BLACK & DECKER INC., New Britain, CT (US)

(72) Inventors: Paul Becke, Stewartstown, PA (US); Matthew Stanton, Rockville, MD (US); Andrew Seman, Pylesville, MD (US); Matthew Velderman, Baltimore, MD (US); Daniel White, Middle River, MD (US)

(73) Assignee: BLACK & DECKER INC., New Britain, CT (US)

( * ) Notice: Subject to any disclaimer, the term of this patent is extended or adjusted under 35 U.S.C. 154(b) by 17 days.

(21) Appl. No.: 16/129,435

(22) Filed: Sep. 12, 2018

(65) Prior Publication Data
US 2019/0075724 A1 Mar. 14, 2019

Related U.S. Application Data

(60) Provisional application No. 62/558,111, filed on Sep. 13, 2017.

(51) Int. Cl.
A01D 34/78 (2006.01)
A01D 69/02 (2006.01)
H02J 7/02 (2016.01)
H01M 2/10 (2006.01)
H01M 10/48 (2006.01)
(Continued)

(52) U.S. Cl.
CPC ........... *A01D 34/78* (2013.01); *A01D 34/006* (2013.01); *A01D 69/02* (2013.01); *H01M 2/1077* (2013.01); *H01M 2/1083* (2013.01); *H01M 10/488* (2013.01); *H02J 7/027* (2013.01); *A01D 34/66* (2013.01); *A01D 34/74* (2013.01); *A01D 75/008* (2013.01); *A01D 2101/00* (2013.01);
(Continued)

(58) Field of Classification Search
CPC ...... A01D 34/78; A01D 34/006; A01D 34/66; A01D 34/74; A01D 34/10; A01D 34/37; A01D 34/47; A01D 34/58; A01D 34/64; A01D 69/02; A01D 69/025; A01D 75/008; A01D 2101/00; H01M 2/1077; H01M 2/1083; H01M 10/488
See application file for complete search history.

(56) References Cited

U.S. PATENT DOCUMENTS 4,042,054 A * 8/1977 Ward ................. B60K 1/04
                                                 180/60
5,549,984 A * 8/1996 Dougherty ........ H01M 10/4207
                                                 429/61
(Continued)

*Primary Examiner* — Adam J Behrens
(74) *Attorney, Agent, or Firm* — Pillsbury Winthrop Shaw Pittman LLP

(57) ABSTRACT

A lawn mower comprising a frame supported on rotatable wheels for movement over a ground surface; an operator support coupled to the frame and configured to support the entire weight of an operator of the lawn mower during use thereof; a blade assembly comprising one or more blades that are configured to cut grass on the ground surface; a steering system configured to manipulate the steering direction of the wheels; a motor assembly configured to: drive the wheels so as to move the frame along the ground surface; and a first rechargeable battery module removably coupled to the frame and configured to power the motor assembly.

19 Claims, 33 Drawing Sheets

(51) Int. Cl.
*A01D 34/00* (2006.01)
*H02J 7/00* (2006.01)
*A01D 34/66* (2006.01)
*A01D 75/00* (2006.01)
*A01D 34/74* (2006.01)
*A01D 101/00* (2006.01)

(52) U.S. Cl.
CPC ........ *H01M 2220/20* (2013.01); *H02J 7/0045* (2013.01); *H02J 7/025* (2013.01)

(56) References Cited

U.S. PATENT DOCUMENTS

| | | | |
|---|---|---|---|
| 6,591,593 B1 * | 7/2003 | Brandon | A01D 34/006 56/10.6 |
| 6,734,651 B2 * | 5/2004 | Cook | F02N 11/0866 320/103 |
| 7,567,057 B2 * | 7/2009 | Elder | B60L 58/20 320/104 |
| 9,313,948 B2 * | 4/2016 | Moriguchi | B60K 1/04 |
| 9,597,973 B2 * | 3/2017 | Penilla | G06F 3/04817 |
| 10,020,470 B2 * | 7/2018 | Ito | A01D 34/64 |
| 10,029,551 B2 * | 7/2018 | Ito | B60K 17/043 |
| 10,038,176 B2 * | 7/2018 | Ito | B60L 58/12 |
| 10,098,278 B2 * | 10/2018 | Velderman | A01D 34/64 |
| 2003/0029149 A1 * | 2/2003 | Fillman | A01D 34/58 56/10.6 |
| 2005/0035741 A1 * | 2/2005 | Elder | B60L 3/0046 320/116 |
| 2014/0062352 A1 * | 3/2014 | Wang | B60L 58/12 318/139 |
| 2014/0244090 A1 * | 8/2014 | Schygge | B60K 28/00 701/22 |
| 2015/0007541 A1 * | 1/2015 | Albinger | A01D 69/02 56/10.2 A |
| 2016/0303990 A1 * | 10/2016 | Penilla | G06F 3/1454 |
| 2017/0263914 A1 * | 9/2017 | Ito | B60K 1/02 |
| 2018/0026244 A1 * | 1/2018 | Ito | H01M 2/1083 429/96 |
| 2018/0338416 A1 * | 11/2018 | Uemura | A01D 34/008 |
| 2019/0014718 A1 * | 1/2019 | Uemura | B60K 1/04 |

* cited by examiner

RIDING MOWER WITH REMOVEABLE BATTERY MODULE

The present patent application claims priority to U.S. Provisional Application No. 62/558,111, filed Sep. 13, 2017. The contents of all of this provisional patent application are incorporated herein by reference in its entirety. Such incorporation by reference should be understood to include, but not be limited to, each of the claims as originally filed in the provisional patent application.

BACKGROUND

Field

The present patent application relates generally to lawn mowers. The following discussion relates to various attributes to which the present disclosure relates.

The quality of the cut of the lawn mower can be highly variable due to factors such as ground clearance, turf density (i.e., density of the grass blades), length of the grass, type of ground cover, moisture content of the ground cover, blade speed and amount of track overlap. These factors have the potential to cause an uneven cut of the grass.

Self-propelled and riding powered lawn mowers enable an operator to manually control the speed at which the lawn mower moves over the ground. A skilled operator with experience may be able to adjust the ground speed and slow the mower down to maintain cut quality and prevent grass collector clogs. The skilled operator may do this based on the cutting performance of the mower when moving over a patch of grass with varied grass length or density. The operator, however, is often unable to adjust the ground speed of the lawn mower while cutting in a way that maintains an even cut or prevents a grass collection system from becoming clogged.

In addition, mowing over variable terrain may lead to scalping (i.e., mowing the grass quite low, so low that the stems of the grass blades are exposed). When mowing on a mound, the blades of the lawn mower come closer to the top of the mound than the sides. This may cause bald spots and may hurt grass health.

The time it takes to mow a given area of grass is affected by several factors such as maximum achievable ground speed, cutting pattern, and overlap over previously cut areas. As the operator of the riding lawn mower has to split attention between driving the mower safely, avoiding obstacles, staying within boundaries and following along previously cut areas, it is often difficult to achieve an effective level of overlap of the mower deck between previous cut grass areas and uncut grass areas. Additionally, due to inefficiencies and latency of the feedback with a human operator, additional overlap or a reduced ground speed is often needed to ensure that all of the grass is cut. By minimizing the overlap of the mower deck between previous cut grass areas and uncut grass areas, cutting time can also be reduced.

Several safety features are typically incorporated into the lawn mowers such as mechanisms to automatically shut off the mower blades if an operator releases the grip on a mower handle. Riding mowers have features that automatically shut off mower blades if the mower is operated in reverse. These mechanisms are designed to reduce accidents due to operator in-attention or if the mower is operated in an adverse way. Even with these safety features, injuries continue to occur with lawn mowers.

Existing riding mower controls, although functional, are basic, un-customizable, and do not adapt to the task at hand. The placement of these controls is limited to the body of the lawn mower, as physical controls must maintain a physical connection to the lawn mower. Mower accessories are sold separately between the gas operated lawn mower and the electric lawn mower. If any controls exist to control those accessories on the mower, they are very broad generic controls, not necessary suited for the accessory being used. Currently attachments and accessories for the lawn and garden riding mowers use mechanical interfaces and power delivery systems. Some attachments may require the operator to route an electric control or a power cable onto the mower to operate an attachment, but there is not an integrated interface that will eliminate the need for using disparate electrical and mechanical control/power mechanisms. New technologies are propagating into the lawn and garden tractor market. These technologies are battery powered electric riding lawn tractors and digital communication buses to control the motors and features of these battery powered tractors.

Riding mower controls may vary from mower to mower and are generally located below the steering wheel or off to the side (out of the line of sight of the driver). Consumer riding mowers also do not generally have much in the way of gauges other than fuel gauges, and occasionally speed gauges. Accessories generally have very little in the way of onboard (on the mower) controls. Furthermore, because of their level of integration with the system, the same accessory must be sold as two separate products for gas lawn mowers and electric lawn mowers. Control and power for attachable accessories to the lawn tractor may come from various sources.

Operating a Zero Turning Radius (ZTR) mower with an attached accessory such as a trailer is difficult and may lead to jackknifing of the trailer. ZTR mowers are designed to allow the operator make very tight turns, hence the name "Zero Turning Radius." This provides for an advantage over more traditional riding mowers when operating the mower in small confines. An operator of a traditional riding mower may need to make more complicated three point turns or make multiple passes with small radius turns to cover the same area. ZTR mowers are at a disadvantage, however, when the ZTR mower is operated with attachments such as a trailer. If the ZTR mower is turned sharply, the trailer will jackknife with the tongue or body of the trailer colliding with the ZTR mower. The limited turning ratio of a traditional mower completely eliminates the possibility of the trailer colliding with the mower in the forward direction, and reduces the likelihood of collisions in a reverse direction.

Electrically powered riding mowers have limited driving range, requiring time and facilities to recharge on board batteries after the energy/power in the battery is depleted. An operator can be stranded out of driving range of an energy source to recharge a depleted battery.

Unlike fossil fuel/gas powered riding lawn mower, the battery operated electric lawn mower cannot be recharged quickly if it runs out of energy while located away from a fuel source. This is often referred to as driving range anxiety in the electrically operated vehicles. Current features to assuage the driving range anxiety in the battery operated electric lawn mowers include warnings such as audible, visual and disabling power consuming devices such as mower blades.

Batteries used to power electrically powered vehicles are difficult to remove and replace. Vehicle batteries require protection in the event of a collision. A result of the protection and battery cells is a battery pack, which weighs enough to cause people strain or injury when lifting. Electric lawn tractors have a limited driving range as battery technology has not advanced to the point where they can have a comparable range to a gasoline powered lawn tractor. To reach a driving range that is acceptable to users, heavy batteries are typically used. Many people do not have power in the location where they store (e.g., barn or sheds) their lawn tractors. This may present a problem to users who are interested in purchasing electric lawn tractors as the place where they store the electric lawn tractor is not the same as where they would charge it. While infrequent, the lawn tractors can collide with objects placing strain on components that could lead to the puncturing or damaging of the battery pack. If the battery pack is significantly damaged, it may run the risk of thermal runaway.

Yard work typically requires a variety of tools or equipment. Working in large yards leave people often without work spaces or proper equipment as equipment and work spaces need to be transported to the area where the work is being done. Carrying tools can be taxing especially across lawns.

The present patent application provides improvements over prior art lawn mowers.

SUMMARY

One aspect of the present patent application provides a lawn mower. The lawn mower includes a frame, an operator support, a blade assembly, a motor assembly, a steering assembly, a sensor and one or more processors. The frame is supported on rotatable wheels for movement over a ground surface. The operator support is coupled to the frame and is configured to support the entire weight of an operator of the lawn mower during use thereof. The blade assembly comprises one or more blades that are configured to cut grass on the ground surface. The motor assembly is configured to: drive the wheels so as to move the frame along the ground surface; and drive the one or more blades relative to the ground surface to cut grass. The steering assembly is configured to manipulate the steering direction of the wheels. The sensor is configured to measure an attribute of the grass being cut. The one or more processors are configured to receive input from the sensor and control the motor assembly to adjust the speed of the lawn mower along the ground surface based on the input from the sensor.

Another aspect of the present patent application provides a lawn mower. The lawn mower includes a frame, an operator support, a mower deck, one or more blades, a steering system, a motor assembly, a sensor, one or more processors, and an actuator system. The frame is supported on rotatable wheels for movement over a ground surface. The operator support is coupled to the frame and configured to support the entire weight of an operator of the lawn mower during use thereof. The mower deck has an upper wall and a plurality of side walls generally extending vertically downwardly from the upper wall. The plurality of the side walls and the upper wall form a cavity. The one or more blades are at least partially disposed in the cavity and configured to cut grass on the ground surface. The steering system is configured to manipulate the steering direction of the wheels. The motor assembly is configured to: drive the wheels so as to move the frame along the ground surface; and drive the one or more blades relative to the ground surface to cut grass. The sensor is configured to detect variations in the angle and the contour of the ground surface. The one or more processors are configured to receive input from the sensor. The actuator system is configured to receive signals from the one or more processors. The actuator system is operatively connected to the mower deck, the one or more blades, or both. The one or more processors are configured to control the actuator system to adjust the mower deck, the one or more blades or both to compensate for the variations in the ground surface.

Yet another aspect of the present patent application provides a lawn mower. The lawn mower includes a frame, an operator support, a blade assembly, a motor assembly, a steering system, a sensor, and one or more processors. The frame is supported on rotatable wheels for movement over a ground surface. The operator support is coupled to the frame and configured to support the entire weight of an operator of the lawn mower during use thereof. The blade assembly comprises one or more blades that are configured to cut grass on the ground surface. The motor assembly is configured to: drive the wheels so as to move the frame along the ground surface; and drive the one or more blades relative to the ground surface to cut grass. The steering system is configured to manipulate the steering direction of the wheels. The sensor is configured to detect an edge between an unmowed area of grass and a mowed area of grass. The one or more processors are configured to receive input from the sensor, determine a subsequent path for the lawn mower based on the input from the sensor and provide input to the steering system based on the determined subsequent path.

Another aspect of the present patent application provides a lawn mower. The lawn mower comprises a frame, an operator support, a blade assembly, a steering system, a motor assembly, a sensor, and one or more processors. The frame is supported on rotatable wheels for movement over a ground surface. The operator support is coupled to the frame and configured to support the entire weight of an operator of the lawn mower during use thereof. The blade assembly comprises one or more blades that are configured to cut grass on the ground surface. The steering system is configured to manipulate the steering direction of the wheels. The motor assembly is configured to: drive the wheels so as to move the frame along the ground surface; and drive the one or more blades relative to the ground surface to cut grass. The sensor is configured to detect the presence of a person or an animal in a predetermined area proximate the lawn mower. The one or more processors are configured to receive input from the sensor and stop driving the one or more blades, the wheels, or both based on the input from the sensor.

Another aspect of the present patent application provides a lawn mower. The lawn mower comprises a frame, an operator support, a blade assembly, a steering system, a motor assembly, a trailer, a sensor, and one or more processors. The frame is supported on rotatable wheels for movement over a ground surface. The operator support is coupled to the frame and configured to support the entire weight of an operator of the lawn mower during use thereof. The blade assembly comprises one or more blades that are configured to cut grass on the ground surface. The steering system is configured to manipulate the steering direction of the wheels. The motor assembly is configured to: drive the wheels so as to move the frame along the ground surface; and drive the one or more blades relative to the ground surface to cut grass. The trailer is configured to be removably coupled to a hitch of the frame. The sensor is configured to detect the presence of the trailer in an area proximate the lawn mower. The one or more processors are configured to: receive input from the sensor, and limit, based on the input from the sensor, movements of the lawn mower to avoid collision between the lawn mower and the trailer.

Another aspect of the present patent application provides a lawn mower. The lawn mower comprises a frame, an operator support, a blade assembly, a steering system, a motor assembly, and a first rechargeable battery module. The frame is supported on rotatable wheels for movement over a ground surface. The operator support is coupled to the frame and configured to support the entire weight of an operator of the lawn mower during use thereof. The blade assembly comprises one or more blades that are configured to cut grass on the ground surface. The steering system is configured to manipulate the steering direction of the wheels. The motor assembly is configured to: drive the wheels so as to move the frame along the ground surface. The first rechargeable battery module is removably coupled to the frame and configured to power the motor assembly.

Another aspect of the present patent application provides a lawn mower. The lawn mower includes a frame, an operator support, a blade assembly, a steering system, a motor assembly, a trailer and one or more processors. The frame is supported on rotatable wheels for movement over a ground surface. The operator support is coupled to the frame and configured to support the entire weight of an operator of the lawn mower during use thereof. The blade assembly comprises one or more blades that are configured to cut grass on the ground surface. The steering system is configured to manipulate the steering direction of the wheels. The motor assembly is configured to: drive the wheels so as to move the frame along the ground surface; and drive the one or more blades relative to the ground surface to cut grass. The trailer is configured to be removably coupled to a hitch of the frame. The one or more processors are communicatively connected to the motor assembly to control the blade assembly. The one or more processors are further communicatively connected to the trailer via one or more wired or wireless connections to control one or more accessories on the trailer.

Another aspect of the present patent application provides a lawn mower. The lawn mower includes a frame, an operator support, a blade assembly, a steering system, and a motor assembly. The frame is supported on rotatable wheels for movement over a ground surface. The operator support is coupled to the frame and configured to support the entire weight of an operator of the lawn mower during use thereof. The blade assembly comprises one or more blades that are configured to cut grass on the ground surface. The steering system is configured to manipulate the steering direction of the wheels. The motor assembly is configured to: drive the wheels so as to move the frame along the ground surface; and drive the one or more blades relative to the ground surface to cut grass. The frame comprises a container portion and a cover. The container portion is disposed forwardly of the steering system and the operator support. The container portion has side walls defining an upwardly facing opening into a storage space in which articles to be transported can be stored. The cover is constructed and arranged to be movable between an open condition permitting access to the storage space and a closed condition preventing access to the storage space.

Another aspect of the present patent application provides a method of charging a battery module of a lawn mower. The lawn mower comprises a frame supported on rotatable wheels for movement over a ground surface; an operator support coupled to the frame and configured to support the entire weight of an operator of the lawn mower during use thereof; a blade assembly comprising one or more blades that are configured to cut grass on the ground surface; a steering system configured to manipulate the steering direction of the wheels; a motor assembly configured to: drive the wheels so as to move the frame along the ground surface; and the battery module removably coupled to the frame and configured to power the motor assembly. The method comprises removing the battery module from the lawn mower; recharging the battery module by supplying a charge current from an external power source to the battery module; and reinserting the battery module into the lawn mower to facilitate mating between electrical contacts of the battery module and electrical contacts of the lawn mower so as to enable the battery module to power the motor assembly of the lawn mower.

Another aspect of the present patent application provides a method of operating a lawn mower. The lawn mower comprises a frame supported on rotatable wheels for movement over a ground surface; an operator support coupled to the frame and configured to support the entire weight of an operator of the lawn mower during use thereof; a blade assembly comprising one or more blades that are configured to cut grass on the ground surface; a steering system configured to manipulate the steering direction of the wheels; a motor assembly configured to drive the wheels so as to move the frame along the ground surface; and a first rechargeable battery module and a second rechargeable battery module both removably coupled to the frame and configured to power the motor assembly. The method comprising: providing power solely from the first rechargeable battery module to the motor assembly to drive the wheels of the lawn mower; and providing power solely from the second rechargeable battery module to the motor assembly when the charge of the first battery module is depleted so as to drive the wheels of the lawn mower.

These and other aspects of the present patent application, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the present patent application, the structural components illustrated herein are drawn to scale. It is to be expressly understood, however, that the drawings are for the purpose of illustration and description only and are not intended as a definition of the limits of the present patent application. It shall also be appreciated that the features of one embodiment disclosed herein can be used in other embodiments disclosed herein. As used in the specification and in the claims, the singular form of "a", "an", and "the" include plural referents unless the context clearly dictates otherwise. In addition, as used in the specification and the claims, the term "or" means "and/or" unless the context clearly dictates otherwise. It should also be appreciated that some of the components and features discussed herein may be discussed in connection with only one (singular) of such components, and that additional like components which may be disclosed herein may not be discussed in detail for the sake of reducing redundancy.

DETAILED DESCRIPTION OF THE DRAWINGS

Figure 1:
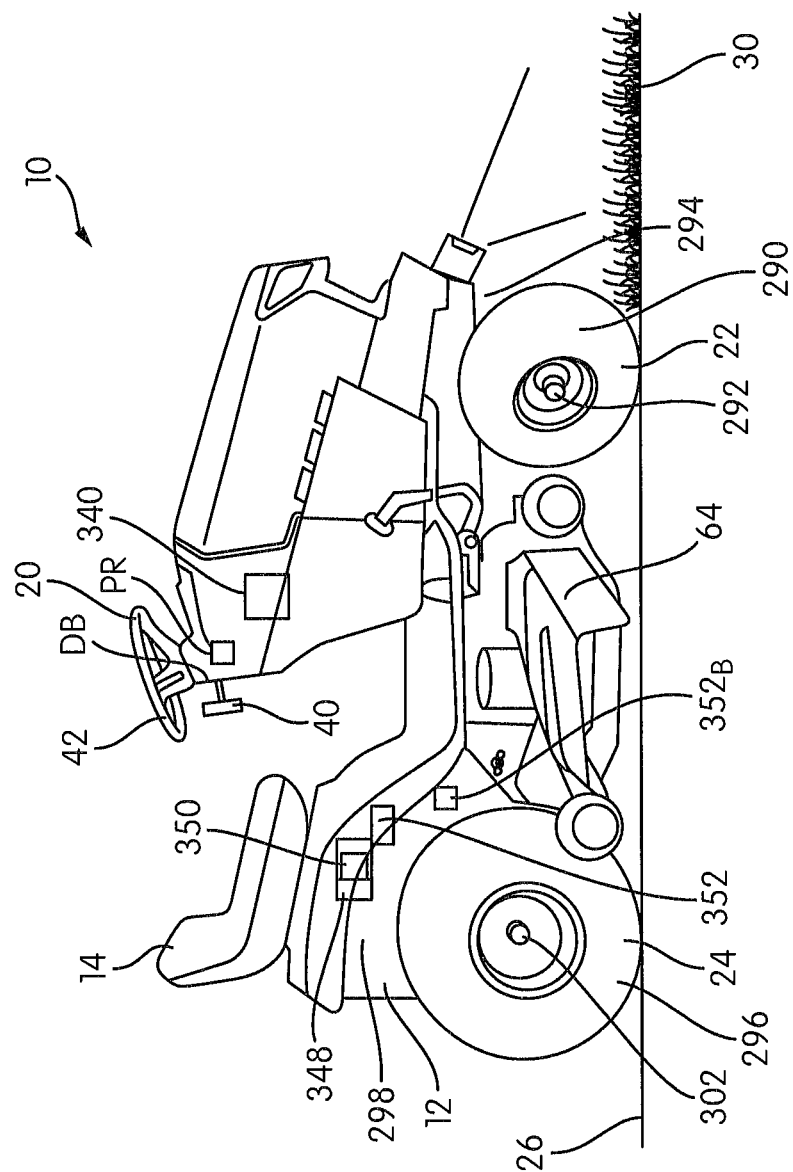
FIG. 1 shows a perspective view of a lawn mower in accordance with an embodiment of the present patent application.
Figure 2:
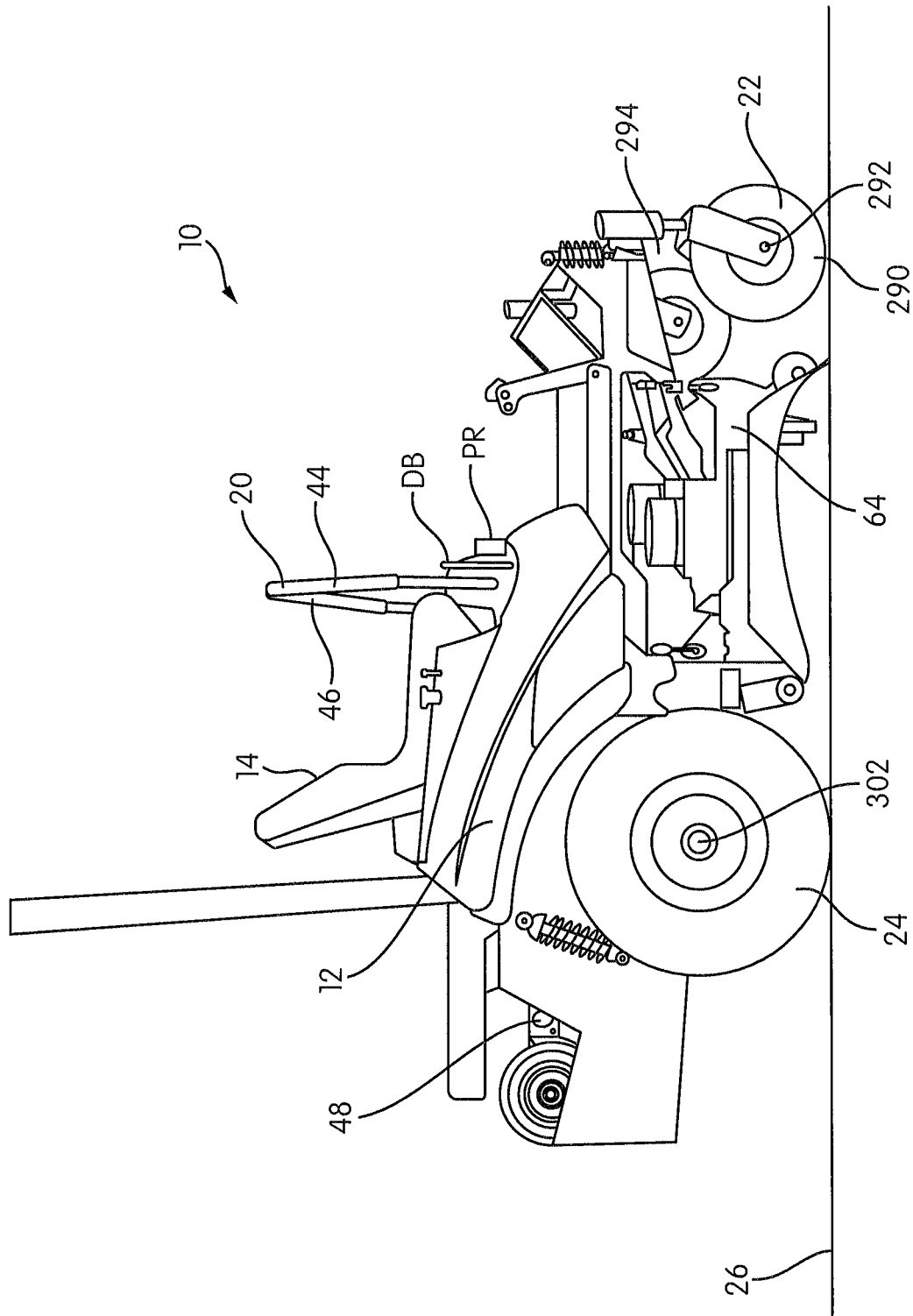
FIG. 2 shows a perspective view of a lawn mower in accordance with another embodiment of the present patent application.
Figure 3:
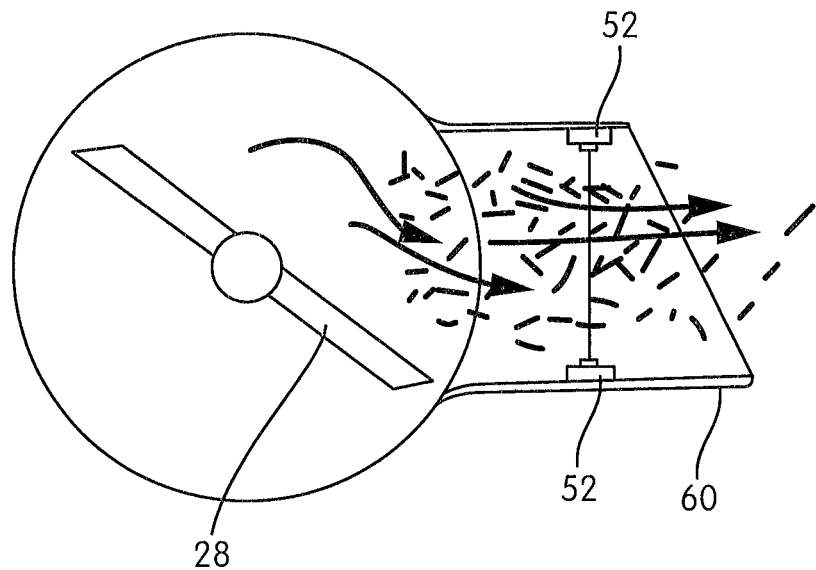
FIG. 3 shows an underside view of a mower deck of the lawn mower showing blade assembly and grass discharge chute in accordance with an embodiment of the present patent application.
Figure 4:
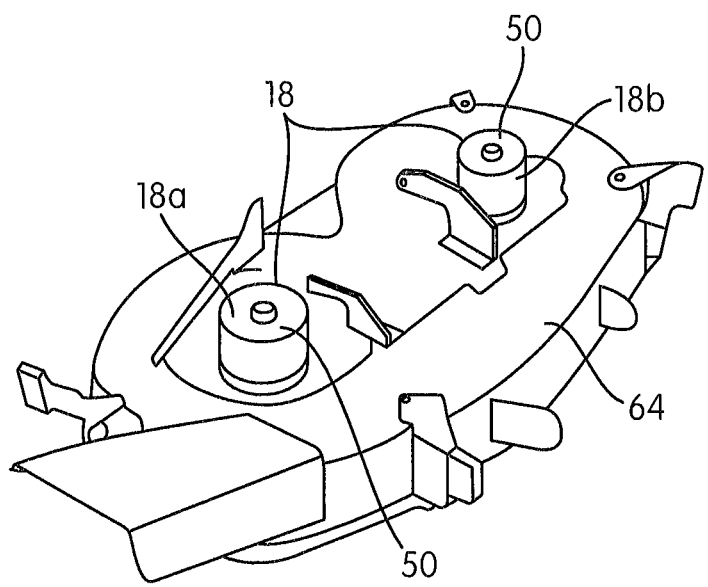
FIG. 4 shows a perspective view of the mower deck and blade motor current sensor in accordance with an embodiment of the present patent application.
Figure 8:
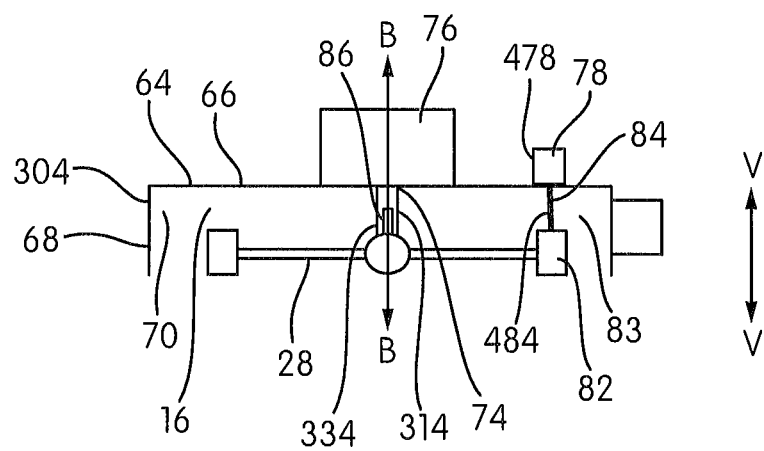
FIGS. 8 and 9 show side views of a blade assembly and a blade adjustment system associated therewith in accordance with an embodiment of the present patent application, wherein the blade assembly is in a normal configuration in FIG. 8 and the blade assembly is adjusted by the blade adjustment system and is in an adjusted configuration in FIG. 9.
Figure 9:
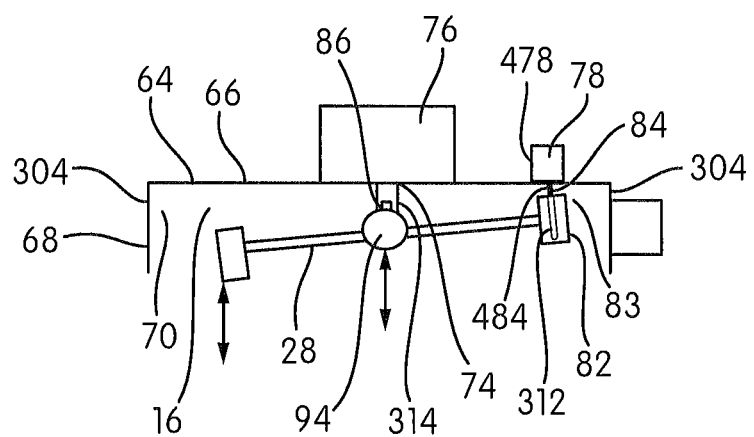
Figure 24:
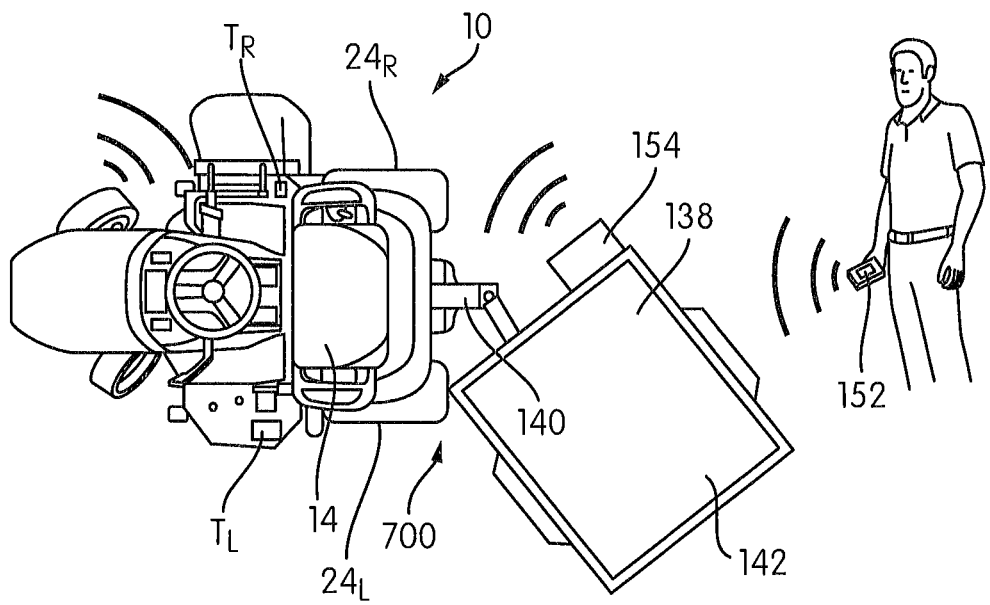
FIGS. 24 and 25 show perspective views of the lawn mower and the trailer removably coupled thereto in accordance with an embodiment of the present patent application, one or more processors of the lawn mower are communicatively connected to the trailer via one or more wired or wireless connections to control one or more accessories on the trailer.
Figure 26:
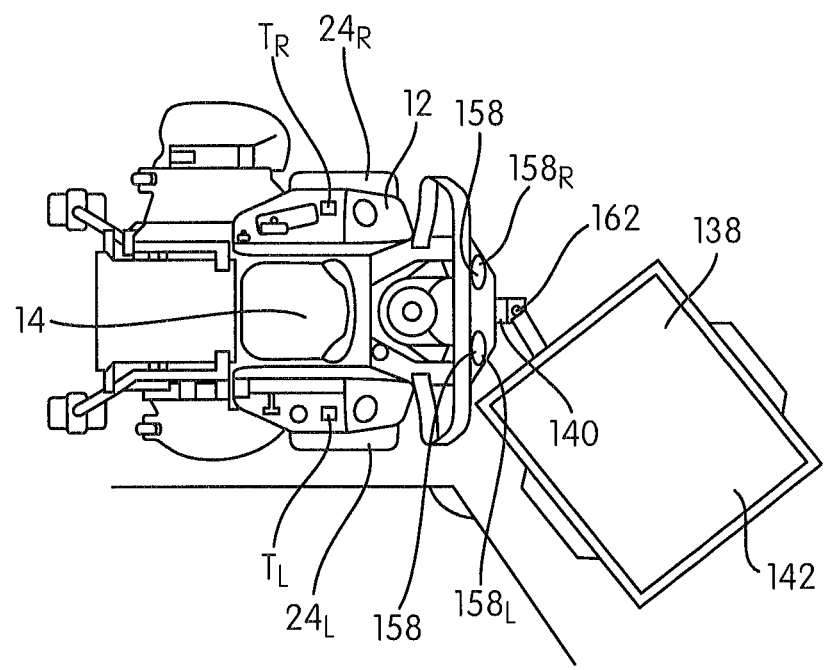
FIG. 26 shows a perspective view of the lawn mower and the trailer removably coupled thereto, the lawn mower having a stability control system in accordance with another embodiment of the present patent application.

FIGS. 1 and 2 show a lawn mower 10 in accordance with embodiments of the present patent application. The lawn mower 10 generally includes a frame 12, an operator support 14, a blade assembly 16 (as shown in FIGS. 8 and 9), a motor assembly 18 (as shown in FIG. 4), and a steering assembly 20. The frame 12 is supported on rotatable wheels 22, 24 for movement over a ground surface 26. The operator support 14 is coupled to the frame 12 and is configured to support the entire weight of an operator of the lawn mower 10 during use thereof. The blade assembly 16 comprises one or more blades 28 (as shown in FIGS. 3, 8 and 9) that are configured to cut grass 30 on the ground surface 26. The motor assembly 18 is configured to: drive the wheels $24_R$, $24_L$ (as shown in FIGS. 24 and 26) so as to move the frame 12 along the ground surface 26; and drive the one or more blades 28 relative to the ground surface 26 to cut grass 30. The steering assembly 20 is configured to manipulate the steering direction of the wheels 22, 24. In one embodiment, the lawn mower 10 includes one or more processors 32 and one or more sensors 34 that are operatively connected to each other. In one embodiment, the one or more processors 32 are mounted to the lawn mower 10 at a location PR, for example, behind dashboard DB of the lawn mower 10. In one embodiment, the one or more processors 32 are mounted at other locations of the lawn mower 10.

The term "lawn mower" as used herein is a generic term in referring to a type of lawn mower on which an operator/user is seated or standing (with their entire weight supported by the lawn mower), unlike the lawn mowers which are pushed or towed by the operator. In one embodiment, the lawn mower may also be referred to as riding (lawn) mower, ride-on (lawn) mower, riding powered (lawn) mower, self-propelled (lawn) mower, lawn tractor, or residential (lawn) tractor. In one embodiment, the riding mower may sometime resemble a small tractor. In one embodiment, the riding mower is sometimes larger than the powered/unpowered push mowers. In one embodiment, the riding mower is a commercial lawn mower such as a ZTR ("zero turn radius") lawn mower, which is a standard riding (lawn) mower with a turning radius that is effectively zero.

In one embodiment, the lawn mower is configured for residential use. In one embodiment, the lawn mower is configured for commercial use. In one embodiment, the lawn mower is configured to mow large areas of grass, for example, such as golf courses and public park areas. In one embodiment, the lawn mower is configured to mow large areas at high speed in the shortest time possible. In one embodiment, the lawn mower is configured to be suited for complex terrain requiring maneuverability. In one embodiment, the lawn mower conforms to a standard classification system established by the American Society of Agricultural Engineers (ASAE).

In one embodiment, the mowing width of the lawn mower is no wider than about 38 inches. In one embodiment, the mowing width of the lawn mower is in the range between 36 and 48 inches. In one embodiment, the mowing width of the lawn mower is up to 60 inches. In one embodiment, the mowing width of the lawn mower is about 54 inches. In one embodiment, the mowing width of the lawn mower is in the range between 48 and 72 inches.

In one embodiment, the mower deck 64 has a width dimension between 28 inches and 84 inches. In one embodiment, the mower deck has a width dimension of 28, 30, 32, 34, 36, 40, 42, 44, 46, 48, 50, 52, 54, 60, 61, 66, 72 or 74 inches.

In one embodiment, the lawn mower is configured only to mow grass. In one embodiment, the lawn mower is configured to accommodate other lawn/garden implements, such as, but not limited to, rototillers/rotavators, fertilizer spreader, mulch spreader, snow plows, lawn carts, snow blowers, tiller plows, dozer blades, yard vacuums, cultivators, plows, sweepers, rotary tillers, buckets, fork-lift tines and/or snow throwers. In one embodiment, the lawn mower may also include a motorized lift system for lifting an implement. In one embodiment, a manual lift is used for lifting the implements. In one embodiment, the lawn mower is configured to supply tractive, rotating or hydraulic power for the lawn/garden implements.

In one embodiment, the frame 12 of the lawn mower 10 is configured to support all the (major) components of the lawn mower 10 including, but not limited to, a power supply 348 (an internal combustion engine 350 or a battery source 48 for electric motor(s) arrangement), wheel assemblies 290, 296, the steering assembly 20, the motor assembly 18, the blade assembly 16, transmission(s) 352, operator support 14, one or more physical processors 32, user interface(s) 40, communication interface(s) 340 (e.g., see FIG. 23A), etc. In one embodiment, as described and shown with respect to FIGS. 29, 30 and 35, a battery compartment 38 is also disposed in the frame 12. In one embodiment, the frame 12 is configured to support the weight of one or more batteries 48 stored in the battery compartment 38. In one embodiment, the frame 12 of the lawn mower 10 is configured to support the entire weight of the operator seated in or is standing on the operator support 14.

Figure 36:
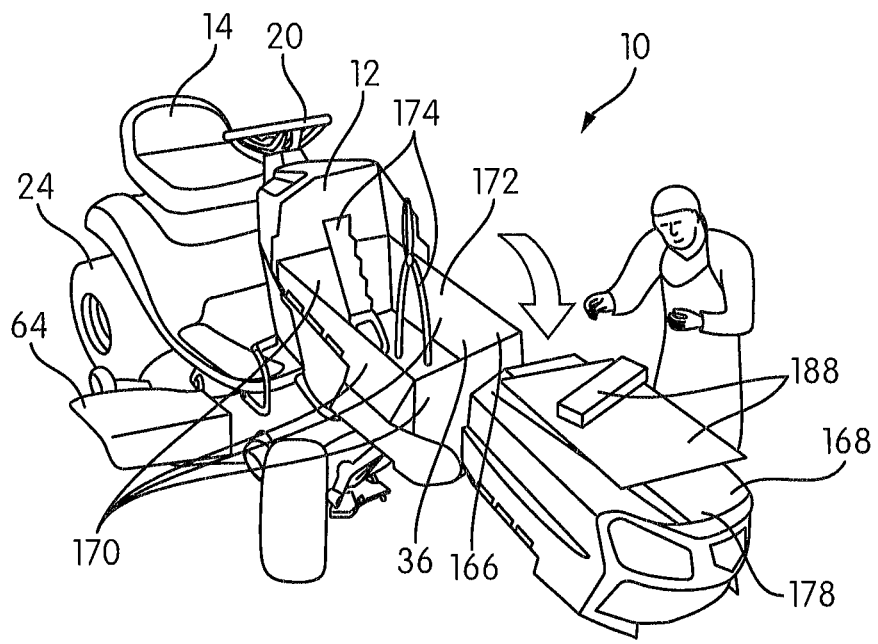
FIG. 36 shows a perspective view of the lawn mower and a storage compartment therein in accordance with an embodiment of the present patent application.

In one embodiment, as described and shown with respect to FIG. 36, a storage space 36 for articles (including tools and a workspace surface/table) is disposed in the frame 12. In one embodiment, the frame 12 is configured to support the weight of the articles stored in the storage space 36. In one embodiment, the frame 12 of the lawn mower 10 may also be referred to as chassis. In one embodiment, the lawn mower 10 includes a body that is part of the frame 12. In one embodiment, the frame 12 is made of a metal material or other materials that are strong/sturdy enough to support the weight of an operator and the weights of all the different components of the lawn mower 10 that are discussed above, with a reasonable margin of safety.

In one embodiment, the lawn mower 10 includes four wheels 22, 24 (only two right side wheels are shown in the FIGS. 1 and 2). In one embodiment, the lawn mower 10 includes a front wheel assembly 290 disposed on a front portion 294 of the lawn mower 10 and a rear wheel assembly 296 disposed on a rear portion 298 of the lawn mower 10. In one embodiment, each of the front and rear wheel assemblies 290, 296 includes a pair of wheels 22, 24 and axles 292, 302 connecting the respective pair of wheels 22, 24. In one embodiment, the front wheel assembly 290 is steerable by the steering assembly 20. That is, the front wheel assembly 290 is steered by the operator using the steering assembly 20 in a desired direction during a grass cutting or lawn mowing operation. The steering assembly 20 is connected to the front wheels 22 by a mechanical linkage. In one embodiment, the rear wheel assembly 296 is operatively connected with a drive or traction motor $T_R$, $T_L$ (as shown in FIGS. 24 and 26) to receive drive power therefrom. In one embodiment, the motor assembly 18 includes the right traction motor $T_R$ and the left traction motor $T_L$. In one embodiment, the lawn mower 10 is a four-wheel or an all-drive drive system. In one embodiment, the lawn mower 10 includes bar-tread tires/wheels. In one embodiment, the lawn mower 10 includes turf wheels/tires. In one embodiment, as shown in FIG. 2, the front wheels 22 of the lawn mower 10 are smaller than the rear wheels 24.

In one embodiment, the lawn mower 10 is powered by an internal combustion engine (ICE) 350. In one embodiment, the lawn mower 10 includes a single cylinder engine. In one embodiment, the lawn mower 10 includes a multi-cylinder engine. In one embodiment, the lawn mower 10 includes a diesel engine. In one embodiment, the lawn mower 10 includes an air-cooled system or a water-cooled system that is configured to remove heat from the engine 350. In one embodiment, the lawn mower 10 includes an engine with a vertical crankshaft. In one embodiment, the lawn mower 10 includes an engine with a horizontal crankshaft. In one embodiment, the internal combustion engine 350 typically drives rotating mower blades 28 through a transmission $352_B$ that is separate from the transmission 352 used to drive the traction wheels $24_R$, $24_L$ (as shown in FIGS. 24 and 26), which propel the lawn mower 10 over the ground 26.

In one embodiment, the lawn mower 10 includes one or more electric motors 18a, 18b (as shown in FIG. 4) and the one or more batteries 48 for providing power to the one or more electric motors 18a, 18b. In one embodiment, the lawn mower 10 includes multiple electric motors. In one embodiment, the number of electric motors in the lawn mower 10 may vary. In one embodiment, an electric motor is often used to a drive each blade 28 of the lawn mower 10. In one embodiment, the lawn mower 10 includes a separate motor or set of motors that are used to drive the traction wheels $24_R$, $24_L$. In one embodiment, the electric motor(s) of the lawn mower 10 typically drive rotating blades 28 through the transmission $352_B$ that is separate from the transmission 352 (coupled to the other electric motor) used to drive the traction wheels $24_R$, $24_L$, which propel the lawn mower 10 over the ground 26.

In one embodiment, the lawn mower 10 has an engine arrangement that is disposed in a rear section of the lawn mower 10. In one embodiment, the lawn mower 10 has a battery/motor arrangement that is disposed in a rear section of the lawn mower 10.

In one embodiment, the lawn mower 10 has an engine arrangement that is disposed in a front section of the lawn mower 10. In one embodiment, the lawn mower 10 has a battery/motor arrangement that is disposed in a front section of the lawn mower 10.

In one embodiment, the transmission(s) 352 of the lawn mower 10 is selected from the group consisting of a manual transmission, a gear transmission, a belt transmission, a continuously variable transmission (or hydrostatic transmission), or an electric transmission as would be appreciated by one skilled in the art. In one embodiment, the hydrostatic transmission is controlled by the operator using either a hand lever or one or two foot pedals. In one embodiment, a cruise control is provided with a hydrostatic transmission so that the operator can remove his or her foot from the pedal while mowing. In one embodiment, the transmission 352 is configured to drive the driving wheels $24_R$, $24_L$. In one embodiment, the rear wheels $24_R$, $24_L$ of the lawn mower 10 are the driving wheels.

In one embodiment, the lawn mower 10 includes the user interface 40 and one or more controls or control levers that are associated the lawn mower 10. In one embodiment, the user interface 40 and one or more controls or control levers are carried by the frame 10. In one embodiment, the user interface 40 and the one or more controls are positioned proximate the operator support 14 and are accessible to the operator when supported by the operator support 14. In one embodiment, the one or more controls are operable to control the speed of the lawn mower 10, the direction of the lawn mower 10, the blades 28 of the lawn mower 10, one or more accessories 142 on the trailer 138 removably coupled to the lawn mower 10, etc.

In one embodiment, the one or more controls include a steering wheel 42 of the steering assembly 20. In one embodiment, the steering assembly 20 generally includes a steering column that operatively connected at its lower end to the front wheel assembly 290. In one embodiment, the steering wheel 42 is positioned at the upper end of the steering column. In one embodiment, the steering wheel 42 is positioned proximate the operator support 14 so that the steering wheel 42 is within reach of the operator seated on the operator support 14. In one embodiment, the steering assembly 20 also includes steering mechanism (not shown). In one embodiment, the steering mechanism generally includes rack and pinion, tie rods or kingpins that connect the steering column to the front wheel assembly 290. In one embodiment, the steering wheel 42 is configured to change the angular position of the wheels 22. In another embodiment, the steering mechanism may have a recirculating ball mechanism or a worm and sector mechanism as would be appreciated by one skilled in the art. In one embodiment, the steering assembly 20 includes an electrical power steering (EPS), an active front steering (AFS), or other steering systems as would be appreciated by one skilled in the art.

In one embodiment, the one or more controls include a joystick that facilitates the steering of the lawn mower 10 in a desired direction.

In one embodiment, the one or more controls include two levers 44, 46 (as shown in FIG. 2) that are positioned on either side of the operator and are accessible to the operator when supported by the operator support 14. In one embodiment, the steering includes changing the speeds of the wheels. In one embodiment, the wheel speed is controlled by the levers 44, 46. In one embodiment, the lawn mower 10 also includes throttles that control the rotational speed and direction of each drive wheel and the throttles are moved by the seated operator who operates one or more controls or control levers.

In one embodiment, the operator support 14 of the lawn mower 10 is configured to be fixedly mounted to and supported by the frame 12. In one embodiment, the operator support 14 is a seat assembly as shown in the illustrated embodiments. In one embodiment, the seat assembly 14 is adjustably mounted on the frame 12 so as to be selectively movable, in a forward and a reverse direction, to a desired position (e.g., to suit the operator). In one embodiment, the seat assembly 14 is adjustable in at least in a direction parallel to a longitudinal axis of the lawn mower 10 so as to comfortably position the operator relative to the control levers and the user interface.

In one embodiment, the operator support 14 of the lawn mower 10 is a platform that is configured to be fixedly mounted to and carried by the frame 12. In one embodiment, the operator support 14 of the lawn mower 10 is configured to support a standing operator. In one embodiment, the platform is disposed in a rear portion of the lawn mower 10 and between the rear drive wheels.

In one embodiment, the blade assembly 16 is positioned between the front wheel assembly 290 and the rear wheel assembly 296. In one embodiment, the blade assembly 16 is positioned in front of the rear wheel assembly 296. In one embodiment, the blade assembly 16 of the lawn mower 10 generally includes a housing 304 (as shown in FIGS. 8 and 9) that encloses the blade(s) 28. In one embodiment, the housing 304 of the cutting assembly 16 is configured to enclose the blade(s) 28 both from above and the sides. In one embodiment, the housing 304 of the blade assembly is configured to prevent the operator of the lawn mower from accidentally coming into contact with the blades 28. In one embodiment, the housing 304 of the blade assembly 16 is also configured to prevent any grass/foreign bodies from the blade assembly 16, when the blade(s) 28 are in rotation, from being thrown out of the lawn mower 10 in unwanted directions. In one embodiment, the housing 304 of the blade assembly 16 may act as a guard for the blade(s) 28. In one embodiment, the mower deck 64 serves as the housing 304 of the blade assembly 16. In one embodiment, the mower deck 64 is different from the housing 304 of the blade assembly 16.

In one embodiment, the one or more blades 28 are referred to as mower blades. In one embodiment, the one or more blades 28 is made of a metal material or other materials that are able to withstand high-speed contact with different objects in addition to grass. In one embodiment, the size, the number, the thickness and the design of the one or more blades 28 may vary. In one embodiment, the one or more blades 28 are selected from the group consisting of cylinder/reel blades, deck blades, mulching blades, and lifting blades. In one embodiment, the one or more blades 28 are made of a rigid material such as steel material. In one embodiment, the one or more blades 28 are made of a flexible member such as nylon or wire rope.

In one embodiment, the lawn mower 10 includes a cut grass collection compartment that is configured to collect the cut grass. In one embodiment, the lawn mower 10 includes an outlet that is configured to allow the cut grass to pass from the blade assembly 16 to a rear of the lawn mower 10 for collection in the cut grass collection compartment. In one embodiment, the outlet is at least disposed in the housing 304 of the blade assembly 16. In one embodiment, the outlet is at least partially disposed on a mower deck 64. In one embodiment, the lawn mower 10 includes two outlets to enable the cut grass to pass from the blade assembly 16 to the cut grass collection compartment. In one embodiment, the cut grass collection compartment is carried by the frame 12 and is disposed on the rear portion of the lawn mower 10.

In one embodiment, the motor assembly 18 includes one or more motors that are configured to directly or indirectly (via a transmission) drive one or more blades 28. In one embodiment, the blade(s) 28 are configured to be driven by the one or more motors and are configured to turn about an axis generally perpendicular to the surface/ground 26. In one embodiment, one or more motors of the lawn mower 10 are also configured to power a drive transmission for propelling the lawn mower.

In one embodiment, the one or more motors include a plurality of independent motors. In one embodiment, the motors for driving the one or more blades 28 are independent of the motors for the wheels $24_R$, $24_L$.

Figure 7:
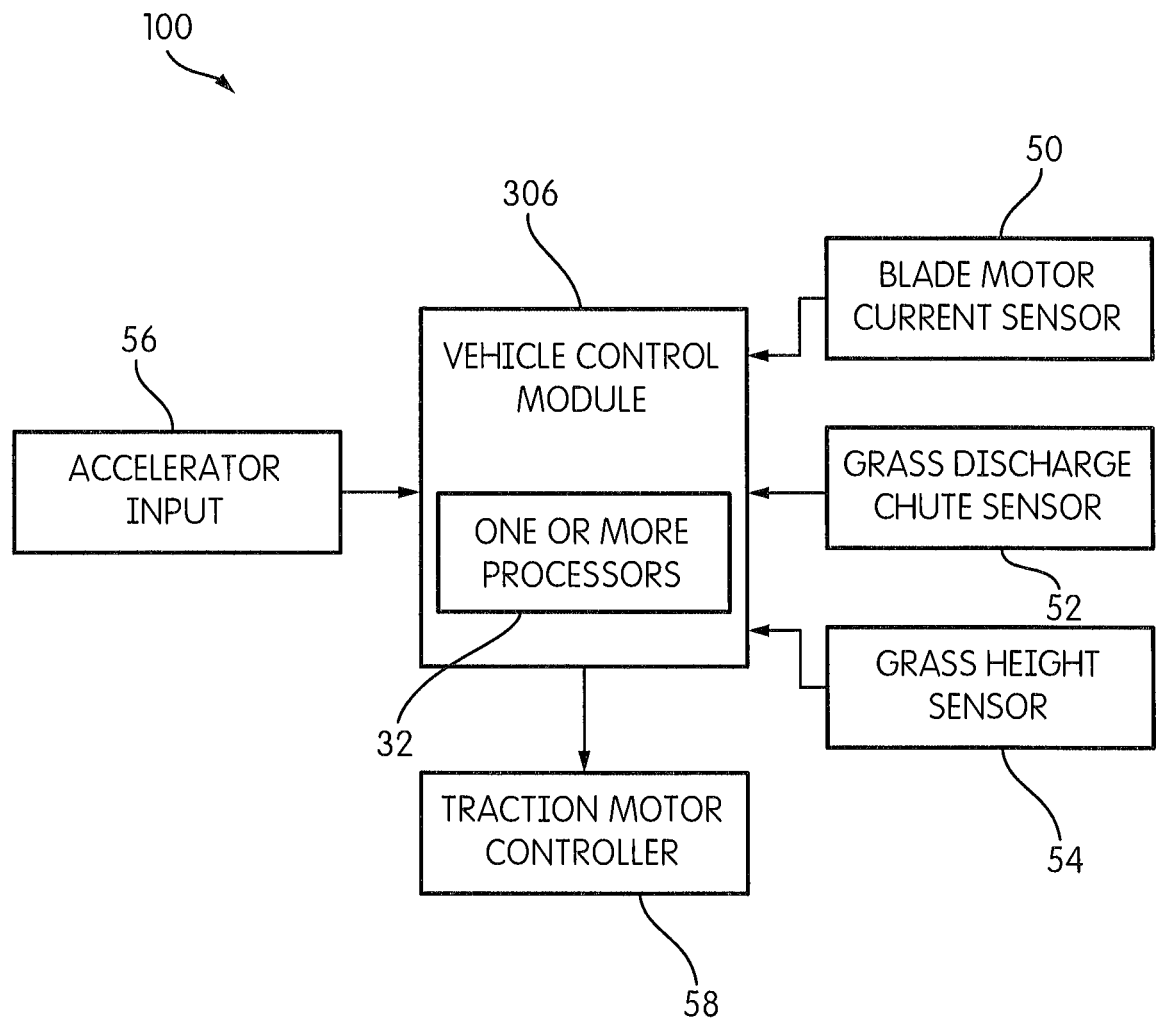
FIG. 7 shows an exemplary block diagram of a system for controlling ground speed of the lawn mower in accordance with an embodiment of the present patent application.

In one embodiment, the present patent application provides a system 100 (as shown in FIG. 7) of the lawn mower 10 that automatically adjusts the ground speed of the lawn mower 10. In one embodiment, the system 100 is configured to aid both a skilled and un-skilled operator. In one embodiment, the system 100 is configured to reduce the ground speed of the lawn mower 10 as conditions of the turf call for prolong dwell time over a region of ground. In one embodiment, once the lawn mower 10 has passed over the adverse conditions, the ground speed of the lawn mower 10 is automatically increased. In one embodiment, the system 100 is configured to maintain the quality of cut, reduce cut grass collection blockage events and optimize the time it takes to provide for the quality cut. In one embodiment, the system 100 includes multiple methods for detecting when adverse conditions exist. The present patent application provides a mechanism for the operator to variably control the ground speed of the (either an ICE 350' or an electric motor powered) lawn mower 10. For example, in one embodiment, in an ICE powered lawn mower, the ground speed of the lawn mower 10 is controlled by throttling the ICE 350 itself or by controlling the drive ratio of its transmission 352. In one embodiment, in an electrical motor powered lawn mower, the ground speed of the lawn mower 10 is controlled by controlling the average current going to the drive motor or motors $T_L$, $T_R$.

FIG. 7 shows an exemplary block diagram for the system 100 for controlling ground speed of the lawn mower 100. In one embodiment, the automated ground speed control system 100 includes an electronic circuit (with the one or more physical processors 32) that is operatively connected to one or more sensors 34. In one embodiment, the one or more sensors 34 are configured to measure (either directly or indirectly) one or more attributes of the turf/grass being cut. In one embodiment, the one or more processors 32 are configured to process the measured/detected/sensed attributes and derive/determine an output signal that is used to actuate a speed control on an ICE powered motor or control the current of the traction motor (or motors) $T_L$, $T_R$ on an electrically power mower.

In one embodiment, the lawn mower 10 includes a sensor 50, 52, 54 that is configured to measure an attribute of the grass being cut. In one embodiment, the lawn mower 10 includes a blade speed sensor that is configured to measure an attribute of the grass being cut. Although the sensor is described in this embodiment with references to sensors 50, 52, 54, it is contemplated that the sensor may also include a blade speed sensor (in addition to or alternative to the sensors 50, 52, 54). In one embodiment, the attribute of the grass being cut includes the density of the flow of cut grass. In one embodiment, the density of the cut grass is measured, using a grass chute discharge sensor 52, as the cut grass is discharged from the mower deck 64 or through a cut grass collection system (to the cut grass collection compartment). In one embodiment, the density of the cut grass is a function of the blade motor current. That is, higher blade motor currents are generally associated with more density of the cut grass and more difficult cutting conditions. In one embodiment, the density of the cut grass is measured using a blade motor current sensor 50. In one embodiment, the density of the cut grass is measured using a blade speed sensor. In one embodiment, the attribute of the grass being cut includes the length of the grass being cut. In one embodiment, the length of the grass being cut is measured using a grass height sensor 54.

In one embodiment, the blade speed is derived from the drive motor speed. In one embodiment, the motor speed sensors include electrical, optical, magnetic or mechanical switch sensors that are configured to detect a cyclostationary signal with a frequency that is directly proportional to the speed (RPM) of the motor. In one embodiment, for example, an optical sensor having an emitter and a detector is used as the motor speed sensor. In one embodiment, the optical sensor is configured to detect the interruption of light as one or more slots on a disk attached to the shaft pass between the emitter/detector pair of the optical sensor. In one embodiment, a magnetic field detector is used as the motor speed sensor. In one embodiment, the magnetic field detector is configured to detect the variations in a magnet field as it rotates synchronously with the motor shaft. In one embodiment, the variations in the electric potential used to drive the motor windings are also synchronous to the rotating shaft and are used to determine the motor speed. In one embodiment, the motor is directly coupled to the blades 28 or is coupled through the transmission $352_B$ with a known ratio. This allows the blade speed to be calculated.

In one embodiment, the capacitive grass height sensor is generally a capacitor that is affected by objects that are near it. In one embodiment, an electric field is formed between the plates of a capacitor. In one embodiment, nearby object such as blades of grass affect the electric field formed between the capacitor plates. In one embodiment, the electric field changes as the object is moved a relative distance from the capacitive plates. In one embodiment, the change in the electric field is detectable by measuring the change in capacitance. In one embodiment, the change in capacitance is measured by controlling a fixed electric current between the capacitor plates and measuring the time required to charge or discharge the capacitor plates to a given voltage potential. In one embodiment, the voltage is proportional to the product of the electrical current, capacitance and time. In one embodiment, as the capacitance increases, the time required to reach a voltage increases. In one embodiment, the time is then related to the distance to the grass because the time is affected by the capacitance, which is affected by the distance of the capacitive plates to the grass.

In one embodiment, the grass height is also estimated by using two cameras separated by a fixed distance (e.g., stereo imaging). In one embodiment, the stereo imaging camera is configured to provide a depth mapping matrix which is used to estimate the height of grass in sub region of the field of view of the camera.

In one embodiment, the one or more processors 32 are configured to receive input from the sensor 50, 52, 54 and control the motor assembly 18 to adjust the speed of the lawn mower 10 along the ground surface 26 based on the input from the sensor 50, 52, 54. In one embodiment, the one or more processors 32 are configured to receive input from the blade speed sensor and control the motor assembly 18 to adjust the speed of the lawn mower 10 along the ground surface 26 based on the input from the blade speed sensor. In one embodiment, the vehicle control module 306 (with the one or more processors 32) is configured to receive inputs from one or more sensors 50, 52, 54. In one embodiment, the one or more sensors 34 include the blade motor current sensor 50, the grass chute discharge sensor 52, and the grass height sensor 54.

In one embodiment, the sensors 50, 52, 54 and the blade speed sensor are calibrated when the lawn mower 10 is manufactured to provide signals that are correlated with empirically established rules. In one embodiment, for each sensor, there are two or more operating points, for which the sensor outputs are measured. The operating points are chosen to provide discernable signals. The following operating points are suggested, however, other operating points may be used. In one embodiment, the operating points for the sensor include 1) mowing grass that is below the blade height; 2) mowing dry grass that is one inch above the blade height; 3) mowing wet grass that is once inch above the blade height; and 4) mowing dry grass that is two inches above the blade height.

In one embodiment, for mowers that use the electric motors to drive the blades 28, increased load on the blades 28 is measured by measuring the electrical current used to power the blade motors. In one embodiment, the blade motor current sensor 50 is used to measure the electrical current used to power the blade motors (or the amount of current used to drive the mower's blades). In one embodiment, larger cutting loads generally require higher current to maintain the same blade speed.

In one embodiment, the blade motor current sensor 50 is configured to provide current required to sustain cutting at each operating point. In one embodiment, higher currents are generally associated with more difficult cutting conditions. In one embodiment, the blade motor current sensor 50 is shown in FIGS. 4 and 7.

In one embodiment, the grass chute discharge sensor 52 is configured to measure the density of the flow of grass as the cut grass is discharged from the mower deck 64 or through a cut grass collection system (to the cut grass collection compartment). In one embodiment, the grass chute flow sensor 52 is configured to measure the velocity and density of the cut grass being discharged from the mower deck. In one embodiment, an increase in the density of flow of the cut grass corresponds to an increase load on the blades 28. In one embodiment, the detection of the increased load is an indication to the system 100 to reduce the ground speed so that the blades 28 and the grass collection system have time to process the cut material without creating clogs in the grass collection system, and without creating an uneven cut due to stalled blades or reduced cutting blade edge velocity.

FIG. 3 shows an underside view of the mower deck 64 of the lawn mower 10 showing the blade assembly 16 and grass discharge chute 60. In one embodiment, referring to FIG. 3, the grass chute discharge sensor 52 includes an optical emitter and detector arrangement 52 that is configured to be positioned in the grass discharge chute 60 of the lawn mower 10 and is configured to measure the density of the flow of grass as the cut grass is discharged therein.

In one embodiment, the grass chute discharge sensor 52 includes an optical sensor arrangement that is positioned across the grass discharge port. In one embodiment, the optical sensor arrangement includes an emitter and a detector. In one embodiment, the light transmitted from the emitter mounted across from the detector is measured at each operating point. The emitter-detector pair of the optical sensor arrangement is chosen to be insensitive to ambient light. In one embodiment, this is accomplished by using optical filters, optical wave length selection, or by modulating the light. Lower transmittance of light is generally associated with more difficult cutting conditions.

In one embodiment, the grass chute discharge sensor 52 includes an ultrasonic sensor arrangement. In one embodiment, ultrasonic transducers are used to transmit a high pitched chirp and then look at the returned echo of the chirp. In one embodiment, returns with larger signal strength are generally associated with more difficult cutting conditions.

Figure 5:
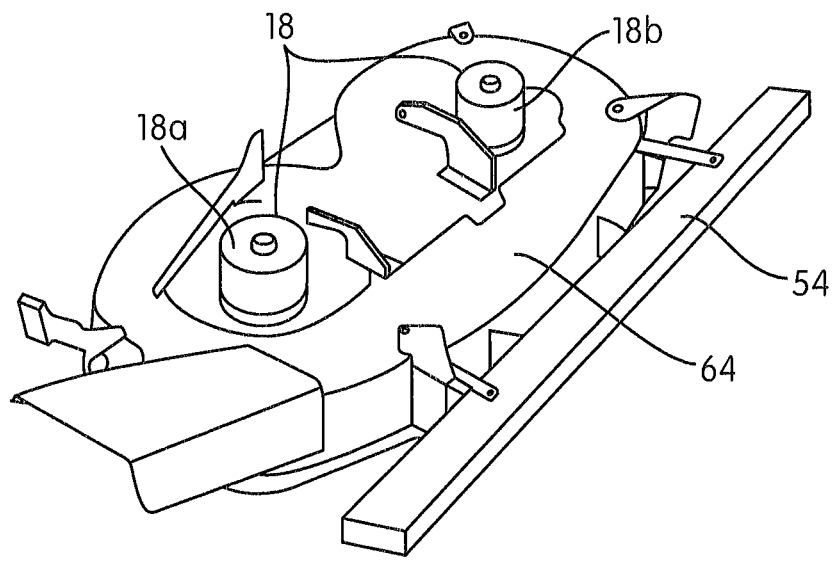
FIG. 5 shows a perspective view of the mower deck and capacitive grass height sensor in accordance with an embodiment of the present patent application.

In one embodiment, the grass height sensor 54 is configured to measure or estimate the length of the grass being cut. In one embodiment, the grass height sensor 54 is configured to provide the following physical measurements. In one embodiment, the grass height sensor 54 includes a capacitive grass height sensor as shown in FIG. 5. In one embodiment, the capacitive grass height sensor is configured to estimate the height of the grass by measuring changes in the electric field projected electrodes. In one embodiment, the measured capacitance changes in repeatable ways as objects are brought into close proximity of the sensors. In one embodiment, higher capacitances are generally associated with more difficult cutting conditions.

In one embodiment, the grass height sensor 54 includes a visual grass height sensor. In one embodiment, the visual grass height sensor includes image capture grass height sensor. In one embodiment, the image capture grass height sensor is configured to estimate the density and height of grass. Edge detection digital filtering is used to detect grass edges. Statistics about the length and quantity of detected edges are calculated for each image. Longer and higher edge density statistics are associated with more difficult cutting conditions.

Figure 6:
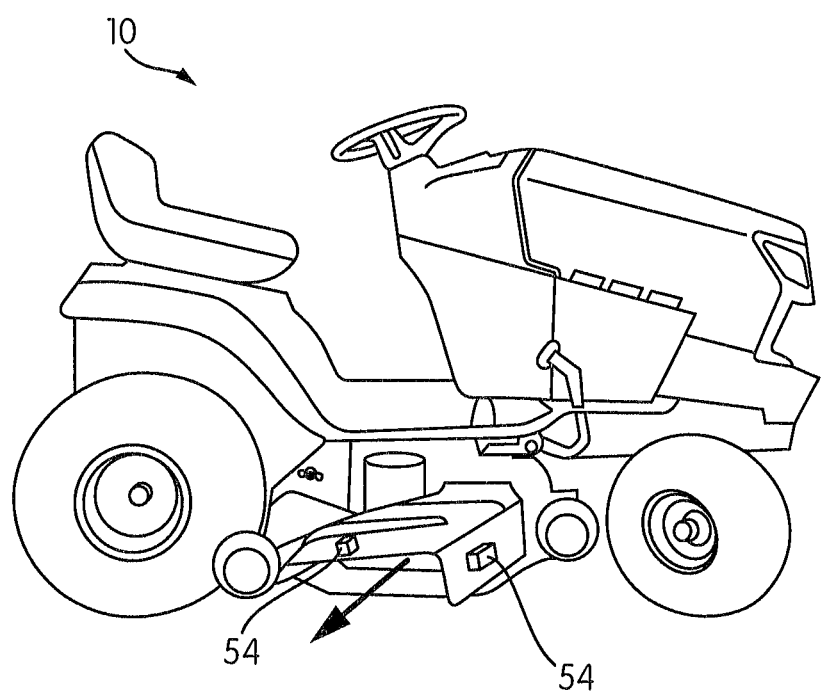
FIG. 6 shows a perspective view of the lawn mower and optical grass height sensor in accordance with an embodiment of the present patent application.

In one embodiment, the grass height sensor 54 includes an optical emitter and detector arrangement 54 as shown in FIG. 6.

In one embodiment, the lawn mower 10 includes a blade speed sensor that is configured to measure the blade speed and provide that information as an input for the one or more processors 32 of the vehicle processor module. In one embodiment, the blade speed may also be used to measure the cutting load of either an ICE or an electric motor powered blade. In one embodiment, when the blades 28 encounter an increased cutting load, the ground speed of the mower is reduced.

In one embodiment, any combination of the blade speed sensor, the blade motor current sensor 50, the grass chute flow sensor 52 and the grass height sensor 54 may be used in the system 100. For example, in one embodiment, the system 100 may only utilize a blade motor current sensor 50, while, in another embodiment, the system 100 may use both a grass chute flow sensor 52 and a grass height sensor 54 but not use the blade motor current sensor 50.

In one embodiment, each of the blade motor current sensor 50, the grass chute flow sensor 52, the blade speed sensor and the grass height sensor 54 may use a range of sensor technologies including, but not limited to, mechanical, optical, chromatic, laser, radio frequency, capacitive, inductive, ultrasound or other type of sensors as would be appreciated by one skilled in the art as long as they are configured to measure the increased cutting load and provide that information as an input to the one or more processors 32 of the vehicle control module 306.

In one embodiment, the one or more processors 32 are also configured to receive an input from an operator. For example, an accelerator input 56 provides a means for an operator to control the base ground speed of the lawn mower. In one embodiment, the accelerator input 56 is a foot operated pedal, a hand operated knob or lever, or a set of switches to increase or decrease speed.

In one embodiment, the measurements provided by the sensors 50, 52, and 54, the blade speed sensor and the accelerator input 56 provided by the operator are processed by the one or more processors 32 of the vehicle control module 306 to provide control signals to the traction motor controller 58, which is configured to control the speed of the mower's wheels $24_R$, $24_L$.

In one embodiment, the one or more processors 32 of the vehicle processor module comprise a digital microprocessor configured to execute software modules. In one embodiment, the one or more processors use the sensor inputs, for example, to estimate the level of difficulty of cutting the grass. In one embodiment, as the estimated difficult cutting conditions increase, the maximum ground speed is reduced. In one embodiment, an operator remains in control of the ground speed of the vehicle between zero ground speed and the maximum calculated ground speed. In one embodiment, if the maximum ground speed is calculated to be lower than the current ground speed, the ground speed will automatically be reduced. In one embodiment, the one or more processors 32 are configured to transmit the control speed to the traction motor controller 58. The traction motor controller 58 is configured to regulate the torque to a drive motor (i.e., electric or hydraulic) in a feedback loop so as to maintain the speed of the lawn mower 10 as requested by the vehicle control module 306. The traction motor controller 58 is configured to receive output/signals from the one or more processors 32 of the vehicle control module 306 and control the speed of the wheels $24_R$, $24_L$.

In one embodiment, an ICE powered lawn mower is controlled by throttling the ICE itself or by controlling the drive ratio of its transmission 352. In one embodiment, an electrical motor powered lawn mower is controlled by controlling the average current going to the drive motor or motors.

In one embodiment, referring to FIGS. 8-13A, an active height control system 400 is configured to self-adjust (automatically and independently) the mower deck 64, the one or more blades 28, or both when bumpy or uneven terrain is traversed. In one embodiment, the active height control system 400 is configured to compensate for terrain irregularities (including, but not limited to, front to rear or side to side). In one embodiment, the active height control system, in response to irregularities in the terrain detected by a sensor 62 along the path of travel of the lawn mower 10, is configured to compensate for variances/changes in levels, for grade changes and for uneven terrain. In one embodiment, the sensor 62 is referred to as ground contour sensor, ground angle sensor, or ground contour and angle sensor. In one embodiment, the sensor 62 is a ground height sensor.

In one embodiment, as shown in FIGS. 8 and 9, the mower deck 64 of the lawn mower 10 includes an upper wall 66 and a plurality of side walls 68 generally extending vertically downwardly from the upper wall 66. In one embodiment, the plurality of side walls 68 and the upper wall 66 form a cavity 70. In one embodiment, the one or more blades 28 are at least partially disposed in the cavity 70 and configured to cut grass on the ground surface 26.

In one embodiment, the lawn mower 10 includes the sensor 62 that is configured to detect variations in the angle and the contour of the ground surface 26. In one embodiment, the one or more processors 32 are configured to receive input from the sensor 62. In one embodiment, the lawn mower 10 includes an actuator system 72 that is configured to receive signals from the one or more processors 32. In one embodiment, the actuator system 72 is operatively connected to the mower deck 64, the one or more blades 28, or both. In one embodiment, the one or more processors 32 are configured to control the actuator system 72 to adjust the mower deck 64, the one or more blades 28 or both to compensate for the variations in the ground surface 26.

In one embodiment, the mower deck 64 includes at least one hole 74 for the cutting or blade motor's shaft to pass therethrough. In one embodiment, the mower deck 64 includes mounting points for cutting/blade motor(s) 76 and/or control linkages/members associated with the mower deck 64. In one embodiment, the mower deck 64 also includes mounting points for blade adjustment motor 78 and control linkages/members associated with the blades 28.

In one embodiment, the mower deck 64 is configured to be detachable by a releasable coupling. In one embodiment, the mower deck 64 is configured to be not detachable. In one embodiment, the mower deck 64 is a center-mounted mower deck. In one embodiment, the mower deck 64 is a rear-mounted mower deck.

In one embodiment, the active height control is achieved through powered actuators that lift/raise or lower the cutting blades 28 of the mower 10 relative to the ground 26 automatically by lifting/raising or lowering the mower deck 64 relative to the ground 26 based on sensor feedback from the sensor 62. In one embodiment, the active height control is achieved through powered actuators that lift/raise or lower the cutting blades 28 of the mower 10 relative to the ground 26 automatically and independently (e.g., without lifting or lowering the mower deck 64 relative to the ground 26) based on sensor feedback from the sensor 62. In one embodiment, the active height control is achieved through powered actuators that lift/raise or lower the mower deck 64 relative to the ground 26 automatically and independently (e.g., without lifting/raising or lowering the cutting blades 28 of the mower 10 relative to the ground 26) based on sensor feedback from the sensor 62.

In one embodiment, the active height control system includes the sensor 62, the one or more processors 32, the mower deck 64, the one or more cutting blades 28, blade motor(s) 76, and the actuator system 72. In one embodiment, the blade motor(s) 76 are operatively associated with the one or more blades 28 and are configured to drive the one or more blades 28 relative to the ground surface 26 to cut grass.

In one embodiment, the sensor 62 is configured to detect the contour of the ground surface 26 for changes in landscape (e.g., its position relative to the ground as it travels over uneven terrain). In one embodiment, the ground height sensor 62 may use a range of sensor technologies including, but not limited, to Radio Frequency (RF), Laser range finding, ultrasonic distance measuring, physical probing, and/or any other sensor technologies as would be appreciated by one skilled in the art. In one embodiment, the ground height sensor 62 includes a plurality of sensors that are positioned, for example, at a front portion, a rear portion, a central portion, a right side portion, a left side portion of the mower deck 64, and anywhere in between. In one embodiment, the ground height sensor 62 is configured to measure the distance of the mower deck 64 above the ground surface 26.

In one embodiment, the actuator system 72 includes control linkages/members 81 associated with the mower deck 64 and deck adjustment/control motor 80. In one embodiment, the actuator system 72 includes control linkages/members 83 associated with the blades 28 and blade adjustment motor 78. In one embodiment, the actuator system 72 includes the control linkages/members associated with the mower deck 64, the deck adjustment/control motor 80, the control linkages/members associated with the blades 28 and the blade adjustment motor 78.

Figure 12:
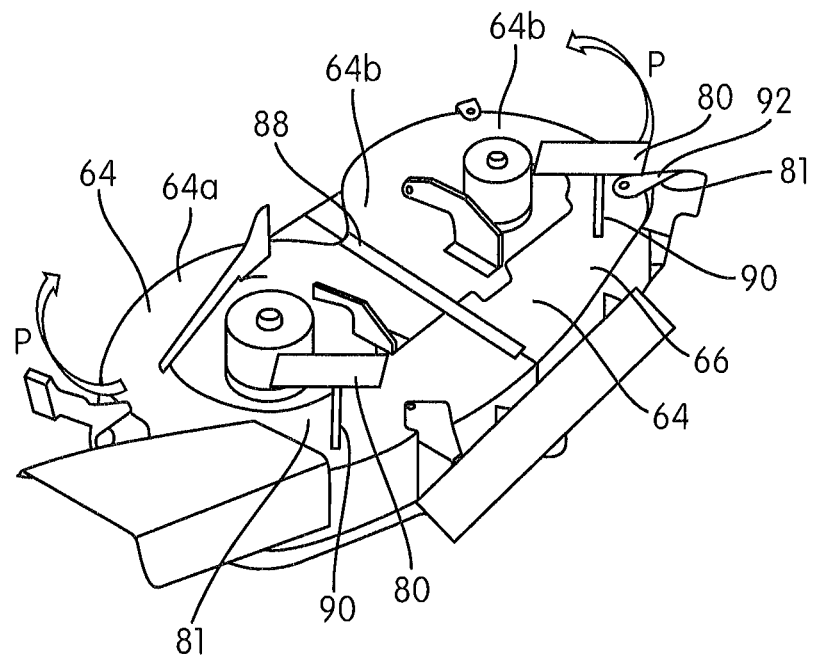
FIG. 12 shows a perspective view of the mower deck and a mower deck adjustment system in accordance with an embodiment of the present patent application.
Figure 13:
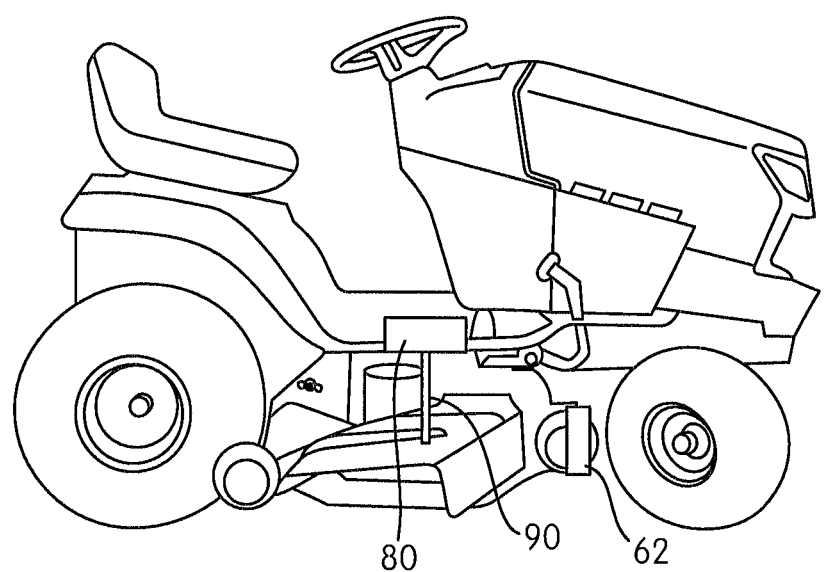
FIG. 13 shows a perspective view of the lawn mower and the mower deck adjustment system in accordance with an embodiment of the present patent application.
Figure 13A:
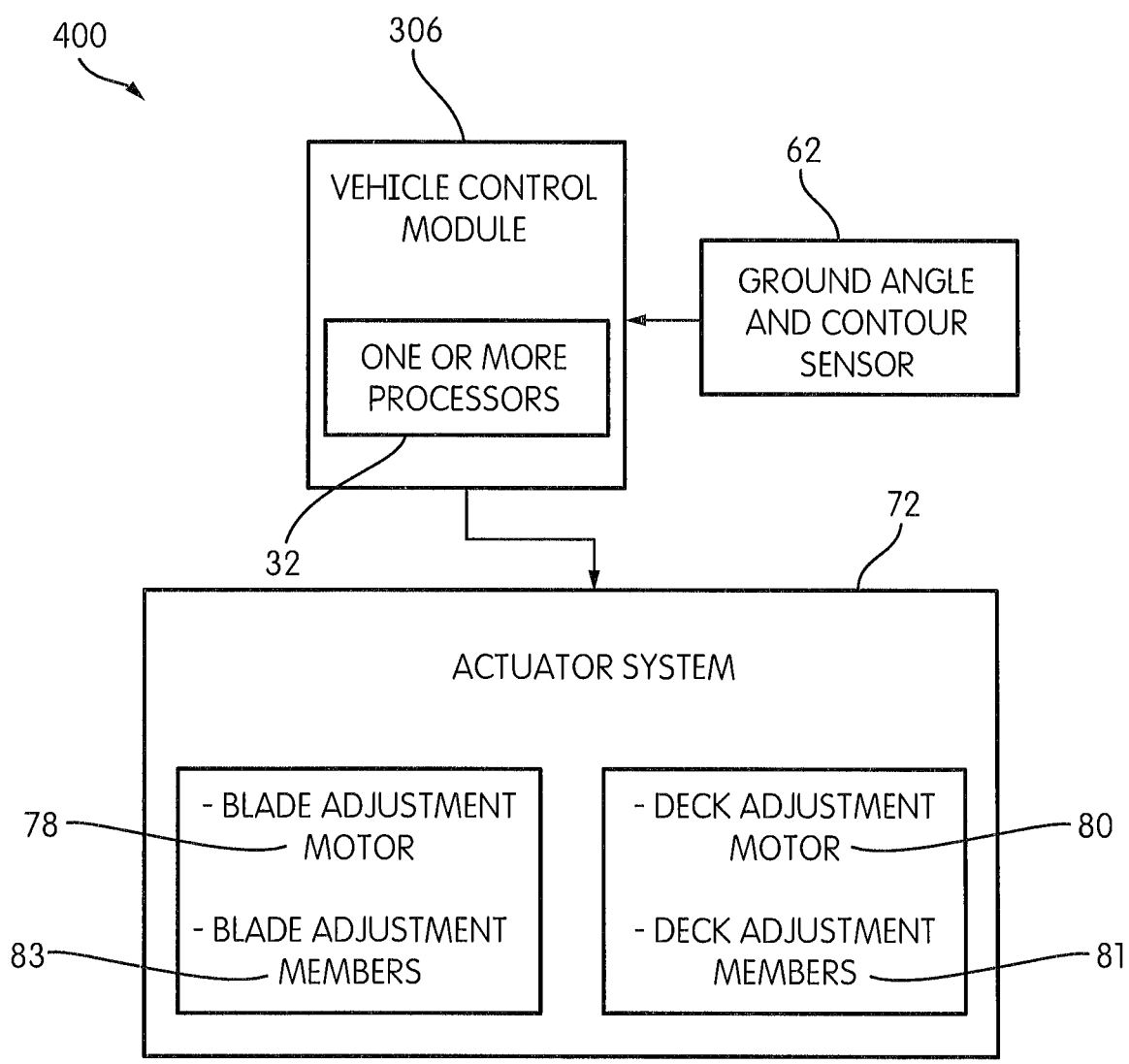
FIG. 13A shows an exemplary block diagram of a system for active height control of mowing deck and/or blades in accordance with an embodiment of the present patent application.

In one embodiment, referring to FIGS. 12 and 13, the control linkages/members 81 associated with the mower deck 64 include deck adjustment members 90, 92 and a hinge 88 that is configured to connect the two halves 64a and 64b of the mower deck 64. In one embodiment, the mower deck 64 may have a plurality of mower deck members 64a ... 64n that are hingedly connected to each other to form the mower deck 64. In one embodiment, the mower deck 64 is a hinged deck or flexible deck. In one embodiment, the hinged deck or flexible deck is used to gain greater articulation and conform to the ground surface 26 more evenly.

In one embodiment, as the lawn mower 10 travels over uneven terrain, the sensor 62 feeds information to the one or more processors 32 of the deck motor controller. In one embodiment, as the lawn mower 10 approaches an area where scalping is likely to occur, the mower deck 64 is articulated or pivoted using the control linkages/members 81 associated with the mower deck 64 and the deck adjustment/control motor 80. In one embodiment, the mower deck motor 80 is configured to interact with the control linkages/members associated with the mower deck 64 to pull or push the mower deck 64 to contour to the ground surface 26. In one embodiment, the mower deck 64 is configured to pivot upwardly (as shown by arrows P in FIG. 12) and downwardly in response to surface terrain and to compensate for differences in the ground surface or terrain. In one embodiment, the mower deck 64 is configured to pivot about portions of the frame 12. In one embodiment, the mower deck 64 is configured to pivot about the central hinge 88. In one embodiment, the mower deck 64 is configured to be movable vertically upwardly and downwardly in response to surface terrain and to compensate for differences in the ground surface or terrain. In one embodiment, the angle and the height of the mower deck 64 are configured to be adjustable to ensure a more even cut regardless of the angle and the contour of the ground surface 26.

In one embodiment, the one or more blades 28 are flexible or articulated blades. In one embodiment, the flexible blades are used to conform to the ground surface 26 (e.g., its surface contour) more evenly. In one embodiment, the articulated blades are used to conform to the ground surface 26 (e.g., its surface contour) more evenly.

Figure 10:
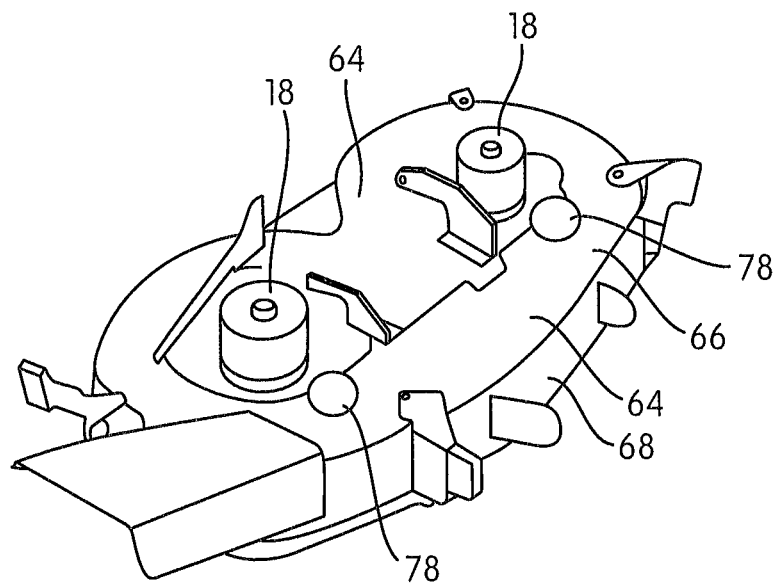
FIGS. 10 and 11 show partial perspective views of the lawn mower with blade adjustment motors of the blade adjustment system in accordance with an embodiment of the present patent application.
Figure 11:
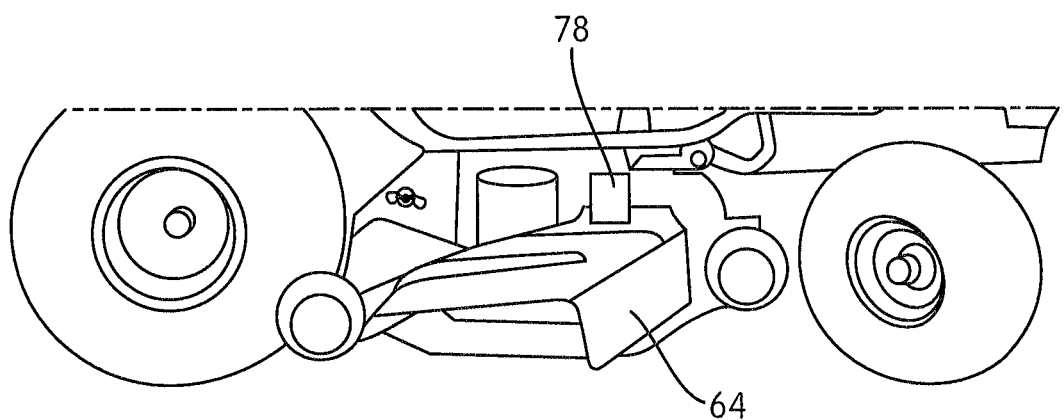

In one embodiment, referring to FIGS. 8-10, the control linkages/members 83 associated with the cutting blades 28 include a blade control ring 82 (also referred to herein as a blade guide member 82) and a blade control member 84. In one embodiment, the blade 28 is configured to rotate within the blade control ring or guide member 82. In one embodiment, edges of the blade 28 are configured to slide in a slot 312 formed in the blade control ring 82 to control the angle of the blade control ring 82. In one embodiment, the slot 312 contains bearings that provide for the sliding action between the edges of the blade and the blade guide member 82. In one embodiment, the blade control ring 82 is attached to the blade control member 84. In one embodiment, the blade control member 84 is operatively associated with and controlled by the blade adjustment motor 78. In one embodiment, the blade adjustment motor 78 is configured to adjust the height and/or angle of the blade control ring 82. In one embodiment, the blade control member 84 comprises a screw assembly that is rotated by the motor 78 or a winch assembly that is actuated by the motor 78 to enable one side of the blade control ring 82 to move vertically (i.e., up and down along the axis V-V in FIG. 8) while articulated in the center about a slidable ball joint 94 (e.g., see FIG. 9). In another embodiment, the mechanism comprises a cylinder 478 and piston 484, wherein the piston 484 can be selectively extended or retracted from the cylinder to cause vertical movement of one side of the control ring 82. In one embodiment, the blade control member 84 is lengthened or shortened only when the irregularities in the terrain are detected that, without compensation, may cause the blade 28 to come too close to the ground and cause bald spots that may hurt grass health. In one embodiment, as the blade control ring 82 is tilted, this configuration allows the angle of the blade 28 to change. In one embodiment, the blade angle can be controlled so that it remains essentially parallel to the ground.

In one embodiment, referring to FIGS. 8-10, the control linkages/members 83 associated with the cutting blades 28 includes the aforementioned sliding ball joint 94 that is automatically controlled in response to the surface terrain to compensate for changes in the ground surface or terrain. In one embodiment, the entire blade 28 (i.e., the blade as a whole) also travels about its axis B-B enabling small adjustments to be made to the blade height without the need to change the height of the mower deck 64. In one embodiment, the blade 28 is constructed and arranged to be attached to the drive shaft 314 of the blade motor 76 via the sliding ball joint 94. In one embodiment, the sliding ball joint 94 is configured to interact with a keyway 86 on the drive shaft 314 of the blade motor 76. This configuration enables it to receive rotational input while not being constrained axially. In one embodiment, the sliding ball joint 94 includes a ball and one or more vertical grooves formed in a member of the sliding ball joint 94. In one embodiment, the member of the sliding ball joint 94 is coupled to the one or more blades 28. In one embodiment, the ball of the sliding ball joint 94 is also coupled to the drive shaft 314 of the blade motor 76 via the keyway 86. In one embodiment, the sliding ball joint 94 is configured to allow the one or more blades 28 connected thereto to translate up and down (along the central longitudinal axis B-B, which is oriented vertically) relative to the mower deck 64 (as vertical grooves slide up and down relative to the ball). In one embodiment, the sliding ball joint 94 is optional and the drive shaft 314 of the blade motor 76 is operatively coupled to the blade shaft 334 of the blades 28.

In one embodiment, the one or more blades 28 are configured to pivot upwardly and downwardly in response to surface terrain and to compensate for differences in the ground surface or terrain. In one embodiment, the upwardly and downwardly pivotal movement of the one or more blades 28 is facilitated by the arrangement of blade control ring 82 and blade control member 84. In one embodiment, the one or more blades 28 are configured to be movable vertically upwardly and downwardly in response to surface terrain and to compensate for differences in the ground surface or terrain. In one embodiment, the upwardly and downwardly pivotal movement of the one or more blades 28 is facilitated by the interaction of the sliding ball joint 94 with the keyway 86 on the drive shaft 314 of the blade motor 76. In one embodiment, the angle and the height of the one or more blades 28 are configured to be adjustable to ensure a more even cut regardless of the angle and the contour of the ground surface 26.

In one embodiment, multiple other sensors and/or motors are used to gain greater articulation of the mower deck 64. For example, in one embodiment, an angle sensor at the mower deck 64 is used to measure the distance of the mower deck 64 above the ground surface 26. In one embodiment, an image capture sensor/camera at the mower deck 64 is used to measure the distance of the mower deck 64 above the ground surface 26. In one embodiment, an optical sensor at the mower deck 64 is used to measure the distance of the mower deck 64 above the ground surface 26. Any combination of these sensors may be used to adjust the actuator system 72 to adjust the mower deck 64, the one or more blades 28, or both to compensate for differences in the ground surface or terrain.

In one embodiment, an electric, a mechanical, a hydraulic, a pneumatic, or any other type of actuators may also be used to adjust the angle and the height of the one or more blades 28 relative to the ground surface and/or to the angle and the height of the mower deck 64 relative to the ground surface in response to the detected surface terrain and to compensate for differences in the ground surface or terrain.

Figure 14:
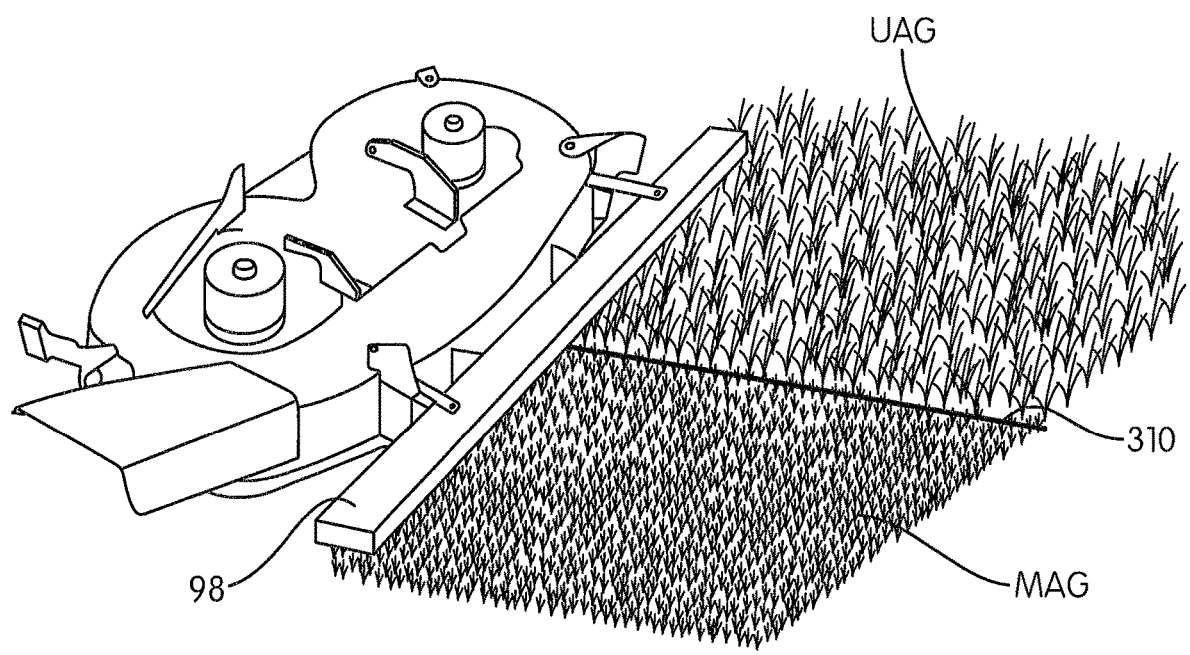
FIG. 14 shows a perspective view of the mower deck and a system, having a capacitive sensor, for detecting an edge between an unmowed area of grass and a mowed area of grass in accordance with an embodiment of the present patent application.
Figure 15:
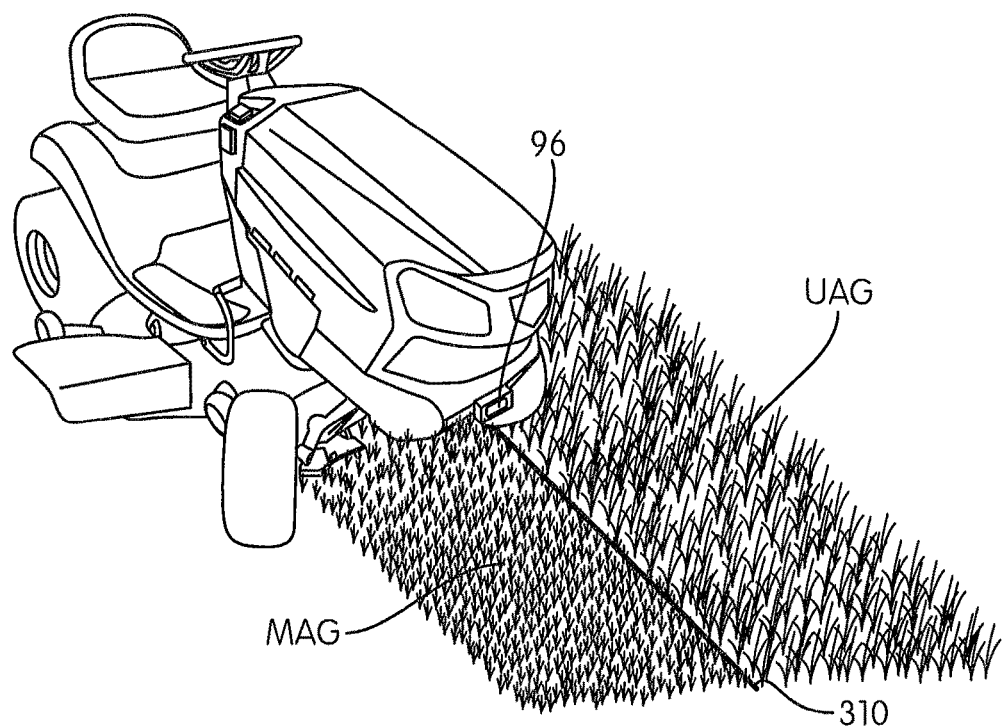
FIG. 15 shows a perspective view of the lawn mower and a system, having an image sensor, for detecting an edge between an unmowed area of grass and a mowed area of grass in accordance with an embodiment of the present patent application.

In one embodiment, referring to FIGS. 14-18, the lawn mower 10 includes a sensor(s) 96, 98, 102, 104 that is configured to detect an edge 310 (as shown in FIGS. 14 and 15) between an unmowed area UAG (as shown in FIGS. 14 and 15) of grass and a mowed area MAG (as shown in FIGS. 14 and 15) of grass. In one embodiment, as will be clear from the detailed discussion below, the sensor(s) is selected from the group consisting of image sensor 96 and video image processor 104 associated therewith, grass height sensor 98, GPS sensor 102, and RTK sensor 102. In one embodiment, the one or more processors 32 of the vehicle control module 306 are configured to receive input from the sensor(s) 96, 98, 102, 104, determine a subsequent path for the lawn mower 10 based on the input from the sensor 96, 98, 102, 104 and provide input to the steering system 20 based on the determined subsequent path.

In one embodiment, the operator steers the lawn mower 10 close to the previous cut area of grass. In one embodiment, as shown in FIGS. 14 and 15, the system 200 detects the edge 310 between the unmowed area UAG of grass and a mowed area MAG of grass. In one embodiment, the operator receives acknowledgment/indication (visual, auditory, tactile, or a combination thereof) from the autonomous driving system 200 that it has detected the edge of the previous cut area of grass at which time the operator leaves the control over the steering wheel 42 and the lawn mower 10 autonomously drives itself along the edge of cut grass with an appropriate overlap. In one embodiment, this is accomplished using a combination of computer vision (image sensor 96 and video image processor 104 associated therewith, grass height sensor 98, GPS sensor 102, and RTK sensor 102) and electrically actuated power steering control system/module 358. In one embodiment, if the lawn mower 10 loses sight of the edge of the previous cut area of grass, the lawn mower 10 is configured to warn (visual, auditory, tactile, or a combination thereof) the operator to take over the steering wheel 42 and to stop the lawn mower 10 if the operator fails to take over the steering wheel 42 in time. In one embodiment, operator output/signaling mechanisms such as visual, auditory, tactile, any combination thereof or other operator output/signaling mechanisms are readily appreciated by one skilled in the art and hence these operator output/signaling mechanisms will not be described here in detail.

Figure 17:
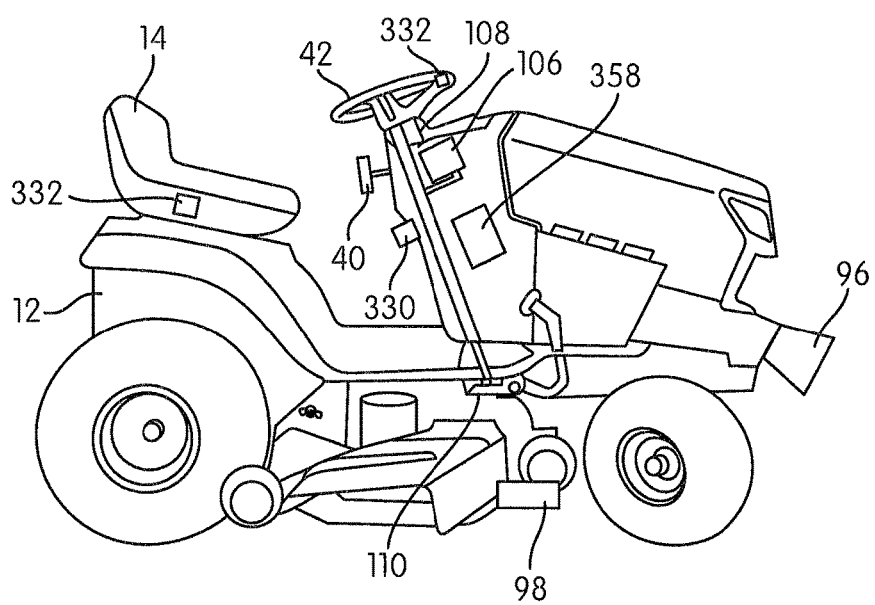
FIG. 17 shows a perspective view of the lawn mower and the system for detecting an edge between an unmowed area of grass and a mowed area of grass in accordance with an embodiment of the present patent application.

In one embodiment, the visual indication is provided to the operator using the one or more processors 32 and the user interface 40. In one embodiment, the audio indication is provided to the operator using the one or more processors 32 and the speaker 330 (as shown in FIG. 17). In one embodiment, the tactile indication is provided to the operator using the one or more processors 32 and an electromechanical device/actuator 332 operatively associated with the operator support 14 or the steering wheel 42.

In one embodiment, by incorporating an electrically actuated power steering control system/module with a steering angle sensor 110, it is possible to steer the lawn mower 10 in a given direction electronically and autonomously without user input. Using additional sensors (e.g., steering wheel torque sensor 108 as shown in FIGS. 16 and 17) to detect the torque applied to the steering wheel 42, it is also possible to allow the operator the override this electrically actuated power steering control system/module 358 by detecting when the user is attempting to manually steer the tractor and disabling the autonomous navigation and reverting back to a traditional power steering arrangement.

In one embodiment, by providing optical (cameras, machine vision systems) and/or other sensors (capacitive grass detection, Global Positioning System (GPS), Real Time Kinematic (RTK)), the one or more processors 32 of the vehicle control module 306 are configured to determine the edge of previously cut areas of grass. This is accomplished by optically looking (e.g., image sensor 96 and video image processor 104 associated therewith, cameras, machine vision systems) for features such as color/contrast edges in the image and using statistical computing methods to determine the most likely part of the image to contain the edge of cut grass. In one embodiment, a curve or line can then be fitted to this detected edge. In one embodiment, this curve or line is then compared to the known location of the edge of the mower deck 64. In one embodiment, the difference in location of this curve or line and the edge of the mower deck 64 is then used as a corrective input to the direction control for the power steering system/unit 20.

Figure 16:
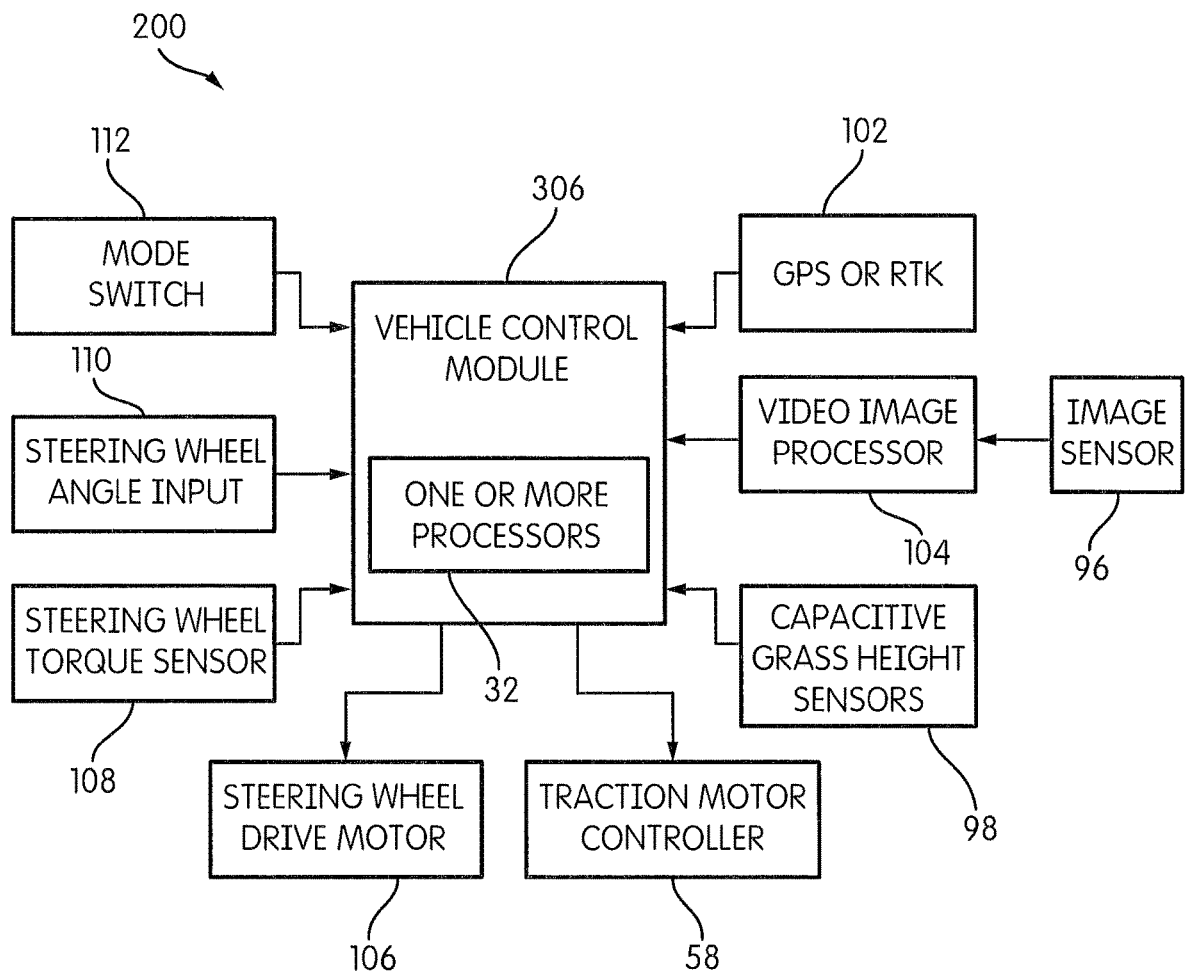
FIG. 16 shows an exemplary block diagram of a system for detecting an edge between an unmowed area of grass and a mowed area of grass in accordance with an embodiment of the present patent application.

In one embodiment, referring to FIG. 16, the semi-autonomous steering system 200 for the lawn mower 10 includes an image sensor 96, a video image processor 104 operatively associated with the image sensor 96, a grass height sensor 98, a position receiver 102 (e.g., Global Positioning System (GPS), Real Time Kinematic (RTK)), the vehicle control module 306 and the one or more processors 32 therewithin, a mode switch 112, a steering wheel angle sensor 110, a steering wheel torque sensor 108, a steering wheel drive motor 106, and a traction motor controller 58. In one embodiment, the steering system 200 is configured to control direction of travel of the lawn mower 10 in the predetermined area.

In one embodiment, each of the image sensor 96, the video image processor 104 operatively associated with the image sensor 96, the grass height sensor 98, the position receiver 102 (e.g., GPS, RTK), the mode switch 112, the steering wheel angle sensor 110, and the steering wheel torque sensor 108 is carried by the frame 12 of the lawn mower 10 and is operatively coupled to the one or more processors 32 of the vehicle control module 306 to provide an input thereto. In one embodiment, the one or more processors 32 of the vehicle control module 306 are configured to receive and process inputs from the mode switch 112, the steering angle sensor 110, the steering wheel torque sensor 108, the grass height sensor 98, the video processor 104 and image sensor 96, and the GPS or RTK position receivers 102.

In one embodiment, the image sensor 96 and the video image processor 104 operatively associated thereto are configured to determine the length of the grass being cut and provide the grass length information as the input to the one or more processors 32 of the vehicle control module 306.

In one embodiment, the grass height sensor 98 is configured to measure or estimate the length of the grass being cut and provide the grass length information as the input to the one or more processors 32 of the vehicle control module 306. In one embodiment, the grass height sensor 98 of the system 200 has the same configuration and operation as that of the grass height sensor 54 (shown and described with respect to FIGS. 5-7) and hence the grass height sensor 98 is not described in detail here again.

Figure 18:
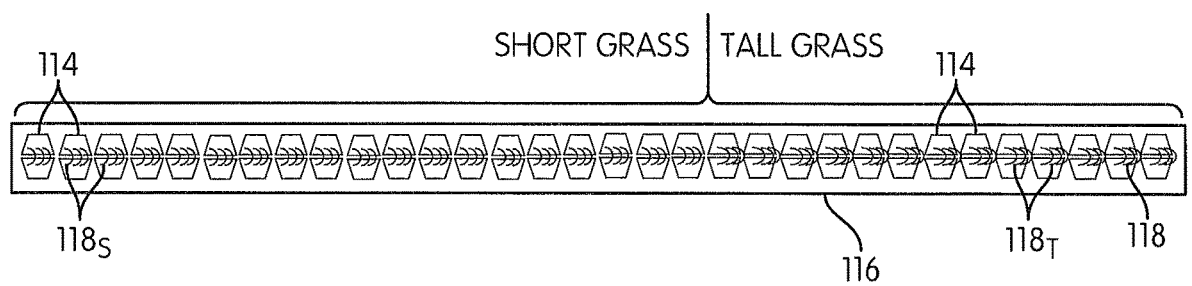
FIG. 18 shows electric field lines for short and long grass from a capacitive sensor arrangement in accordance with an embodiment of the present patent application.

In one embodiment, the grass height sensor 98 is in the form of a capacitive sensor bar 116. FIG. 18 shows how capacitive plate pairs 114 distributed across the capacitive sensor (bar) 116 are used to detect the difference in grass height (i.e., difference between the short grass and the tall grass). In one embodiment, the measured capacitance is calibrated to correspond with specific grass heights. In one embodiment, electric field lines 118 are affected differently by short grass versus tall grass. For example, $118_S$ are the electric field lines for short grass and $118_T$ are the electric field lines for tall grass. In one embodiment, the difference in electric field lines 118 affects the measured capacitance between plate pairs 114. In one embodiment, a capacitance measurement circuit is configured to measure capacitance of each capacitive plate pair 114.

In one embodiment, the system 200 includes a GPS antenna that is configured to receive GPS information/data from one or more GPS satellites and a GPS receiver that is configured to process the received GPS information/data to provide the position information (e.g., geographic location of the lawn mower 10 and, therefore, the mower deck 64) to the one or more processors 32. In one embodiment, the GPS antenna and the GPS receiver are carried by the frame 12 of the lawn mower 10 and are operatively coupled to the one or more processors 32 of the vehicle control module 306 to provide an input thereto. In one embodiment, the GPS position receiver 102 is configured to determine the geographic location of the lawn mower 10.

In one embodiment, when using the RTK position receiver 102, GPS signal corrections are transmitted, in real time, from a reference receiver at a known location to the RTK position receiver 102 carried by the frame 12 of the lawn mower 10. In one embodiment, the RTK position receiver 102 is configured to use differential corrections, provide the precise GPS positioning and compensate for atmospheric delay, orbital errors and other variables in GPS geometry.

In one embodiment, the GPS or RTK position receivers 102 are configured to provide location information to the lawn mower 10 and to provide better tracking and boundary detection. In one embodiment, the GPS or RTK position receivers 102 are optional. That is, in one embodiment, the one or more processors 32 of the vehicle control module 306 are configured to operate without receiving any input from the GPS or RTK position receivers 102.

In one embodiment, the mode switch 112 is configured to permit the operator to select between a manual operation mode and an autonomous operation mode. In one embodiment, when the mode switch 112 is in the manual operation mode, the lawn mower 10 is operated by the operator in a normal manner using the steering system 20, the brake and accelerator pedals, etc. In one embodiment, when the mode switch 112 is in the autonomous operation mode, the lawn mower 10 is operated by the one or more processors 32 of the vehicle control module 306. In one embodiment, the mode switch 112 is a physical switch. In one embodiment, the mode switch 112 is actuated (without physical switch) using software.

In one embodiment, the steering wheel angle sensor 110 is also referred to as steering angle sensor. In one embodiment, the steering angle sensor 110 is operatively associated with the steering wheel 42 or the steering column or a portion of the steering mechanism. In one embodiment, the steering angle sensor 110 is operatively associated with the AFS or the EFS steering systems of the lawn mower 10. In one embodiment, the steering angle sensor 110 is configured to generate a steering wheel angle signal indicative of the relative rotational position of the steering column.

In one embodiment, the steering wheel torque sensor 108 is also referred to as steering torque sensor. In one embodiment, the steering wheel torque sensor 108 is configured to generate a steering wheel torque signal indicative of the steering torque induced in the steering wheel 42. In one embodiment, the steering torque sensor 108 is operatively associated with the steering wheel 42 (or steering column) or a portion of the steering mechanism. In one embodiment, the steering torque sensor 108 includes a torque meter, a torsion bar, a torque transducer a torsion sensor, or other torque measuring devices. In one embodiment, the steering torque sensor 108 is operatively associated with the AFS or the EFS steering systems of the lawn mower 10.

In one embodiment, the one or more processors 32 of the vehicle control module 306 are configured to receive input from only the grass height sensor 98 (and not from the image sensor 96 and its associated video image processor 104), to determine a subsequent path for the lawn mower 10 based on the input from the grass height sensor 98 and provide input to the steering system 20 based on the determined subsequent path.

In one embodiment, the one or more processors 32 of the vehicle control module 306 are configured to receive input from only the image sensor 96 and its associated video image processor 104 (and not from the grass height sensor 98), to determine a subsequent path for the lawn mower 10 based on the input from the image sensor 96 and its associated video image processor 104 and provide input to the steering system 20 based on the determined subsequent path.

In one embodiment, the one or more processors 32 of the vehicle control module 306 are configured to receive input from both the image sensor 96 (and its associated video image processor 104) and the grass height sensor 98, to determine a subsequent path for the lawn mower 10 based on the input from the image sensor 96 (and its associated video image processor 104) and the grass height sensor 98 and provide input to the steering system 20 based on the determined subsequent path.

In one embodiment, the one or more processors 32 of the vehicle control module 306 are configured to calculate a trajectory that provides a most likely direction for the lawn mower 10 to move to next, so as to keep the lawn mower 10 on a track that minimizes the amount of redundant mowing of previously cut grass. In one embodiment, the one or more processors 32 of the vehicle control module 306 are configured to control automatic steering system 20 to automatically guide/steer the lawn mower 10 along the calculated trajectory paths until the area is covered/completely mowed. In one embodiment, the lawn mower 10 includes an electric power-assisted steering (EPAS) system that includes an electric steering motor for turning the steered wheel 42 to a steering angle based on a steering command based on the determined subsequent path.

In one embodiment, the one or more processors 32 of the vehicle control module 306 are configured to provide voice commands to the operator to guide the operator (to drive the lawn mower 10) along the determined subsequent path. In one embodiment, the one or more processors 32 of the vehicle control module 306 are configured to display the determined subsequent path to the operator on the user interface 40 (as shown in FIG. 17 and that is carried by the frame 12 of the lawn mower 10) so as to guide the operator (to drive the lawn mower 10) along the determined subsequent path. In one embodiment, the user interface 40 is a graphical user interface. In one embodiment, the user interface 40 is a display screen. In one embodiment, the user interface 40 is a touch activated screen. In one embodiment, the user interface 40 may display various buttons and icons through which the operator can interact with the system 200.

In one embodiment, an operator takes control of the steering of the lawn mower 10 by applying torque to the steering wheel 42 or by actuation of the manual mode with a switch 112. In one embodiment, when there is a conflict between the manual inputs/commands from the operator and input received from the one or more processors 32 and when the lawn mower 10 is in the autonomous control mode, the lawn mower 10 is configured respond with a manual override of the autonomous control system. In one embodiment, the present patent application allows manual operation to override specific or all functions of the lawn mower 10. In one embodiment, the present patent application allows autonomous control to override specific or all functions of the lawn mower 10.

In one embodiment, the one or more processors 32 of the vehicle control module 306 are configured to also autonomously control the speed of the lawn mower 10 by sending control signals to the traction motor controller 58.

Figure 19:
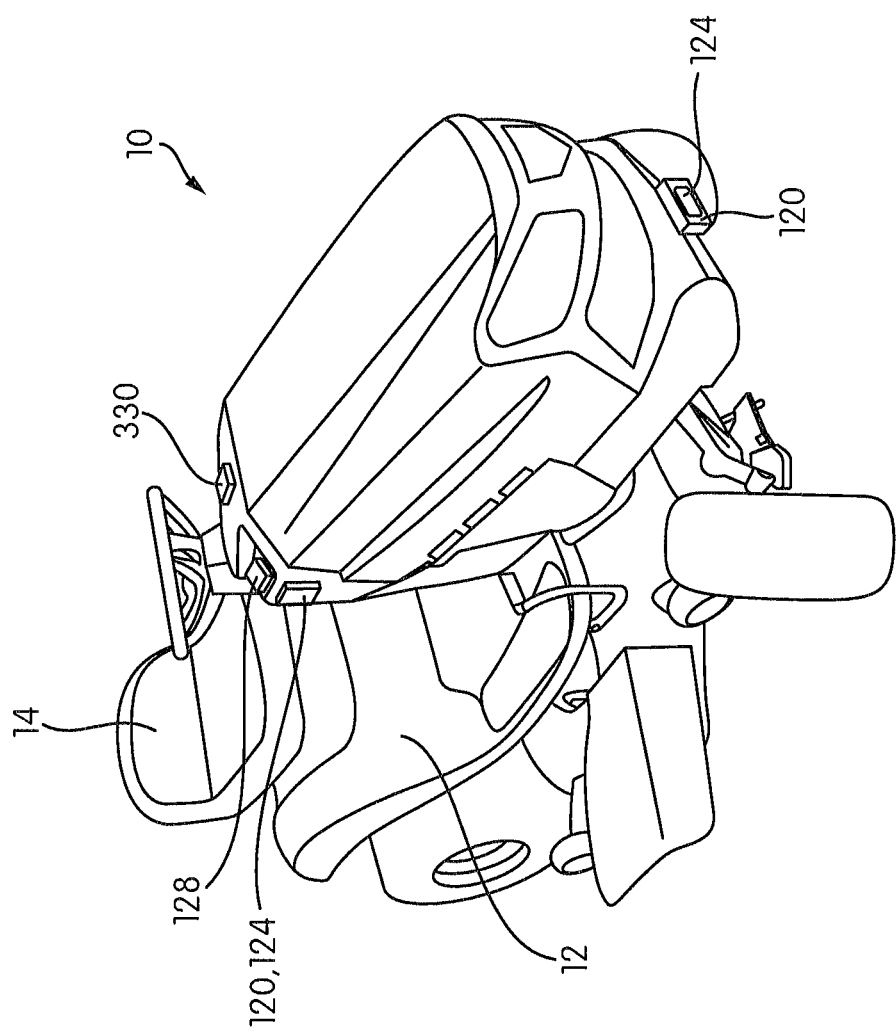
FIG. 19 shows a perspective view of the lawn mower and a system for detecting the presence of an animal or a person in a predetermined area proximate the lawn mower in accordance with an embodiment of the present patent application.
Figure 20:
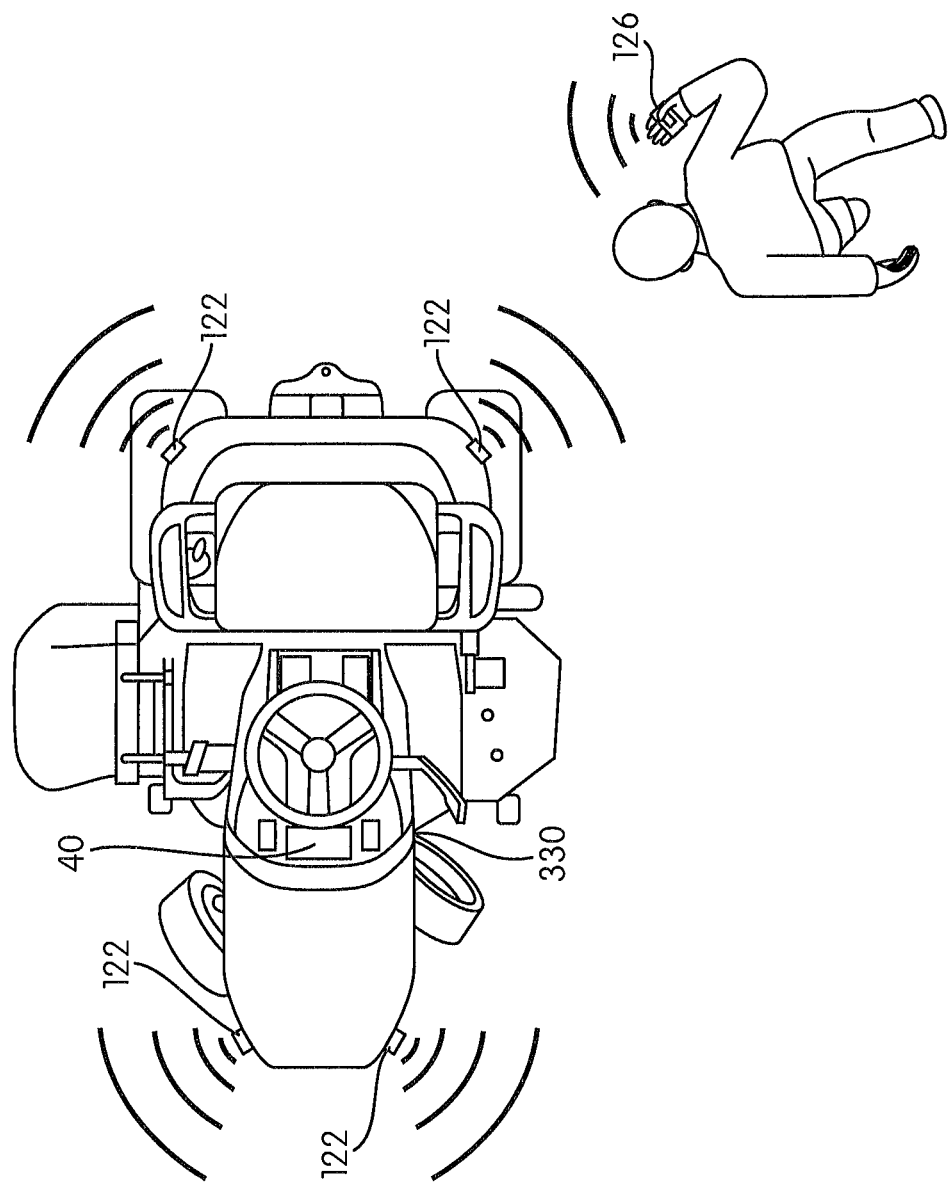
FIG. 20 shows a perspective view of the lawn mower and the system for detecting the presence of an animal or a person in a predetermined area proximate the lawn mower in accordance with an embodiment of the present patent application.
Figure 21:
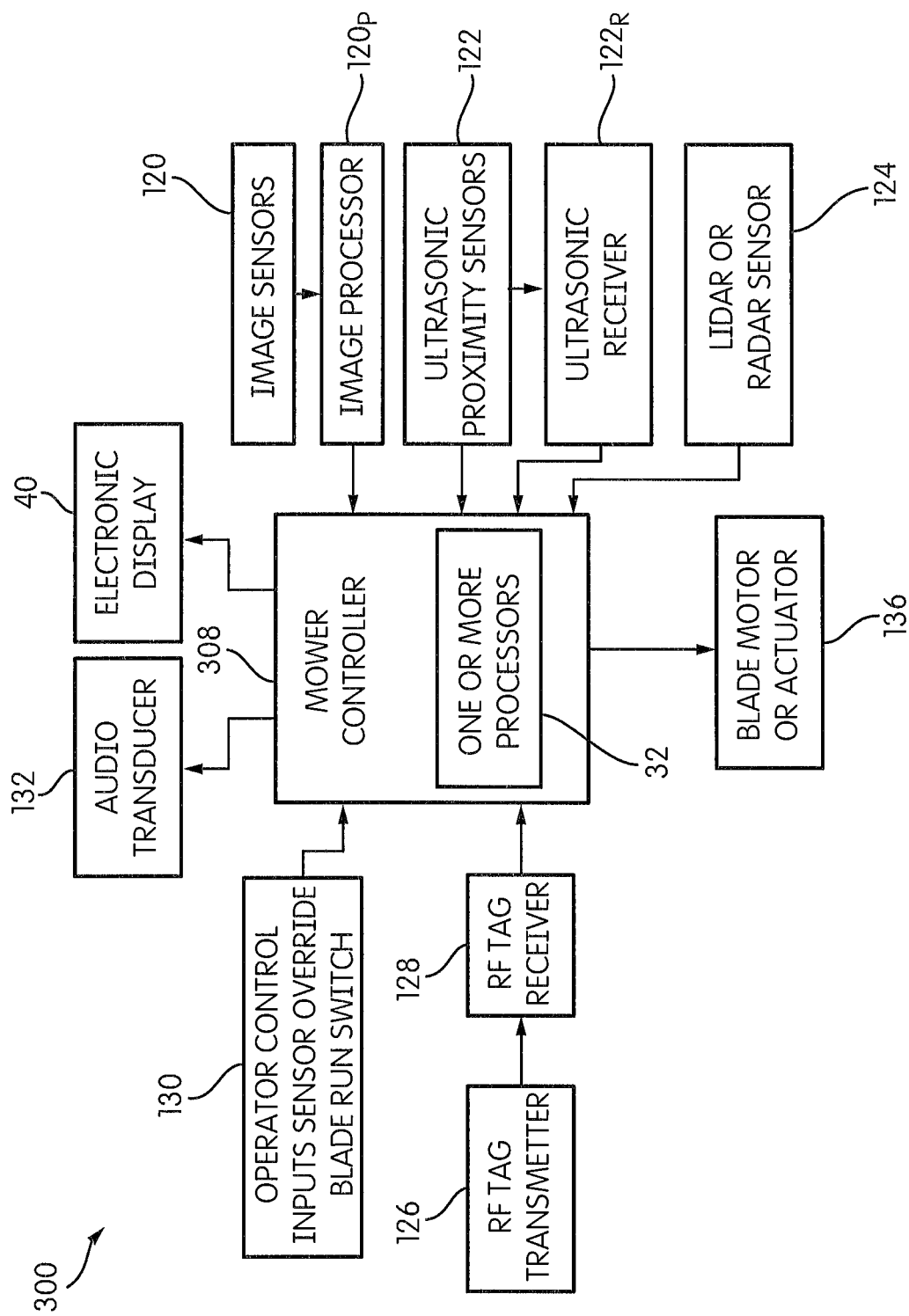
FIG. 21 shows an exemplary block diagram of the system for detecting the presence of an animal or a person in a predetermined area proximate the lawn mower in accordance with an embodiment of the present patent application.

In one embodiment, referring to FIGS. 19-21, the lawn mower 10 includes one or more sensors 120, 122, 124, 126, or 128 that are configured to detect the presence of a person or an animal in a predetermined area proximate the lawn mower 10. In one embodiment, the one or more processors 32 are configured to receive input from the one or more sensors 120, 122, 124, 126, or 128 and stop driving the one or more blades 28, the wheels 22, 24, or both based on the input from the sensor 120, 122, 124, 126, or 128.

In one embodiment, the lawn mower 10 can be made safer by automatically shutting down the blades 28 or warning an inattentive operator to the presence of near-by humans or animals that may sustain injuries from coming into contact with an operating blade or being impacted by debris from an operating mower 10. In one embodiment, the present patent application provides a safety system 300 for increasing operational safety of the lawn/grass mower 10 by detecting humans or animals that are near an operating lawn mower 10. If the human or animal is detected in a predetermined area proximate the lawn mower 10, the operator is warned and the mower 10 automatically shuts off/down the motor assembly 18 that drives the blades 28, to shuts off/down the motor assembly 18 that drives the wheels 24$_R$, 24$_L$, or to shuts off/down the motor assembly 18 that drives both.

In one embodiment, referring to FIG. 21, the present patent application provides a mower safety system 300. In one embodiment, the mower safety system 300 includes one or more of the sensors 120, 122, 124, 126 or RF receiver 128. In one embodiment, an operator always has control over the mower blades 28 through the operator interface 40. In one embodiment, as will be clear from the detailed discussion below, the one or more sensors are selected from the group consisting of image sensor 120, LIDAR sensor 124, RADAR sensor 124, RF receiver 128 that is associated with RF transmitter 126, and ultrasonic proximity sensor 122. In one embodiment, these sensors are configured to a)

measure or estimate the distance between the mower 10 and nearby objects, b) detect the presence of a person or an animal in a predetermined area proximate the lawn mower 10, or c) measure or estimate the distance between the mower 10 and nearby objects and detect the presence of a person or an animal in a predetermined area proximate the lawn mower 10.

In one embodiment, there are multiple mechanisms to detect the presence of a human or an animal within a close proximity to the operating mower 10. In one embodiment, a distance measuring sensor 120, 122, 124, such as a distance measuring transducer is used to estimate the distance between the mower 10 and nearby objects. In one embodiment, the distance measuring transducers are selected from the group consisting of ultrasonic range sensor 122, RADAR sensor 124, LIDAR sensor 124, and optical range sensors 120. In one embodiment, the one or more distance measuring transducers are located on the outer surfaces of the mower 10. In one embodiment, the distance to nearby objects in estimated, and processed by the one or more processors 32. If the estimated distance is less than a predetermined threshold, the one or more processors 32 are configured to shut down the motor assembly 18 that drives the blades 28, to shut down the motor assembly 18 that drives the wheels 22, 24 or to shut down the motor assembly 18 that drives both. In one embodiment, if the estimated distance is less than a predetermined threshold, the one or more processors 32 are configured to apply/actuate a brake to stop the ground travel/movement of the lawn mower 10. In one embodiment, the predetermined threshold is between 0 and approximately 5 feet.

In one embodiment, any suitable distance measuring sensor(s) as would be appreciated by one skilled in the art, can be used in the lawn mower 10. For example, in one embodiment, the sensor, which is configured to detect the presence of a person or an animal in a predetermined area proximate the lawn mower 10, includes an ultrasonic range sensor, a Radio Detection And Ranging (RADAR) sensor, a Light Detection and Ranging (LIDAR) sensor, an optical range sensor, and/or other distance measuring transducers as would be appreciated by one skilled in the art.

In one embodiment, proximity tags 126, 128 are used for detecting the presence of a human or an animal within a close proximity to the operating mower 10. In one embodiment, the proximity tag 126 is configured to transmit a short message over a Radio Frequency (RF) signal. In one embodiment, the RF signal is received by the one or more processors 32 (or an electrical circuit) on the lawn mower 10. In one embodiment, the one or more processors 32 are configured to analyze the received radio signal and estimate the distance to the transmitting proximity tag based on the received signal strength of the RF signal, and information transmitted by the proximity tag pertaining to the transmitted signal strength. In one embodiment, if the estimated distance is less than a predetermined threshold, the one or more processors 32 are configured to shut down the motor assembly 18 that drives the blades 28, to shut down the motor assembly 18 that drives the wheels $24_R$, $24_L$ or to shut down the motor assembly 18 that drives both the blade 28 and wheels $24_R$, $24_L$. In one embodiment, if the estimated distance is less than a predetermined threshold, the one or more processors 32 are configured to apply/actuate a brake to stop the ground travel/movement of the lawn mower 10. In one embodiment, this mechanism relies on the necessity of a nearby human or an animal to be wearing a proximity tag that is transmitting at a frequency and with a protocol that is compatibility with the receiving circuit/one or more processors 32 located on the lawn mower 10. In one embodiment, the proximity tags are configured to be compatible with the Blue-Tooth BLE Beacon protocol.

In one embodiment, a RF receiver 128 requires that a person or an animal be wearing an RF tag 126 which transmits a signal that can be received by the RF receiver 128. In one embodiment, the RF receiver 128 is configured to measure the RF signal strength of the RF transmitter 126 and use this measurement to estimate the distance to the RF transmitter 126. In one embodiment, this mechanism has the advantage that a potential hazard can easily be identified.

In one embodiment, ultrasonic proximity sensors 122 are configured to emit an ultrasonic acoustic chirp. In one embodiment, when an echo of the chirp from the ultrasonic proximity sensors 122 is received by an ultrasonic proximity receiver $122_R$, the distance to the ultrasonic proximity transmitter/source of the echo is calculated based on the round trip transit time of the chirp. Acoustic energy propagates in a radial direction from the ultrasonic proximity transducer/transmitter, and the ultrasonic proximity receiver has a narrow "field of view." Several sensors, dispersed about the lawn mower 10, allow a potential hazard to be localized to a particular side of the mower 10.

In one embodiment, RADAR sensor 124 works much like an ultrasonic sensor, except that the RADAR uses RF energy instead of acoustic energy. In one embodiment, the RADAR sensor 124 is configured to locate a potential hazard to a particular side of the mower 10. In one embodiment, LIDAR sensor 124 works by transmitting modulated light measuring the phase angle of the reflected light off of a nearby object. In one embodiment, the LIDAR sensor 124 is also directional like ultrasound and RADAR.

In one embodiment, image sensors 120 are configured to be combined with an image processing system $120_P$ to detect the shape of objects. In one embodiment, the processed images are configured to be used to discriminate objects. In one embodiment, a person or an animal can be discriminated from false hazards such as trees and bushes using the image sensors 120 and their corresponding image processing system.

In one embodiment, the mower safety system 300 is configured to implement only a single sensor type. In one embodiment, the sensor type is selected from the ground consisting of image sensors (with image processing capabilities), ultrasonic proximity sensors, LIDAR sensors, RADAR sensors, and RF Tags.

In one embodiment, the mower safety system 300 is configured to implement several different sensor types. In one embodiment, the mower safety system 300 having several different sensor types takes advantage of the strengths of each sensor type to create a more effective system with a fewer false hazard detections. In one embodiment, for example, the mower safety system 300 that uses both RF Tags and ultrasonic proximity sensors can be configured to only take action if both the RF Tag signal strength is high and the ultrasonic proximity sensor measures a close object.

In one embodiment, the predetermined area proximate the lawn mower 10 is determined based on the size of the lawn mower 10, the power of the lawn mower 10, the size of the blades of the lawn mower 10, etc. In one embodiment, the predetermined area proximate the lawn mower 10 is determined based on type of the sensor technology being used, etc. In one embodiment, the predetermined area proximate the lawn mower 10 is input by the manufacture during the time of manufacture of the lawn mower 10 based on the specifications of the lawn mower 10 and/or the sensor technology of the sensors being used (for detecting the presence of a person or an animal in a predetermined area proximate the lawn mower 10). In one embodiment, the predetermined area proximate the lawn mower 10 is between 12 and 300 square feet.

In one embodiment, the mower safety system 300 includes an automatic blade safety monitor including an electrical circuit or circuits (e.g., one or more processors 32 of the mower controller/control module 308) that detect the close proximity of a human or an animal. In one embodiment, the vehicle control module 306 includes the mower/control module 308.

In one embodiment, the one or more processors 32 of the mower controller 308 are configured to control the electrical power to the actuator 136 of blade motor to cause the mower's blade 28 to stop rotating. In one embodiment, powered mowers 10 (e.g., using either electrical motors or ICE to power blades 28) include a brake or other system to stop the rotation of the mower's blades 28. Such a system to stop blade rotation, in one embodiment, can be electrically controlled. In one embodiment, for the ICE powered lawn mower, an electrical signal enables or disables power to the actuator 136, which in turn disengages the blade shaft 334 from the drive shaft 314 (as shown in FIGS. 8 and 9) of the blade motor 76 and applies a braking force and thus operates as the aforementioned brake. In one embodiment, for the electric motor powered lawn mower, the current to the electric motor 18 can be momentarily reversed to apply a braking force to the spinning blades 28.

In one embodiment, the one or more processors 32 of the mower controller/control module 308 are configured to monitor the inputs from the sensors 120, 122, 124, 126, or 128 and make a determination if the sensors inputs represent a situation. In one embodiment, as noted above, the one or more sensors are selected from the group consisting of image sensor 120, LIDAR sensor 124, RADAR sensor 124, RF receiver 128 that is associated with RF transmitter 126, and ultrasonic proximity sensor 122. In one embodiment, if a situation is detected, the one or more processors 32 of the mower controller/control module 308 are configured to take an action by, shutting off the motor assembly 18 that drives the blades 28 and/or stopping the motor assembly 18 that drives the wheels $24_L$, $24_R$.

In one embodiment, the one or more processors 32 are configured to receive input from the one or more sensors 120, 122, 124, 126, or 128 and stop driving the motor assembly 18 that drives the one or more blades 28 based on the input from the sensor 120, 122, 124, 126, or 128. In one embodiment, the one or more processors 32 are configured to receive input from the one or more sensors 120, 122, 124, 126, or 128 and stop driving the motor assembly 18 that drives the wheels $24_L$, $24_R$ based on the input from the sensor 120, 122, 124, 126, or 128. In one embodiment, the one or more processors 32 are configured to receive input from the one or more sensors 120, 122, 124, 126, or 128 and stop driving the motor assembly 18 that drives the wheels $24_L$, $24_R$ and stop driving the motor assembly 18 that drives the one or more blades 28 based on the input from the sensor 120, 122, 124, 126, or 128.

In one embodiment, if a situation is detected, the one or more processors 32 of the mower controller/control module 308 are configured to display a visual message to the operator via the electronic display or user interface 40, or generate an audible warning (via the speaker 330 as shown in FIGS. 19 and 20) to the operator using the audio transducer 132. In one embodiment, the one or more processors 32 are configured to vibrate the operator's seat or the steering wheel to alert/warn the operator of various detected conditions. In one embodiment, a tactile transducer or an electromechanical output device (or actuator) is used to vibrate the operator's seat or the steering wheel to alert/warn the operator of various detected conditions.

In one embodiment, the one or more processors 32 of the mower controller/control module 308 may falsely detect the situation. That is, for example, a nearby tree may be incorrectly detected as a nearby person/animal. In one embodiment, the operator can override the action of the one or more processors 32 of the mower controller/control module 308 by depressing a switch 130 to indicate to the one or more processors 32 of the mower controller/control module 308 that the situation is safe and the mower blades 28 may continue to run. In one embodiment, an operator always has control over the mower blades 28 through the operator interface 40. In one embodiment, the switch 130, the audio transducer 132 and the user interface 40 is carried by the frame 12 and is accessible to the operator when the operator is supported by the operator support 14.

In one embodiment, the operator may provide input (via the user interface 40 and/or other controls/switches) to the one or more processors 32 to shut off the blades 28, for example, before traversing sidewalks, roads, driveways, or other non-grassy areas to avoid any stones, mulch or lose gravel being thrown out of the lawn mower 10 in unwanted directions.

In one embodiment, referring to FIGS. 22-25, the lawn mower 10 includes a trailer 138 that is configured to be removably coupled to a hitch 140 of the frame 12. In one embodiment, the one or more processors 32 of the vehicle control module 306 are communicatively connected to the motor assembly 18 to control the blade assembly 16 as described in detail above. In one embodiment, the one or more processors 32 are further communicatively connected to the trailer 138 via one or more wired or wireless connections to control one or more accessories 142 on the trailer 138. In one embodiment, the lawn mower 10 further comprises one or more battery cells 48 (as shown in FIG. 2) carried by the frame 12. In one embodiment, the one or more battery cells 48 are configured to power the motor assembly 18 and the trailer 138. In one embodiment, the lawn mower 10 further comprises the user interface 40 carried by the frame 12 and accessible to the operator when supported by the operator support 14.

In one embodiment, the one or more accessories 142 on the trailer 138 include rototillers/rotavators, lawn carts, fertilizer spreader, mulch spreader, snow plows, snow blowers, tiller plows, dozer blades, yard vacuums, cultivators, plows, sweepers, rotary tillers, buckets, fork-lift tines and/or snow throwers. In one embodiment, the one or more accessories 142 on the trailer 138 may also be referred to as garden/lawn implements. In one embodiment, the one or more accessories 142 on the trailer 138 are attached to the lawn mower 10 in different ways and at different locations. In one embodiment, the one or more accessories 142 are attached under, on the rear of, on the sides of and/or on the front of the lawn mower 10.

In one embodiment, the hitch 140 comprises a drawbar hitch, a sleeve hitch or a three-point hitch. In one embodiment, the hitch 140 is removably or detachably mounted on the frame 12 with a releasable coupling. In one embodiment, the hitch 140 is permanently mounted on the frame 12.

In one embodiment, the mower 10 comprises a universal mechanism/system 600, 700 configured to attach, control and power the accessories 142. In one embodiment, the system 600, 700 is configured to attach the accessories 142

(that require power) to the lawn mower 10 without a powered attachment system. In one embodiment, the system 600, 700 is configured for interfacing an operator device (personal terminal) 40 or 152, the lawn mower 10, and the accessories 142 through a common wireless or wired interface as well as a common mechanical and electrical interface.

In one embodiment, the system 700 includes an app/application on the wireless device 152 (phone, tablet, computer or media player) to display an expanded list of controls as well as display additional gauges not feasible to have in physical form. In one embodiment, the list of controls includes switches to turn on or off the attachments or accessories such as snow throwers, wagon dumps, switches to turn on or off the electric lights, proportional controls to control height of blades, proportional controls to control the temperature of beverage coolers, proportional controls to control the amplitude of sound transducers, proportional controls to control the sensitivity of proximity sensors, etc. In one embodiment, the additional gauges include ground speed gauge, blade speed gauge, power consumption gauge, battery charge gauge, gauge for the distance to detected objects, etc. In one embodiment, the system 700 is configured to allow for customizing these controls into a "virtual dashboard." In one embodiment, the system is configured to allow control from both virtual dashboard controls as well as standard physical controls.

Figure 25:
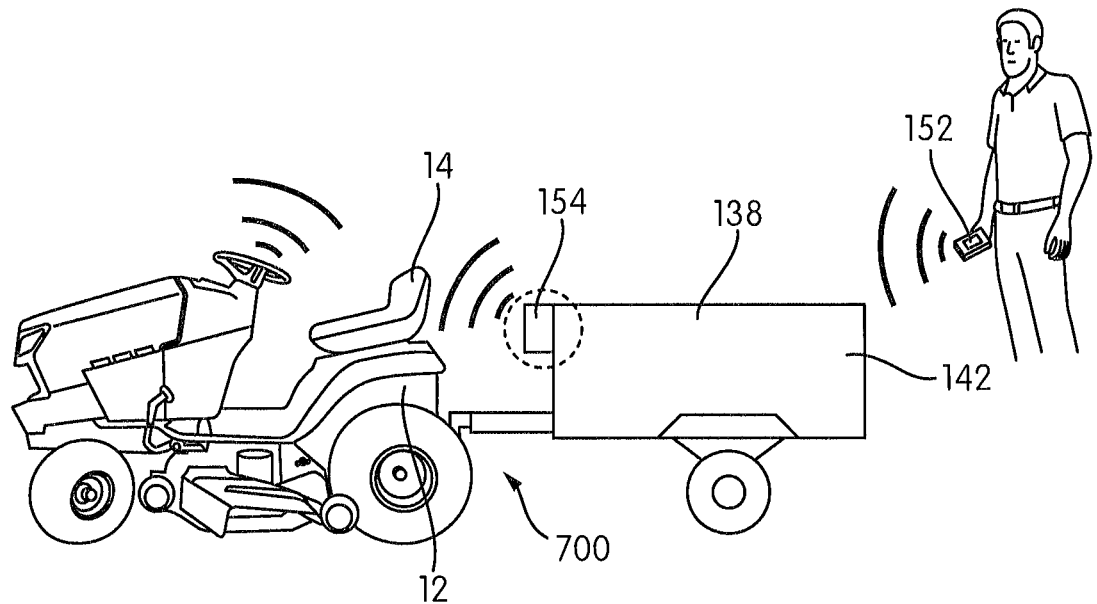

In one embodiment, as shown in FIGS. 24 and 25, the system 700 is configured to allow for wireless control of the mower 10 using an app/application on the operator device 152 (a phone, tablet or computer). In one embodiment, as shown in FIGS. 24 and 25, the system 700 is configured to allow for wireless control of the accessory 142 using an app/application on the operator device 152 (a phone, tablet or computer). In one embodiment, as shown in FIGS. 24 and 25, the system 700 is configured to allow for wireless control of both the mower 10 and the accessory 142 using an app/application on the operator device 152 (a phone, tablet or computer). In one embodiment, as shown in FIGS. 24 and 25, when paired or combined with a phone, tablet or media player 152, the system 700 is configured to allow for wireless control of the mower 10 over the Bluetooth technology.

In one embodiment, as shown in the FIG. 25, the lawn mower 10 includes a Controller Area Network (CAN bus) to Bluetooth Low Energy (BLE) battery receiver 154. In one embodiment, the CAN to BLE receiver 154 is a battery powered unit that plugs into the electric accessories 142. In one embodiment, the CAN to BLE receiver 154 is configured to be connected to an app/application (just like the electric mower) on the device 152 and act as a controller for any accessory 142 plugged into it. In one embodiment, just like the lawn mower 10, the CAN to BLE receiver 154 is configured to provide connectivity to the app/application, which provides device specific control of the accessory 142 wirelessly. In one embodiment, this configuration allows for control of a single accessory 142 by both gas and electric mowers, in conjunction with the mobile device (e.g., phone, tablet or media player) 152.

In one embodiment, the lawn mower 10 is configured to retain the standard set of controls in their usual location. In one embodiment, as shown in FIG. 22, the system 600 is configured to allow for software controls via the mobile device 40 attached to or near the steering wheel 42 via this system 600.

Figure 22:
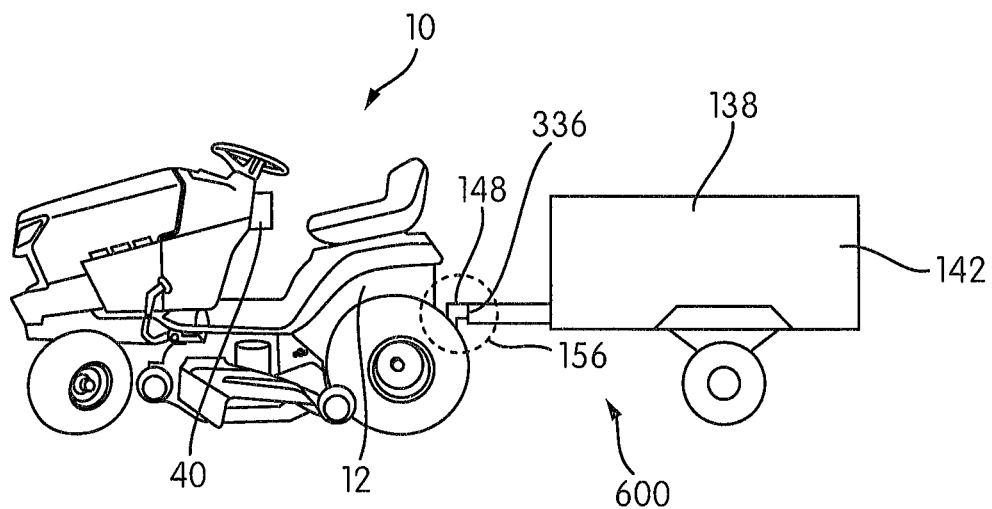
FIGS. 22 and 23 show perspective views of the lawn mower and a trailer removably coupled thereto in accordance with an embodiment of the present patent application, one or more processors of the lawn mower are communicatively connected to the trailer via one or more wired or wireless connections to control one or more accessories on the trailer.
Figure 23:
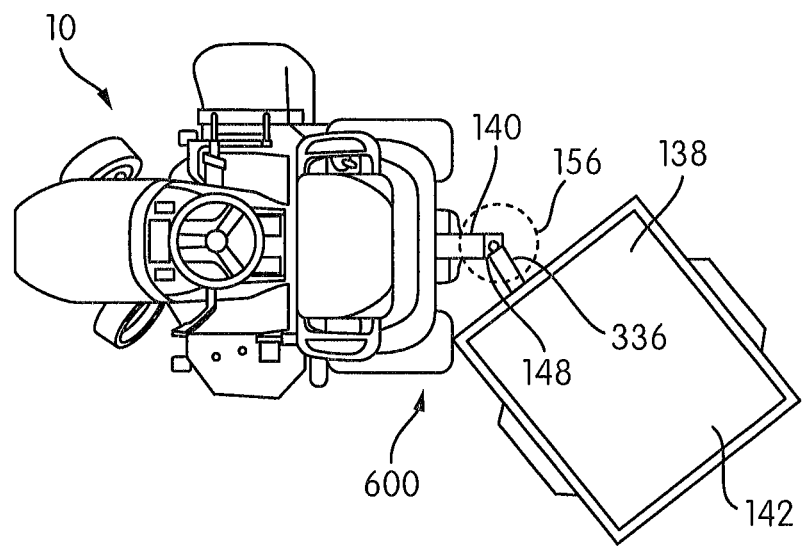
Figure 23A:
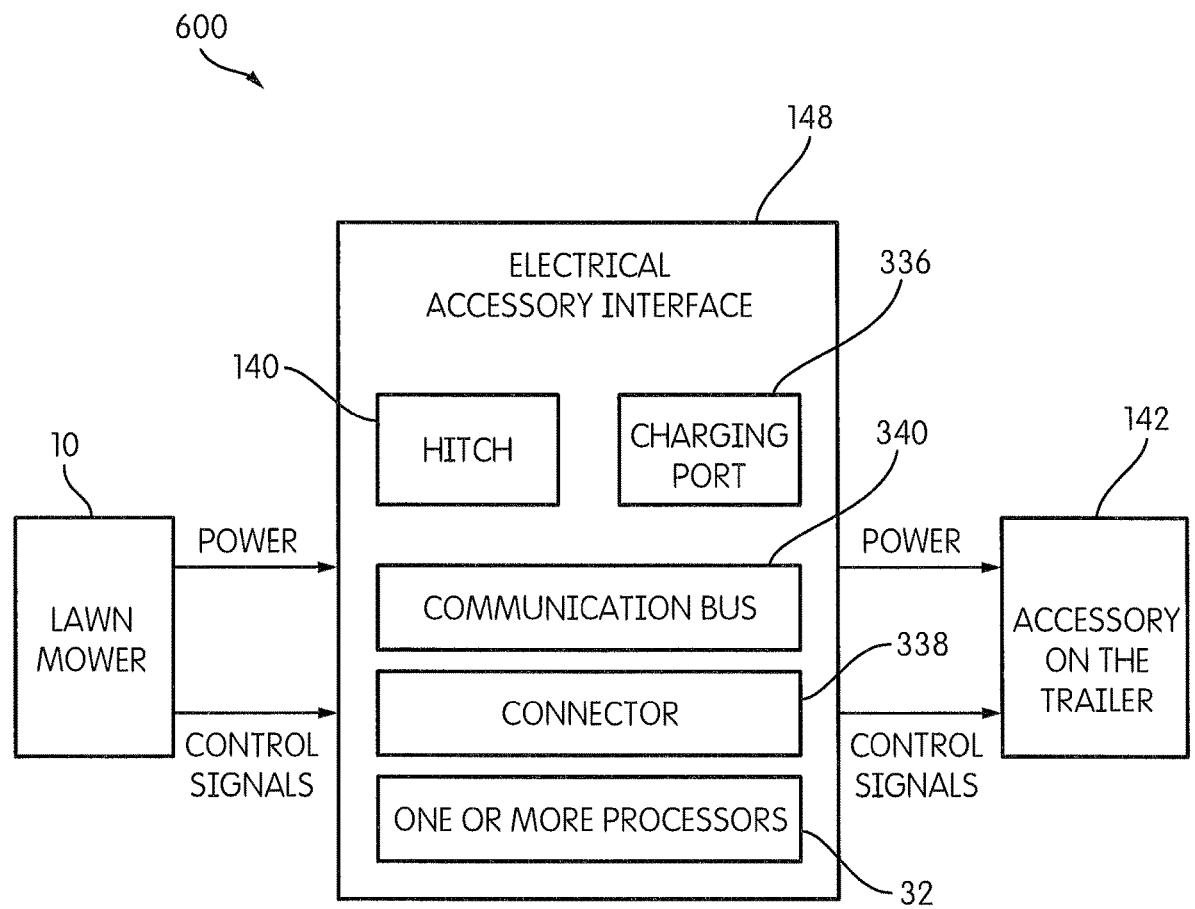
FIG. 23A shows an exemplary block diagram of a system for providing one or more wired or wireless power and/or communication connections to control one or more accessories on the trailer in accordance with an embodiment of the present patent application.

In one embodiment, as shown in FIGS. 22-23A, an electrical accessory interface 148 for the electrically powered lawn tractor/mower 10 is provided. In one embodiment, the electrical accessory interface 148 includes mechanical means (e.g., hitch 140) for attaching the accessory 142 thereto. In one embodiment, the electrical accessory interface 148 is also referred to as electrical control and communication interface. In one embodiment, the electrical accessory interface 148 is configured to provide only power to operate the accessory 142. In one embodiment, the electrical accessory interface 148 is configured to provide only control signals to control the accessory 142. In one embodiment, the electrical accessory interface 148 is configured to provide both power to operate the accessory 142 and control signals to control the accessory 142. In one embodiment, the control signals include an on control signal to start the accessory 142, an off control signal to stop the accessory 142, a speed control signal to adjust/control the speed of the accessory 142, a height control signal to adjust/control the height of the accessory 142, an angle control signal to adjust/control the angle of the accessory 142, a direction control signal to adjust/control the direction of travel of the accessory 142, etc.

In one embodiment, the electrical accessory interface 148 on the lawn and garden tractor 10 comprises a port 336 to allow charging the tractor battery 48. In one embodiment, the accessory port is configured to allow for charging of the lawn tractor 10 as well as operating the accessory 142. In one embodiment, a connector 338 is configured to allow the battery power connections and control signals to be accessible to a charger. In one embodiment, the accessory port uses communication bus to determine charge scheme/operation.

In one embodiment, as shown in FIGS. 22 and 23, the system with the accessory interface 148 is configured to enable the development of lawn and garden tractor implements 142 for lawn tractors/mowers 10 that are electrically powered and do not have an internal combustion engine to power a mechanical power take off. In one embodiment, the accessory interface 148 provides an electrical connection to the lawn tractor battery for powering to drive motors/actuators/lights of the implement 142 and a connection to an electrical communication bus 340 to provide control inputs to the implement 142.

In one embodiment, the electrical communication bus 340 is integrated to any control bus on the lawn tractor/mower 10 or it is independent. In one embodiment, by utilizing a control bus that is connected to the lawn tractor's control systems, the implement/accessory is controlled via the human machine interface 40 that already exists on the lawn tractor/mower 10.

In one embodiment, the lawn mower 10 includes an electrically operated accessory 142. In one embodiment, the electrically operated accessory 142 is configured to receive power through the complimentary electrical accessory interface 148. In one embodiment, the electrically operated accessory 142 is configured to receive control signals through the complimentary electrical accessory interface 148. In one embodiment, the electrically operated accessory 142 is configured to receive power and control signals through the complimentary electrical accessory interface 148. In one embodiment, the control signals include an on control signal to start the accessory 142, an off control signal to stop the accessory 142, a speed control signal to adjust/control the speed of the accessory 142, a height control signal to adjust/control the height of the accessory 142, an angle control signal to adjust/control the angle of the accessory 142, a direction control signal to adjust/control the direction of travel of the accessory 142, etc. In one embodiment, the electrically operated accessory 142 includes mechanical means for attaching the accessory 142 to the electrical accessory interface 148.

In one embodiment, the system 700 is configured to implement control algorithms wherein the implement/accessory 142 has features such as matching accessory speed to wheel speed or stopping the forward motion of the tractor should the accessory 142 detect a fault or jam. In one embodiment, if a wireless gateway is part of the communication bus on the lawn tractor 10 or the accessory 142, the control of the implement/accessory 142 is achieved via an app/application on a wireless device 152 such as a smartphone.

As described in detail below, the electrically operated accessory 142 is configured to receive power from an adaptor 156.

In one embodiment, the lawn mower 10 includes the adapter 156 that is configured to allow the electrically operated accessory 142 to be used on the lawn tractor 10, which does not have the electrical accessory interface 148. In one embodiment, the adaptor 156 includes a battery to power the electrically operated accessory 142. In one embodiment, the adaptor 156 includes a gateway to connect the control signals from the accessory 142 to another device. In one embodiment, the other device is a smartphone running a control app/application on a wireless device 152 such as a smartphone. In one embodiment, the adaptor 156 includes a dedicated remote control panel that is configured to operate the attached accessory 142. In one embodiment, a controlling device (with one or more processors) is wired or wirelessly connected to the adapter gateway. In one embodiment, the adapter 156 includes universal mounting points to attach to a variety of electrically operated accessories 142. In one embodiment, the adapter 156 or a supplemental adapter is configured to provide a mechanical interface to differing mounting systems for lawn and garden tractors 10.

In one embodiment, the adapter 156 allows mechanical attachment to the lawn tractor/mower 10 with non-electrically enabled mounting point. In one embodiment, the adapter 156 is configured to allow a separate battery or configured to be integral to power the electrically operated implement 142. In one embodiment, the adapter 156 includes a wired or wireless gateway to provide the control signals for the electrically operated accessory/implement 142. In one embodiment, the gateway is configured to connect to a wired or wireless controller or a smartphone app/application on a wireless device 152.

In one embodiment, a method of communicating with an electrically operated accessory 142 to download characteristic information is provided. In one embodiment, the method is configured to customize displays and menus that present the operator with configuration information/options. In one embodiment, the method is configured to display operating parameters to the operator. In one embodiment, the method is configured to customize controls on the dashboard of the lawn mower 10 to control the accessory 142. In one embodiment, the method is configured to allow the addition of supplemental control devices (levers, buttons etc.) onto the communication bus. In one embodiment, the method is configured to allow for code or script execution to provide additional control.

Figure 27:
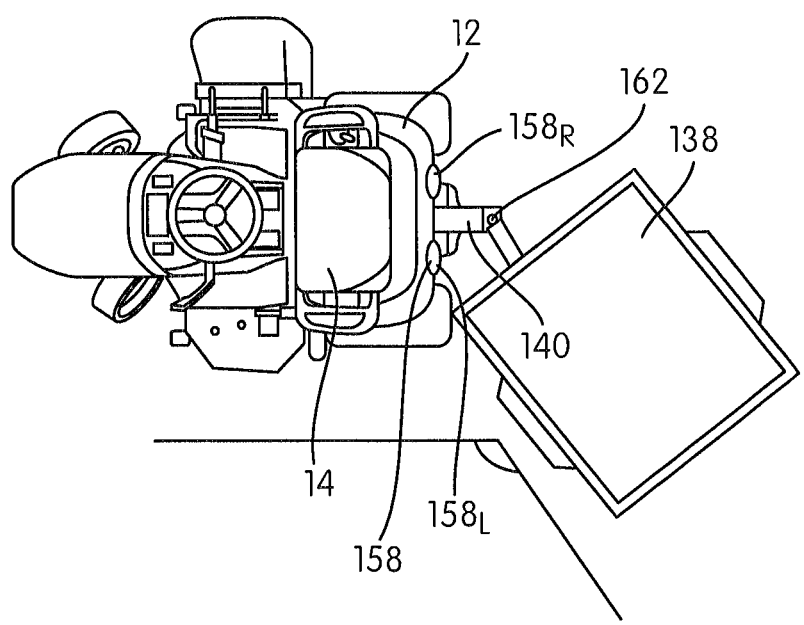
FIG. 27 shows a perspective view of the lawn mower and the trailer removably coupled thereto, the lawn mower having a stability control system in accordance with an embodiment of the present patent application.
Figure 28:
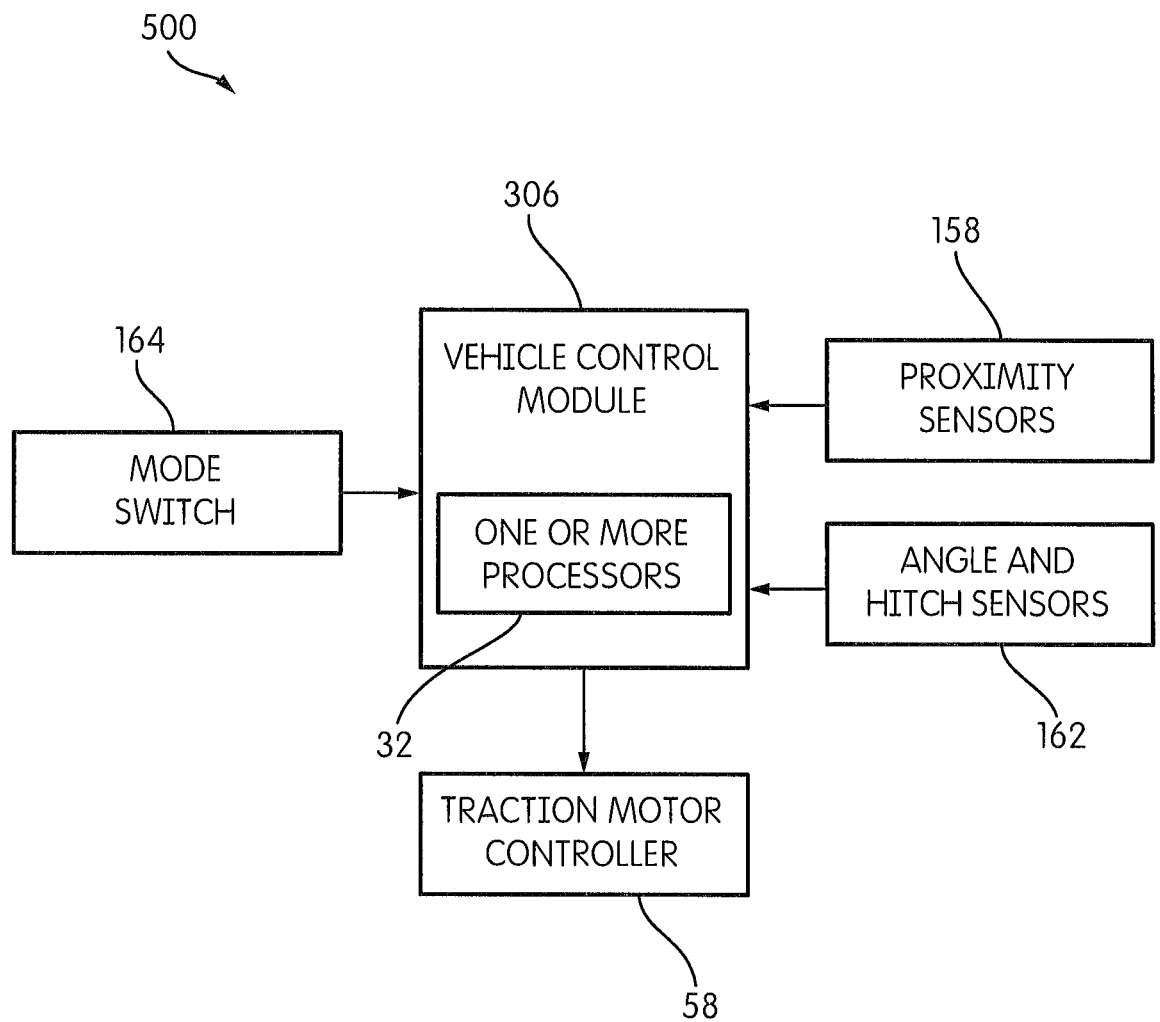
FIG. 28 shows an exemplary block diagram of the stability control system for limiting movements of the lawn mower to avoid collision between the lawn mower and the trailer in accordance with an embodiment of the present patent application.

In one embodiment, referring to FIGS. 26-28, a sensor(s) 158, 162 is configured to detect the presence of the trailer 138 in an area proximate the lawn mower 10. In one embodiment, as will be clear from the detailed discussion below, the sensor(s) is selected from the group consisting of proximity sensor 158, angle sensor 162 and hitch sensor 162. In one embodiment, the one or more processors 32 are configured to: receive input from the sensor 158, 162, and limit, based on the input from the sensor 158, 162, movements of the lawn mower 10 to avoid collision between the lawn mower 10 and the trailer 138. In one embodiment, the one or more processors 32 are configured to limit, based on the input from the sensor 158, 162, rearward movements of the lawn mower 10 to avoid collision between the lawn mower 10 and the trailer 138. In one embodiment, the one or more processors 32 are further configured to determine, based on the input from the sensor 158, 162, a turn radius of the lawn mower 10 that is sufficient to avoid collision between the lawn mower 10 and the trailer 138.

In one embodiment, as the lawn mower 10 is operated, the measured distance from the left rear sensor on the lawn mower 10 and the measured distance from the right rear sensor on the lawn mower 10 provide an indication of the likelihood that the lawn mower 10 will collide with the trailer 138 during a turn. In one embodiment, when the lawn mower 10 is moving in a straight line, the left distance (i.e., measured distance from the left rear sensor on the lawn mower 10) and the right distance (i.e., measured distance from the right rear sensor on the lawn mower 10) will be equal. In one embodiment, as the lawn mower 10 starts to turn, the differential distance (i.e., right distance-left distance) increases or decreases until the radius of the turn of the lawn mower 10 is the same as the radius of the turn of the trailer 138. In one embodiment, if the absolute value of the rate of change of the differential distance is not zero (i.e., when the distance is measured to be below a threshold value), then the turn radius is reduced until absolute value of the differential distance starts to decrease to zero. In one embodiment, the threshold value is 2 inches.

In one embodiment, a hitch angle sensor is also used in determining if the lawn mower 10 and the trailer 138 are on a collision course. In one embodiment, when the lawn mower 10 is pulling the trailer 138 in a straight path, the angle is 180 degrees. In one embodiment, as the lawn mower 10 starts to turn, the angle decreases. In one embodiment, if the rate of decrease continues and does not return to zero prior to reaching an angle threshold, then the lawn mower 10's steering angle is reduced so that the rate of change of the angle is zero. In one embodiment, the angle threshold is dependent on the width of the trailer 138, the width of the lawn mower 10, the length of the hitch of the lawn mower 10 and the length of the trailers' tongue.

In one embodiment, for example, if the trailer 138 is 50 inches wide, the lawn mower 10 is also 50 inches wide, and the hitch is 10 inches long, then the trailer 138 collides with the lawn mower 10 when at an angle is measured to be approximately 137 degrees. The threshold angle is given by the following equation:

$$(\text{threshold angle}) = \arctan(((\text{Mower width})/2)/(\text{mower hitch length})) + \arctan(((\text{Trailer width})/2)/(\text{Trailer Tongue length})).$$

In one embodiment, the width of the lawn mower 10 and the length of the lawn mower's hitch are known to the manufacture of the lawn mower 10. In one embodiment, the trailer tongue and the width of the trailer 138 are not known to the manufacturer. In one embodiment, if the dimensions of the trailer 138 are not known, then the distance measuring transducers are used to calculate the trailer tongue length by the following formula:

$$(\text{trailer tongue length}) = ((\text{left transducer distance}) + (\text{right transducer distance}))/2 - (\text{mower hitch length}).$$

In one embodiment, the width dimension of the trailer 138 cannot be measured. In that case, if the width dimension of the trailer 138 is assumed to be equal to the width of the lawn mower 10, the calculation of the threshold angle provides stable results.

In one embodiment, the one or more processors 32 are further configured to provide input to the steering system 20 based on the determined turn radius.

In one embodiment, a stability control system 500 for a ZTR lawn mower is provided. In one embodiment, the ZTR lawn mower may be any lawn mower as described in detail throughout this patent application with the ZTR capability. In one embodiment, the lawn mower may be a different/special lawn mower with the ZTR capability. In one embodiment, the ZTR lawn mowers maneuver by independently applying torque to two or more drive wheels $24_R$, $24_L$. In one embodiment, an operator is configured to control the applied torque by either manipulating two levers or through a steering wheel mechanism 20. In one embodiment, a torque is applied to the drive wheels $24_R$, $24_L$ until both wheels $24_R$, $24_L$ are moving at the same rate of speed to move the lawn mower 10 directly forward. In one embodiment, to turn the lawn mower, more torque is applied to one wheel of the two drive wheels $24_R$, $24_L$ versus the other wheel of the two drive wheels $24_R$, $24_L$ so that the speed of one wheel $24_R$, $24_L$ is greater than the other wheel $24_R$, $24_L$. In one embodiment, a forward torque is applied to one wheel while reverse torque is applied to the other wheel to achieve a very tight or near zero radius turn. In one embodiment, a reverse torque is applied to both the drive wheels $24_R$, $24_L$ to move the lawn mower in a reverse direction. When the trailer 138 is attached to the ZTR lawn mower 10, the turning ratio is so tight that the mower 10 can essentially turn into the trailer 138, causing a collision between the lawn mower 10 and the trailer 138.

In one embodiment, as shown in FIG. 28, the ZTR stability control system 500 includes proximity sensors 158, angle sensors 162, hitch sensors 162, the one or more processors 32, the traction motor controller 58, and a mode switch 164.

In one embodiment, the operator may indicate to an electronic circuit (i.e., the one or more processors 32 of the vehicle control module 306) through the mode switch 164 or other connected system such as a machine-operator interface that the trailer 138 is attached to the lawn mower 10. In one embodiment, the one or more processors 32 of the vehicle control module 306 are configured to determine the mode that it is in based on either the mode switch 164 or a hitch sensor switch 162. In one embodiment, if a trailer 138 is indicated, then the one or more processors 32 of the vehicle control module 306 are configured to limit operation of the traction motors $T_R$, $T_L$. In one embodiment, if a trailer 138 is not indicated, then the one or more processors 32 of the vehicle control module 306 are configured to not limit operation of the traction motors $T_R$, $T_L$.

In one embodiment, the sensors 162 may automatically detect the presence of the trailer based on a switch 164 in the trailer hitch 140. In one embodiment, if the one or more processors 32 of the vehicle control module 306 are configured to detect the attached trailer or is switch to a state to behave as if the trailer is attached, the one or more processors 32 of the vehicle control module 306 are configured to limit the turning radius of the lawn mower 10 to prevent the possibility of the trailer 138 colliding with the lawn mower 10 in the forward direction and limiting the possibility of the trailer 138 colliding with the lawn mower 10 in the reverse direction. In one embodiment, additional proximity sensors 158 may also be incorporated into the lawn mower 10 to detect if the attached trailer 138 is about to collide with the lawn mower 10 and limit only reverse trajectories that will not allow for a collision between the lawn mower 10 and the trailer 138.

In one embodiment, the one or more processors 32 of the vehicle control module 306 are configured to provide stability control for the ZTR lawn mower 10. In one embodiment, the one or more processors 32 of the vehicle control module 306 are configured to intercept the operator control interfaces (either levers or steering wheel mechanism 20), to calculate modified control parameters and then apply torque to the drive motors ($T_R$, $T_L$ as shown in FIGS. 24 and 26, for example) through actuators to the transmissions or directly through the control of electric motor current.

In one embodiment, the applied torque to each independent wheel $24_L$, $24_R$ can be controlled by the one or more processors 32 of the vehicle control module 306. In one embodiment, in the case of a hydraulically driven transmission, the wheel torque can be controlled using an electrically controlled actuator applied to the transmission control input. In one embodiment, the electrically controlled actuator is part of the traction motor controller 58. In one embodiment, if the ZTR drive wheels $24_L$, $24_R$ are powered by the electric motors 18, the motor currents can be controlled by the one or more processors 32 of the vehicle control module 306. In one embodiment, the motor current determines the applied torque of the motor 18.

In one embodiment, when the ZTR system includes the proximity sensors 158, the one or more processors 32 of the vehicle control module 306 are configured to determine distance to left proximity sensor $158_L$ and compare the distance to the left proximity sensor $158_L$ to a predefined threshold. In one embodiment, if the distance to the left proximity sensor $158_L$ is less than the predefined threshold, then the one or more processors 32 of the vehicle control module 306 are configured to move the left traction motor $T_L$ a forward direction at a speed that is greater than the right traction motor $T_R$. In one embodiment, if the distance to the left proximity sensor $158_L$ is less than the predefined threshold, then the one or more processors 32 of the vehicle control module 306 are configured to move the right traction motor $T_R$ in a reverse direction. In one embodiment, the predefined threshold is between 1 and 12 inches.

In one embodiment, when the ZTR system includes the proximity sensors 158, the one or more processors 32 of the vehicle control module 306 are configured to determine distance to right proximity sensor $158_R$ and compare the distance to the right proximity sensor $158_R$ to a predefined threshold. In one embodiment, if the distance to the right proximity sensor $158_R$ is less than the predefined threshold, then the one or more processors 32 of the vehicle control module 306 are configured to move the right traction motor $T_R$ in a forward direction at a speed that is greater than the left traction motor $T_L$. In one embodiment, if the distance to the right proximity sensor $158_R$ is less than the predefined threshold, then the one or more processors 32 of the vehicle control module 306 are configured to move the left traction motor $T_L$ in a reverse direction. In one embodiment, the predefined threshold is between 1 and 12 inches.

In one embodiment, when the ZTR system includes the proximity sensors 158, the one or more processors 32 of the vehicle control module 306 are configured to determine distance to both left and right proximity sensors $158_L$, $158_R$ and compare the distance to the left and right proximity sensors $158_L$, $158_R$ to a predefined threshold. In one embodiment, if the distance to the left and right proximity sensors $158_L$, $158_R$ is greater than the predefined threshold, then the one or more processors 32 of the vehicle control module 306 are configured to move either the right traction motor $T_R$ or the left traction motor $T_L$ in either a forward direction or a reverse direction. In one embodiment, the predefined threshold is between 1 and 12 inches.

In one embodiment, when the ZTR system includes the angle sensors 162, the one or more processors 32 of the vehicle control module 306 are configured to determine an angle between the mower hitch 140 and trailer tongue and compare the angle between the mower hitch 140 and trailer tongue to a left predefined angle. In one embodiment, the left predefined angle is less than 180 degrees. In one embodiment, if the angle between the mower hitch 140 and trailer tongue is less than the left predefined angle, then the one or more processors 32 of the vehicle control module 306 are configured to move the left traction motor $T_L$ in a forward direction at a speed that is greater than the right traction motor $T_R$. In one embodiment, if the angle between the mower hitch 140 and trailer tongue is less than the left predefined angle, then the one or more processors 32 of the vehicle control module 306 are configured to move the right traction motor $T_R$ in a reverse direction. In one embodiment, the left predefined angle is between 130 and 160 degrees.

In one embodiment, when the ZTR system includes the angle sensors 162, the one or more processors 32 of the vehicle control module 306 are configured to determine an angle between the mower hitch 140 and trailer tongue and compare the angle between the mower hitch 140 and trailer tongue to a right predefined angle. In one embodiment, the right predefined angle is greater than 180 degrees. In one embodiment, if the angle between the mower hitch 140 and trailer tongue is greater than the right predefined angle, then the one or more processors 32 of the vehicle control module 306 are configured to move the left traction motor $T_L$ in a forward direction at a speed that is greater than the right traction motor. In one embodiment, if the angle between the mower hitch 140 and trailer tongue is greater than the right predefined angle, then the one or more processors 32 of the vehicle control module 306 are configured to move the right traction motor $T_R$ in a reverse direction. In one embodiment, the right predefined angle is between 200 and 230 degrees.

In one embodiment, when the ZTR system includes the angle sensors 162, the one or more processors 32 of the vehicle control module 306 are configured to determine an angle between the mower hitch 140 and trailer tongue and compare the angle between the mower hitch 140 and trailer tongue to the right predefined angle and the left predefine angle. In one embodiment, if the angle between the mower hitch 140 and trailer tongue is greater than the right predefined angle and is less than the left predefine angle, then the one or more processors 32 of the vehicle control module 306 are configured to move either the left traction motor $T_L$ or the right traction motor $T_R$ in either a forward direction or a reverse direction.

The present patent application provides a stability control system 500 for a non-ZTR lawn mower. In one embodiment, when the non-ZTR system includes the proximity sensors 158, the one or more processors 32 of the vehicle control module 306 are configured to determine distance to left proximity sensor $158_L$ and compare the distance to the left proximity sensor $158_L$ to a predefined threshold. In one embodiment, if the distance to the left proximity sensor $158_L$ is less than the predefined threshold, then the one or more processors 32 of the vehicle control module 306 are configured to move the lawn mower only in a forward direction. In one embodiment, the predefined threshold is between 1 and 12 inches.

In one embodiment, when the non-ZTR system includes the proximity sensors 158, the one or more processors 32 of the vehicle control module 306 are configured to determine distance to right proximity sensor $158_R$ and compare the distance to the right proximity sensor to $158_R$ a predefined threshold. In one embodiment, if the distance to the right proximity sensor $158_R$ is less than the predefined threshold, then the one or more processors 32 of the vehicle control module 306 are configured to move the lawn mower only in a forward direction. In one embodiment, the predefined threshold is between 1 and 12 inches.

In one embodiment, when the non-ZTR system includes the proximity sensors 158, the one or more processors 32 of the vehicle control module 306 are configured to determine distance to both left and right proximity sensors $158_L$, $158_R$ and compare the distance to the left and right proximity sensors $158_L$, $158_R$ to a predefined threshold. In one embodiment, if the distance to the left and right proximity sensors $158_L$, $158_R$ is greater than the predefined threshold, then the one or more processors 32 of the vehicle control module 306 are configured to move lawn mower 10 in either a forward direction or a reverse direction. In one embodiment, the predefined threshold is between 1 and 12 inches.

In one embodiment, when the non-ZTR system includes the angle sensors 162, the one or more processors 32 of the vehicle control module 306 are configured to determine an angle between the mower hitch 140 and trailer tongue and compare the angle between the mower hitch 140 and trailer tongue to a left predefined angle. In one embodiment, the left predefined angle is less than 180 degrees. In one embodiment, if the angle between the mower hitch 140 and trailer tongue is less than the left predefined angle, then the one or more processors 32 of the vehicle control module 306 are configured to move the lawn mower 10 only in a forward direction. In one embodiment, the left predefined angle is between 130 and 160 degrees.

In one embodiment, when the non-ZTR system includes the angle sensors 162, the one or more processors 32 of the vehicle control module 306 are configured to determine an angle between the mower hitch 140 and trailer tongue and compare the angle between the mower hitch 140 and trailer tongue to a right predefined angle. In one embodiment, the right predefined angle is greater than 180 degrees. In one embodiment, if the angle between the mower hitch 140 and trailer tongue is greater than the right predefined angle, then the one or more processors 32 of the vehicle control module 306 are configured to move the lawn mower 10 only in a forward direction. In one embodiment, the right predefined angle is between 200 and 230 degrees.

In one embodiment, when the non-ZTR system includes the angle sensors 162, the one or more processors 32 of the vehicle control module 306 are configured to determine an angle between the mower hitch 140 and trailer tongue and compare the angle between the mower hitch 140 and trailer tongue to the right predefined angle and the left predefine angle. In one embodiment, if the angle between the mower hitch 140 and trailer tongue is greater than the right predefined angle and is less than the left predefine angle, then the one or more processors 32 of the vehicle control module 306 are configured to move the lawn mower 10 in either a forward direction or a reverse direction.

In one embodiment, referring to FIGS. 29-35, the lawn mower 10 includes a battery module 48 that is removably coupled to the frame 12 and configured to power the motor assembly 18. That is, in one embodiment, a removable energy storage system is provided for the electric lawn mowers 10. This is in contrast to traditional methods where the battery pack is not removable and is protected by a steel frame and body paneling.

In one embodiment, the lawn mower 10 may be a hybrid lawn mower. In one embodiment, the motor assembly 18 of the lawn mower 10 is configured to drive the wheels $24_R$, $24_L$, (as shown in FIGS. 24 and 26) so as to move the frame 12 along the ground surface 26. In one embodiment, the motor assembly 18 of the lawn mower 10 is powered by the first rechargeable battery module 48. In one embodiment, the lawn mower 10 may also include a different or another power source (e.g., gas or other power source) that is configured to drive the one or more blades 28 relative to the ground surface 26 to cut grass 30.

In one embodiment, the motor assembly 18 of the lawn mower 10 is configured both to drive the wheels $24_R$, $24_L$ (as shown in FIGS. 24 and 26) so as to move the frame 12 along the ground surface 26 and to drive the one or more blades 28 relative to the ground surface 26 to cut grass 30. In one embodiment, the motor assembly 18 of the lawn mower 10 is powered by the first rechargeable battery module 48.

In one embodiment, the tractor 10 is configured such that it can receive the primary battery 48 and an auxiliary battery pack 208. In one embodiment, the auxiliary battery pack 208 is smaller and typically used to power outdoor equipment or power tools. In one embodiment, the tractor 10 can be powered of the rechargeable auxiliary battery pack 208, the primary battery pack 48 or both. In one embodiment, the primary battery pack includes one or more battery cells. In one embodiment, the auxiliary battery pack includes one or more battery cells. In one embodiment, the primary battery 48 is referred to as the first battery module. In one embodiment, the primary battery 48 is a rechargeable battery. In one embodiment, the auxiliary battery pack 208 is referred to as the second battery module. In one embodiment, the auxiliary battery pack 208 is a rechargeable battery.

Referring to FIGS. 1-2, 4, 8-9, and 29-35, in one embodiment, the present patent application provides a method of charging the battery module 48 of the lawn mower 10. The lawn mower 10 comprises the frame 12 supported on the rotatable wheels 22, 24 for movement over a ground surface 26; the operator support 14 coupled to the frame 12 and configured to support the entire weight of an operator of the lawn mower 10 during use thereof; the blade assembly 16 comprising the one or more blades 28 that are configured to cut the grass 30 on the ground surface 26; the steering system 20 configured to manipulate the steering direction of the wheels 22, 24; the motor assembly 18 configured to drive the wheels 22, 24 so as to move the frame 12 along the ground surface 26; and the battery module 48 removably coupled to the frame 12 and configured to power the motor assembly 18. In one embodiment, the motor assembly 18 is configured to drive the one or more blades 28 relative to the ground surface 26 to cut the grass 30. In one embodiment, the motor assembly 18 is configured both to drive the wheels 22, 24 so as to move the frame 12 along the ground surface 26 and to drive the one or more blades 28 relative to the ground surface 26 to cut the grass 30.

The method comprises removing the battery module 48 from the lawn mower 10; recharging the battery module 48 by supplying a charge current from an external power source to the battery module 48; and reinserting the battery module 48 into the lawn mower 10 to facilitate mating between electrical contacts 210 or 212 of the battery module 48 and electrical contacts 210 or 212 of the lawn mower 10 so as to enable the battery module 48 to power the motor assembly 18 of the lawn mower 10.

In one embodiment, the reinserting procedure of the method further comprises: engaging a coupler 224 of the battery module 48 with a coupler 226 of the frame 12 of the lawn mower 10 without lifting the battery module 48 off the ground surface 26, the engagement between the couplers 224, 226 of the battery module 48 and the frame 12 provides a pivot axis; pivoting the battery module 48, about the pivot axis and through the couplers 224, 226 of the battery module 48 and the frame 12, into a battery compartment 38 in the frame 12 of the lawn mower 10; sliding the battery module 48 into the battery compartment 38 and into its final connected position on the frame 12 in which the electrical contacts 210 or 212 of the battery module 48 are mated with the electrical contacts 210 or 212 of the lawn mower 10 to enable the battery module 48 to power the motor assembly 18 of the lawn mower 10; and locking, using the latch 248, the battery module 48 in its final connected position. In one embodiment, the coupler 226 of the battery module 48 includes the pivot latch 224. In one embodiment, the coupler 226 of the frame 12 includes the pivot bar 226. In one embodiment, the removing procedure of the method further comprises disconnecting the latch 248 to remove the battery module 48 from the battery compartment.

Figure 29:
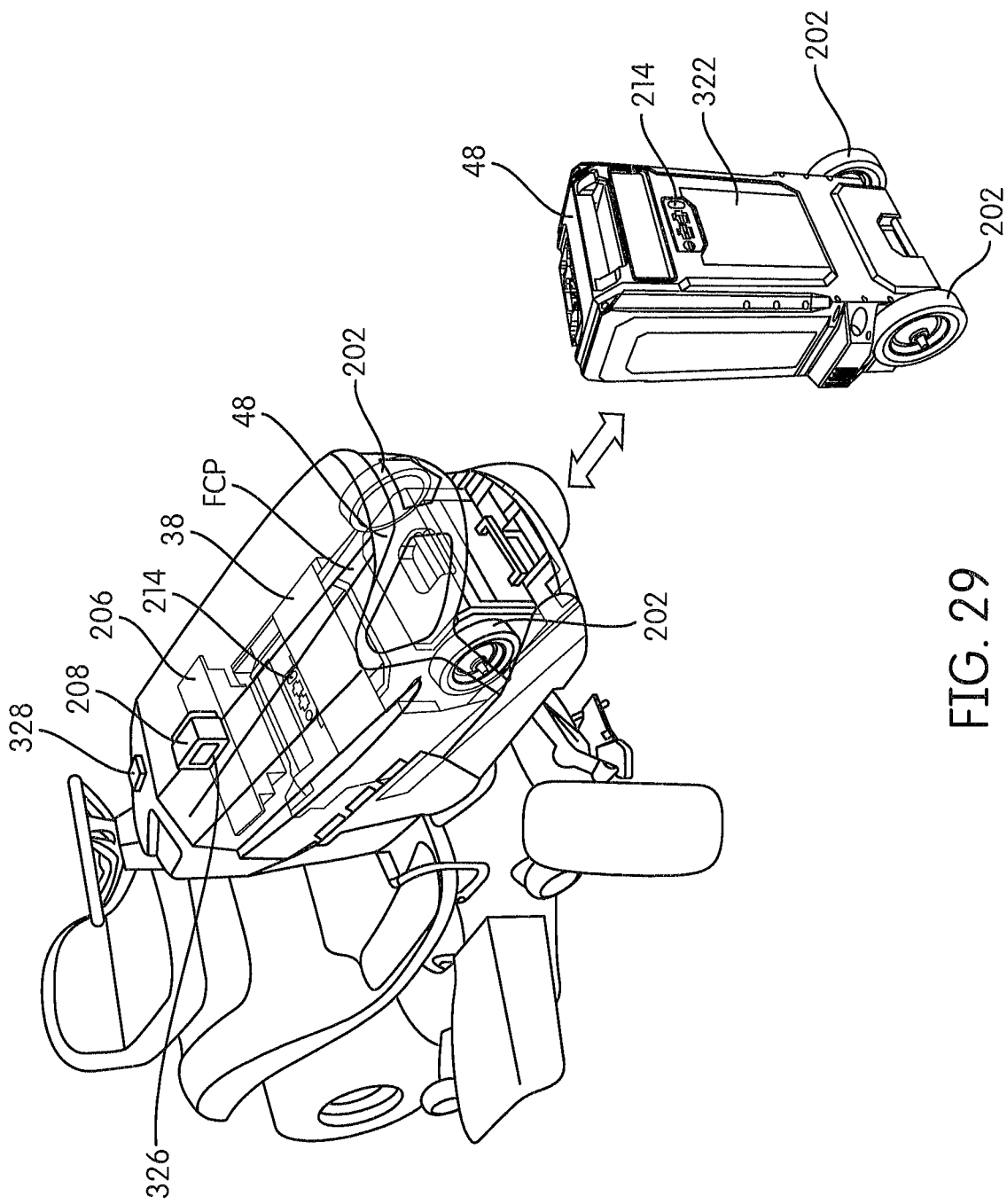
FIG. 29 shows a perspective view of the lawn mower and a battery module removably coupled thereto in accordance with an embodiment of the present patent application.

In another embodiment, the primary battery 48 may be charged while the primary battery 48 is still in the battery compartment 38 of the lawn mower 10 (i.e., charged without removing the primary battery 48 from the battery compartment 38 of the lawn mower 10). That is, as shown in FIG. 29, the battery charge port 214 of the primary battery 48 is exposed and is accessible when the primary battery 48 is still in the battery compartment 38 of the lawn mower 10 such that a charge current from an external power source is transferred to the primary battery 48 in the battery compartment 38 of the lawn mower 10 via the battery charge port 214.

In one embodiment, a method of operating the lawn mower 10 is provided. The lawn mower 10 comprises the frame 12 supported on the rotatable wheels 22, 24 for movement over a ground surface 26; the operator support 14 coupled to the frame 12 and configured to support the entire weight of an operator of the lawn mower 10 during use thereof; the blade assembly 16 comprising the one or more blades 28 that are configured to cut the grass 30 on the ground surface 26; the steering system 20 configured to manipulate the steering direction of the wheels 22, 24; the motor assembly 18 configured to drive the wheels 22, 24 so as to move the frame 12 along the ground surface 26; and the battery module 48 and the battery module 208 both removably coupled to the frame 12 and configured to power the motor assembly 18. In one embodiment, the motor assembly 18 is configured to drive the one or more blades 28 relative to the ground surface 26 to cut the grass 30. In one embodiment, the motor assembly 18 is configured both to drive the wheels 22, 24 so as to move the frame 12 along the ground surface 26 and to drive the one or more blades 28 relative to the ground surface 26 to cut the grass 30.

In one embodiment, the method comprises providing power solely from the first rechargeable battery module 48 to the motor assembly 18 to drive the wheels 22, 24 of the lawn mower 10; and providing power solely from the second rechargeable battery module 208 to the motor assembly 18 when the charge of the first battery module 48 is depleted so as to drive the wheels 22, 24 of the lawn mower 10.

Figure 32:
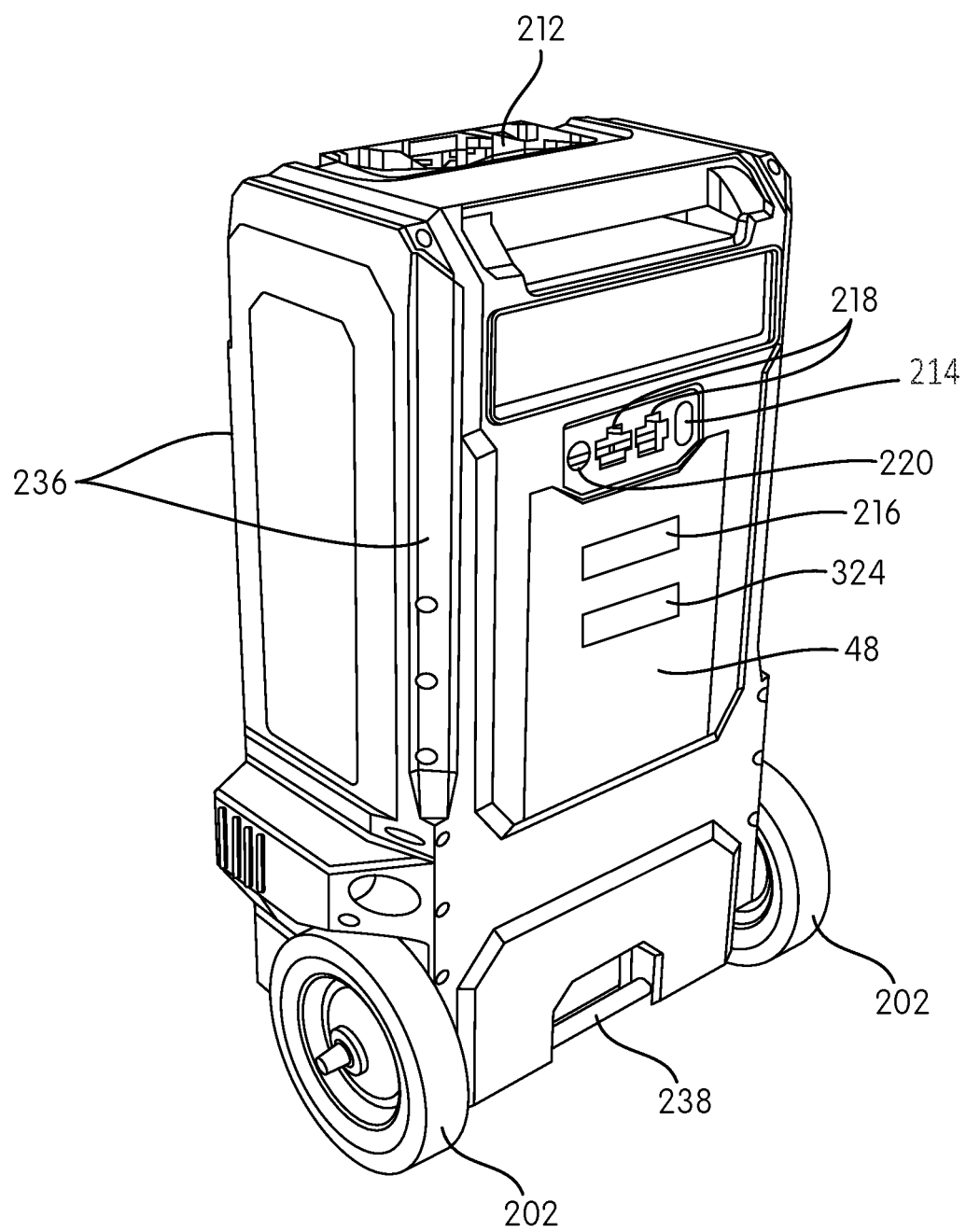
FIGS. 32 and 33 show perspective views of the battery module in accordance with an embodiment of the present patent application.
Figure 33:
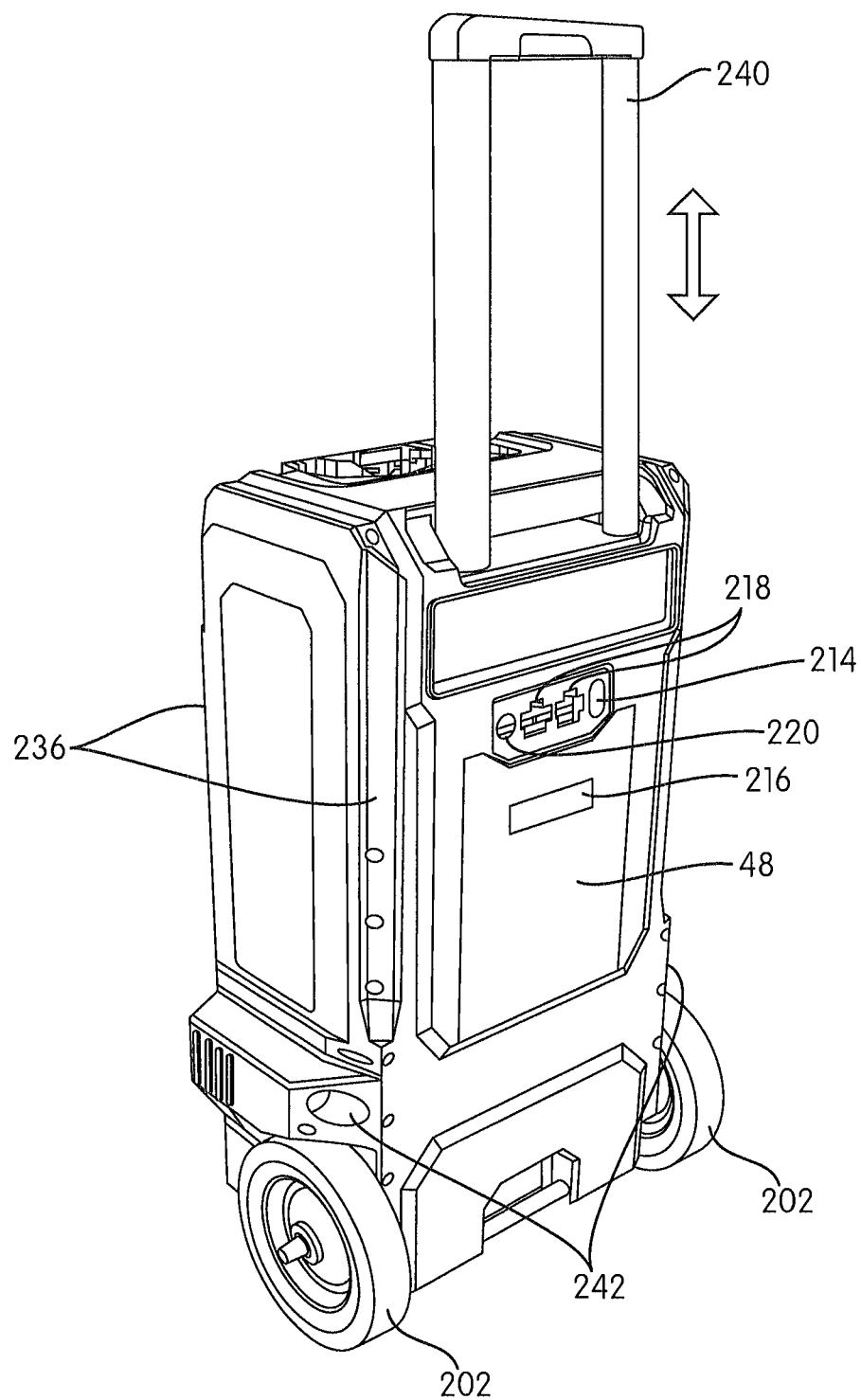

In one embodiment, referring to FIGS. 32 and 33, the primary battery module 48 includes wheels 202 mounted towards the bottom of the battery module 48 for rotation about an axis to provide rolling support for the battery module 48 and a manually engageable pulling/transport handle 240. In one embodiment, the handle 240 and the ground engaging wheels 202 are arranged to enable the operator to manually pull the handle 240 generally rearwardly so as to tilt the primary battery 48 rearwardly to a tilted rolling movement position, thereby enabling the operator to roll the primary battery 48 to a desired location by pushing or pulling the handle 240 in a desired direction.

In one embodiment, the handle 240 is made of metal, plastic, wood, or other materials. In one embodiment, rubber or other anti-slip material is provided on the surface of the handle 240 to facilitate the grasping of the handle 240. In one embodiment, the handle 240 is constructed and arranged to be extendable. It is also contemplated that the handle 240 may have other configurations, shapes, and arrangements.

In one embodiment, the handle 240 includes a telescopic handle member and a frame member. When the handle 240 is to be extended, the handle 240 is pulled upwards, thereby causing the telescopic handle member to move relative to the frame member. In one embodiment, the primary battery module 48 also includes a handle actuator that is actuatable to release/move a lock member of the handle 240 from a lock position to a release position wherein the handle 240 can be extended (as shown in FIG. 33) or retracted (as shown in FIG. 32).

In one embodiment, each of the wheels 202 is a molded structure reinforced by a plurality of wheel ribs 318 and each wheel 202 is mounted on an end of an elongated axle by two hubs or other appropriate structure. In one embodiment, the axle 320 is an elongated cylindrical shaft 320 that is snap fit into rotational engagement with a receiving structure of the primary battery housing 322 in conventional fashion. Alternatively, the axle can be mounted to the primary battery housing through a pair of axially aligned through-holes formed in the primary battery housing. The wheels 202 may have rubber treads or other anti-slip material provided on the surface to provide friction with the ground 26 when the primary battery 48 is to be rolled from one location to another.

Figure 31:
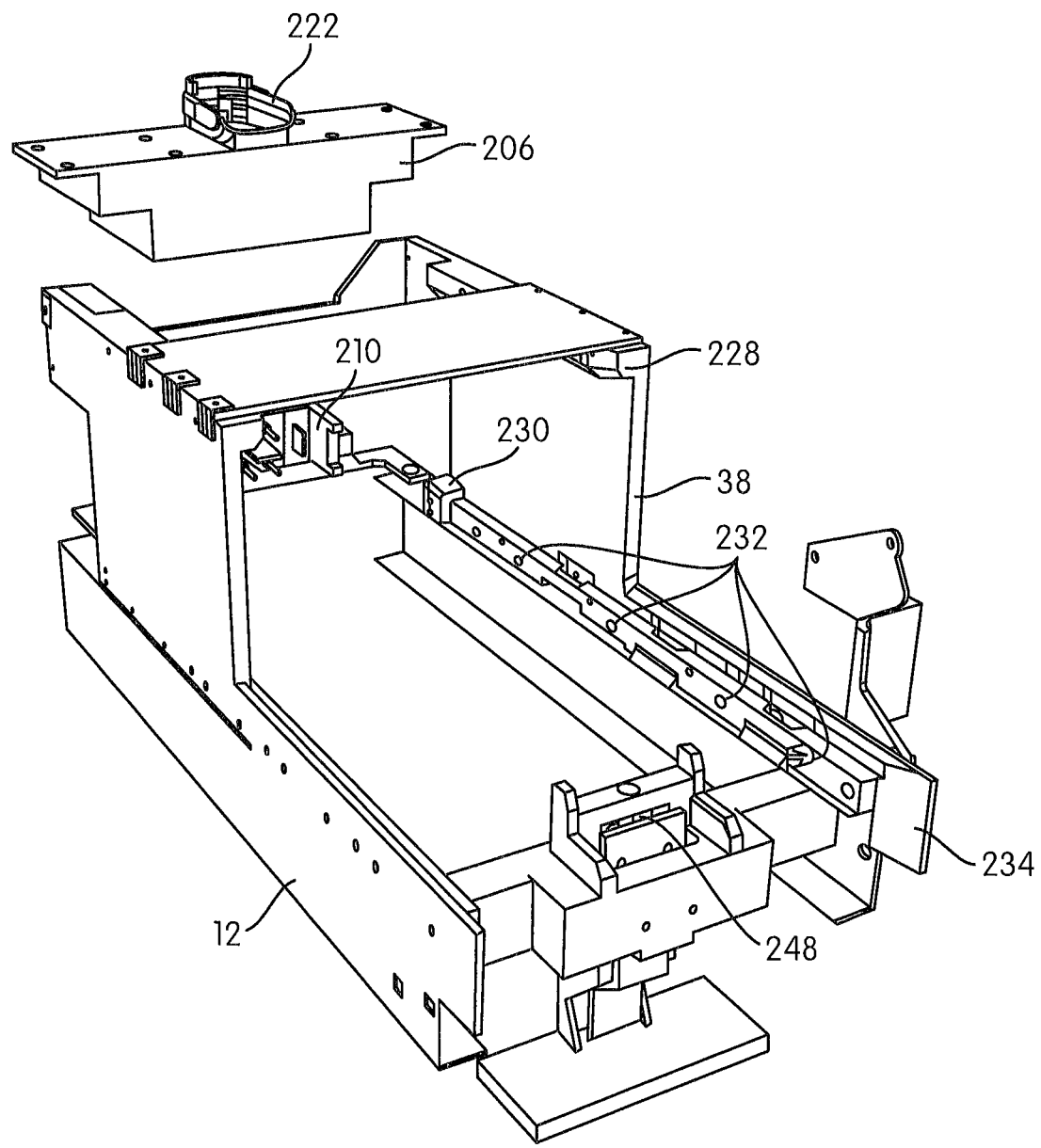
FIG. 31 shows a partial perspective view of the lawn mower with a battery module compartment therein in accordance with an embodiment of the present patent application.

In one embodiment, referring to FIGS. 31-33, the lawn mower frame 12 includes a male terminal block 210 that is configured to engage with a female terminal block 212 disposed on the battery module 48. In one embodiment, the lawn mower 10 includes a female terminal block 210 that is configured to engage with a male terminal block 212 disposed on the battery module 48.

In one embodiment, referring to FIGS. 32 and 33, the battery module 48 includes one or more AC power outlets 218 for powering tools and/or accessory equipment. In one embodiment, the battery module 48 includes an on-off switch 220 for the inverter. In one embodiment, additional electrical components can be added to the battery pack 48 to add functionality such as lights, Inverters, USB ports, interfaces, radios, receivers, additional controllers, or other electrical I/O ports.

In one embodiment, referring to FIGS. 32 and 33, the battery module 48 includes a battery charge port 214 that is configured to transfer charge current from an external power source to the lawn mower 10. In one embodiment, the charge port 214 is a conductive charge port. In one embodiment, the battery module 48 is charged by plugging a charge connector of the external power source into the charge port 214 of the lawn mower 10. In one embodiment, the charge current from the external power source conducts through the connected charge connector of the external power source and charge port 214 to the battery module 48. In one embodiment, the battery module 48 includes an inductive charge port 324 that allows the operator to easily and safely charge the battery module 48 without any type of conventional electrical plug.

In one embodiment, the battery module 48 and/or battery module 208 are charged using a charging mechanism that is selected from the group consisting of inductive charging, conductive charging, wireless charging and other charging technologies as would be appreciated by one skilled in the art.

In one embodiment, referring to FIGS. 32 and 33, the battery module 48 has a state of the charge indicator 216 that is configured to display state-of-charge of the battery module 48. For example, the state of the charge indicator includes a plurality of indicators (LEDs) that will display the state-of-charge at 0%, 25%, 50%, 75% and 100%. In one embodiment, the plurality of indicators (LEDs) includes colored LEDs. For example, a green LED may display the state-of-charge at 75% and 100%, a yellow LED may display the state-of-charge at 25% and 50%, and a red LED may display the state-of-charge at 0%.

Figure 30:
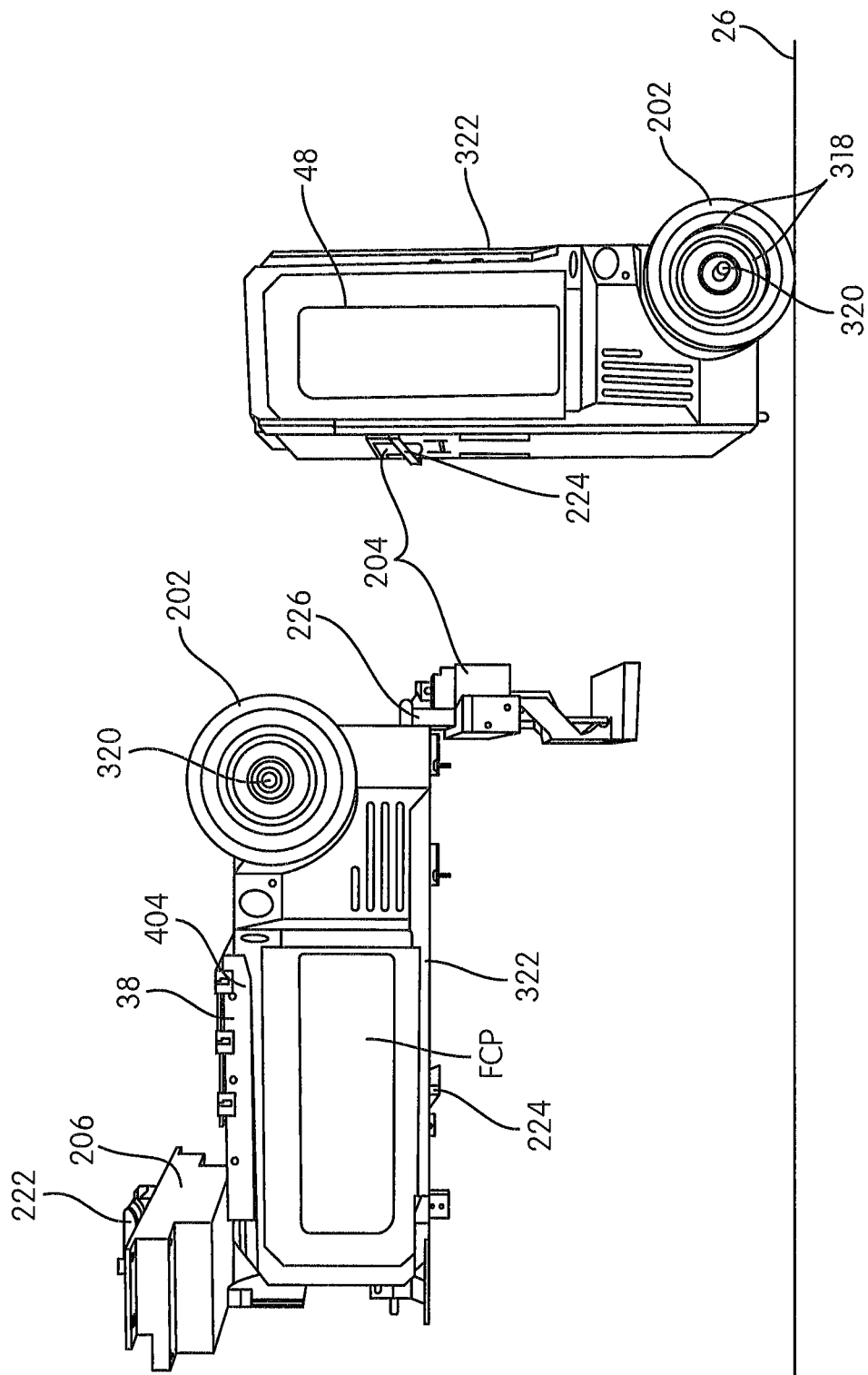
FIG. 30 shows perspective views of the battery module in accordance with an embodiment of the present patent application.
Figure 30A:
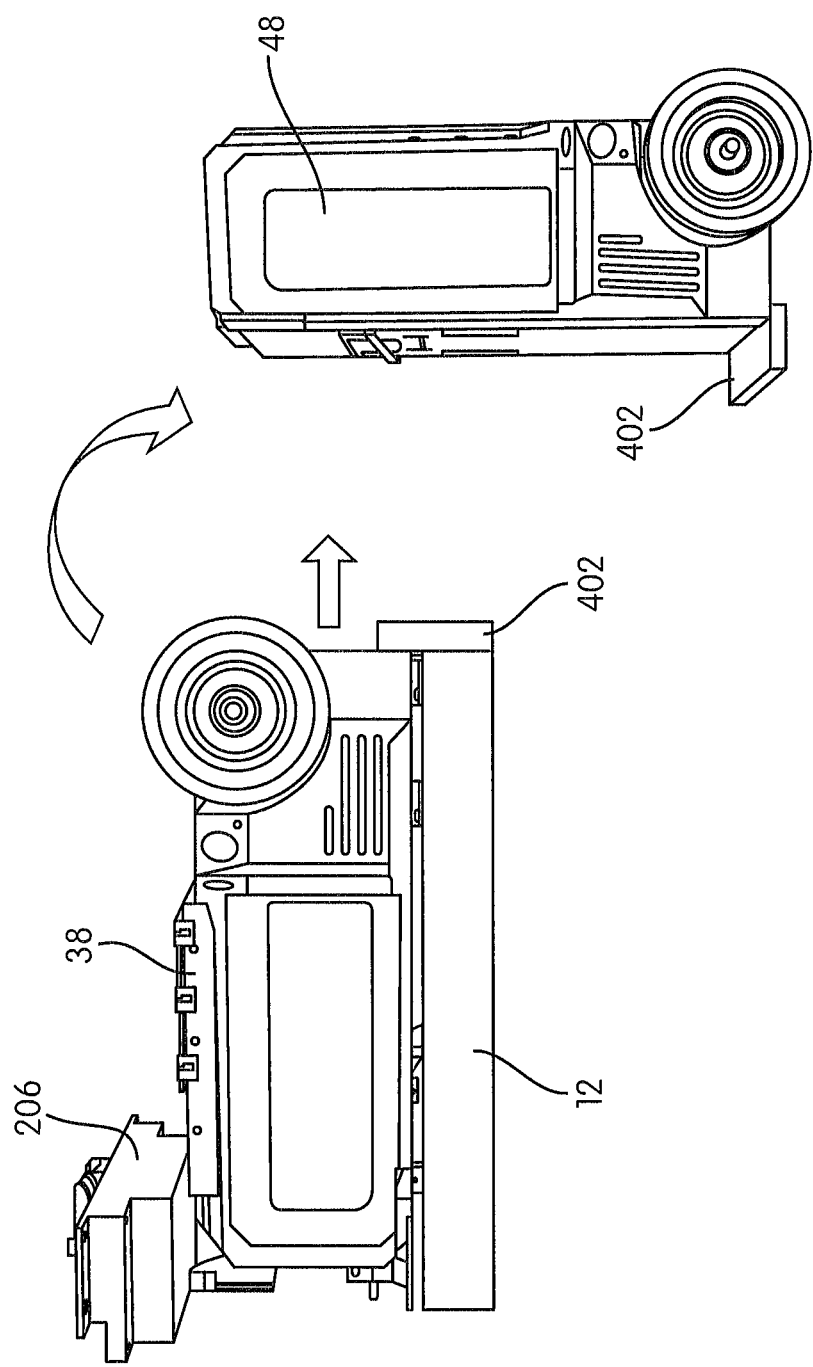
FIG. 30A shows perspective views of the battery module in accordance with another embodiment of the present patent application.

In one embodiment, referring to FIGS. 30, 30A and 31, the lawn mower 10 includes battery internal support structure 38. In one embodiment, the lawn mower 10 includes the primary battery support structure 38 and the auxiliary battery support structure 206. In one embodiment, the primary battery pack 48 has components 402 on the bottom of the battery 48 that act as a bumper 402 in the event of a collision. In one embodiment, the components interface with the tractor 10 in such a way that when a load is applied, the energy is transferred to the tractor 10 and the battery internal support structure, not to the outer housing 322 of the battery pack 48 or the battery pack cells.

Figure 34:
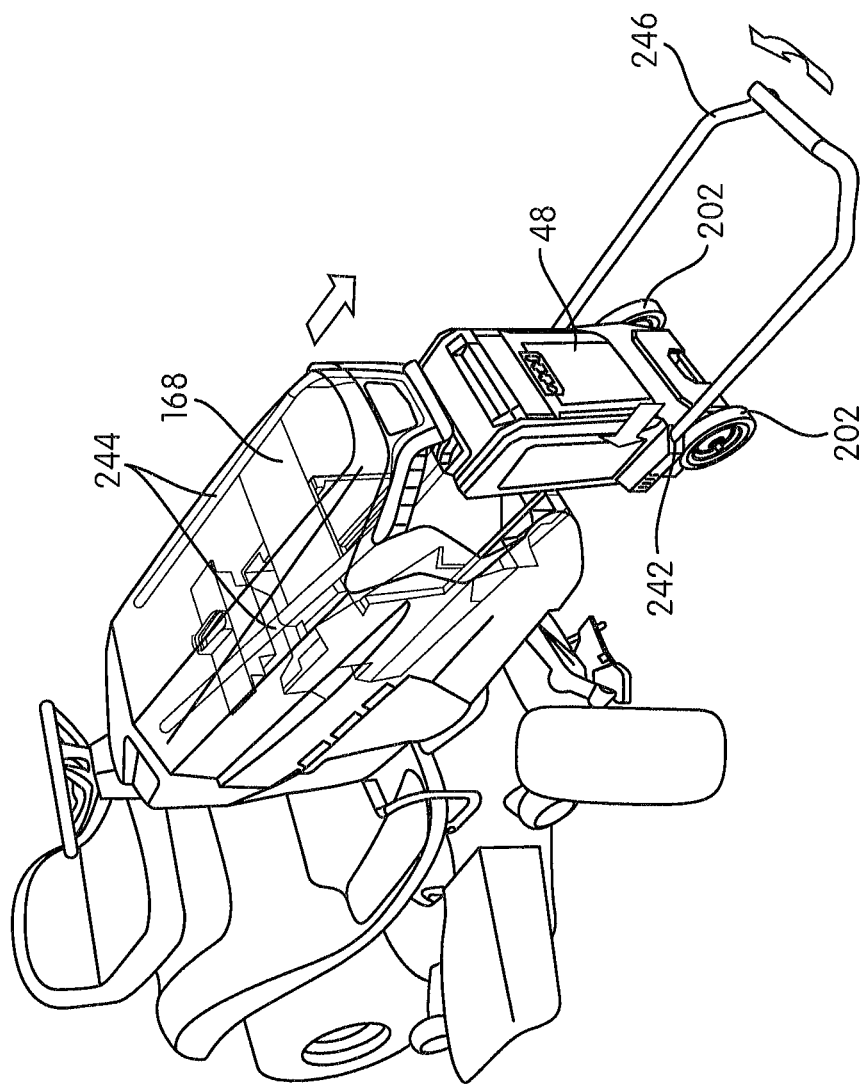
FIG. 34 shows a perspective view of the lawn mower and the battery module removably coupled thereto in accordance with an embodiment of the present patent application.

In one embodiment, as shown in FIG. 34, the lawn mower 10 includes a lift assist handle 246 to help/assist the operator load the primary battery 48 into the battery compartment 38 of the trailer 10. In one embodiment, the lift assist handle 246 is stored in (lift assist handle capture) grooves 244 in the hood 168 when the lift assist handle 246 not in use. In one embodiment, the lift assist handle 246 is removed from the grooves 244 in the hood 168 and the lift assist handle 246 is then engaged with lift assist handle grooves 242 disposed on the battery module 48 when needed or during use (i.e., load the primary battery 48 into the battery compartment 38 of the trailer 10).

In one embodiment, the battery compartment 38 in the frame 12 includes course guides 234, precision guides 230, fine guides 228 and rollers 232 that are configured to engage with guide rail interface 236 disposed on the primary battery module 48 to facilitate the sliding movement of the battery module 48 into the battery compartment 38 of the lawn mower 10.

In one embodiment, as shown in FIG. 32, the lawn mower 10 includes an installation handle 238 that is configured to enable the operator grasp the primary battery 48 when the primary battery 48 is being lifted into the battery compartment 38 of the lawn mower 10.

Figure 35:
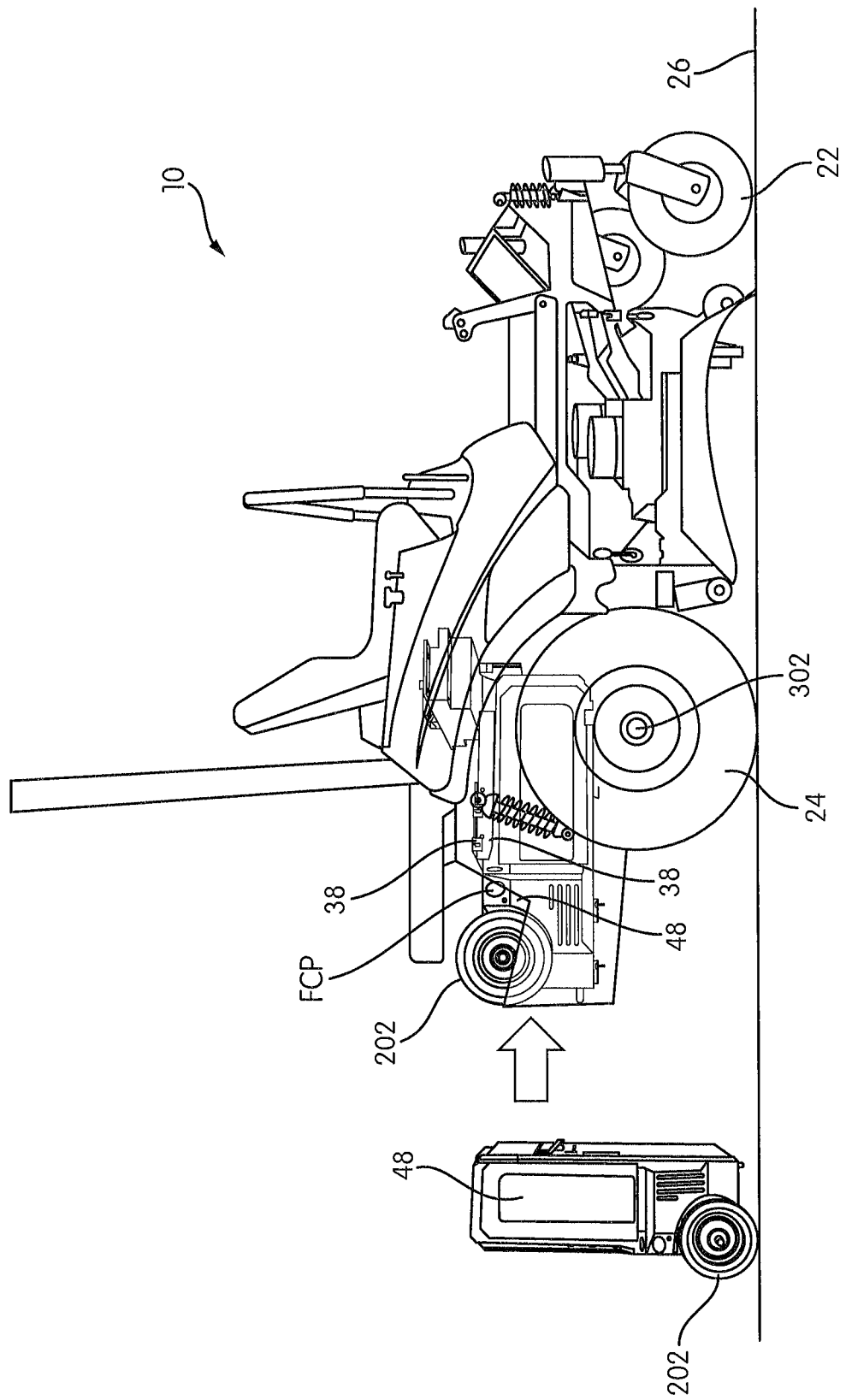
FIG. 35 shows a perspective view of the lawn mower and the battery module removably coupled thereto in accordance with another embodiment of the present patent application.

In one embodiment, referring to FIGS. 30 and 31, a coupling 204 of the battery module 48 engages the battery module 48 with the frame 12 without lifting the battery module 48 off the ground 26. In one embodiment, the coupling 204 facilitates manipulation of the battery module 48 into its final connected position FCP (as shown in FIGS. 29, 30 and 35) on the frame 12, including lifting of the battery module 48 through the coupling 204.

In one embodiment, the coupling 204 includes a pivot bar 226 that is disposed on the frame 12 of the lawn mower 10 and a pivot latch 224 disposed on the primary battery 48.

In one embodiment, the primary battery pack 48 is configured to be wheeled (on the wheels 202) into position and aligned using with at least one locating feature. In one embodiment, when the primary battery 48 is aligned with the locating feature, the pivot latch 224 disposed on the primary battery 48 interacts with the pivot bar 226 that is disposed on the tractor 10.

Figure 34A:
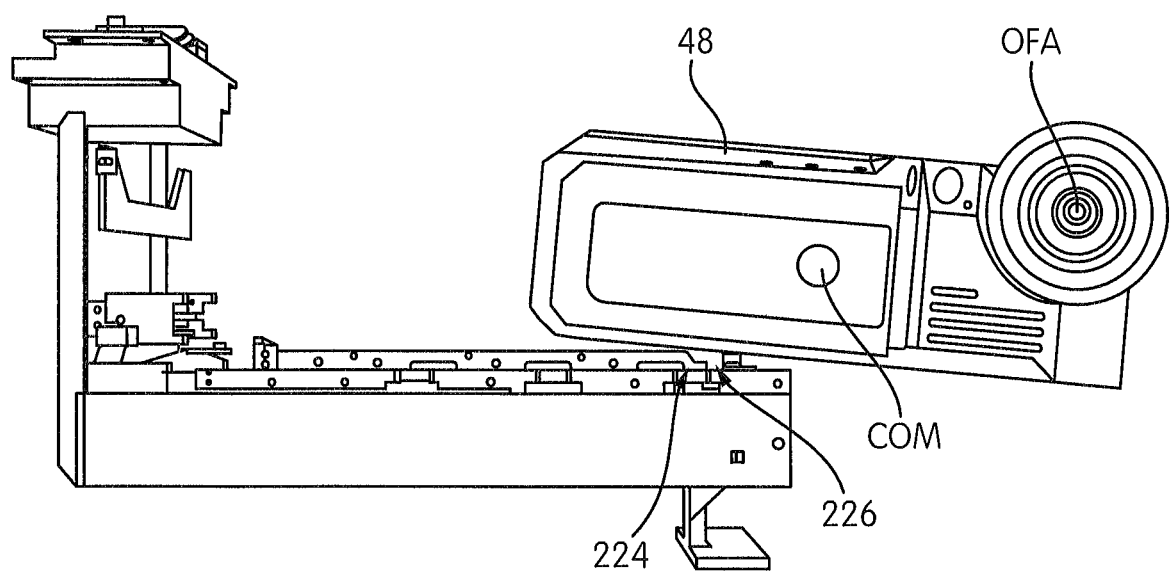
FIG. 34A shows a partial perspective view of the lawn mower and the battery module being removably coupled thereto in accordance with an embodiment of the present patent application, wherein some portions of the lawn mower are not shown for sake of clarity and to better illustrate other portions of the lawn mower.

In one embodiment, the pivot latch 224 and the pivot bar 226 are configured to allow the primary battery 48 to remain in a position without the operator's assistance. In one embodiment, the operator then grasps the loading handle 246 and lifts the primary battery 48 into the battery compartment 38 in the tractor 10. In one embodiment, when the operator grasps the loading handle 246 and lifts the bottom portion of the primary battery 48, the engagement between the pivot latch 224 and the pivot bar 226 serves as a pivot point/axis about which the primary battery 48 pivots as it moves into the battery compartment 38 in the tractor 10. In this way, the coupling 204 bears a substantial portion of the weight of the primary battery 48 while it is pivoted into position. In one embodiment, as shown in FIG. 34A, the center of mass of the battery 48 is shown as COM and the operator's Force Application is shown as OFA. In one embodiment, a mechanical advantage is achieved for moving the heavy battery into the storage position and for lightening the load to move the battery into the storage position.

In one embodiment, the primary battery pack 48 slides into the tractor 10 on one or more rails (e.g., course guides 234, precision guides 230, fine guides 228 and rollers 232) in the battery compartment 38 that guide the primary battery 48 into position enabling mating between the male and female terminal blocks 210 and 212. In one embodiment, the course guides 234, precision guides 230, fine guides 228 and rollers 232 in the battery compartment 38 are configured to engage with the guide rail interface 236 disposed on the primary battery module 48 to facilitate the sliding movement of the battery module 48 into the battery compartment 38 of the lawn mower 10. In one embodiment, when the male and female terminal blocks 210 and 212 are mated, the power is able to flow from the primary battery 48 into the tractor 10 supplying power for traction, cutting and other onboard electrical loads.

In one embodiment, as shown in FIG. 31, a latch 248 is configured to secure the battery 48 in place. In one embodiment, the latch 248 is depressed as the primary battery 48 is loaded into the battery compartment 38 of the lawn mower 10. In one embodiment, the latch 248 moves from a first position to a second position to lock the primary battery 48 in the battery compartment 38 of the lawn mower 10. In one embodiment, an operator input is required to disconnect the latch 248. In one embodiment, the latch 248 is located on the tractor 10 and interfaces with the primary battery latch interface on the primary battery 48.

In one embodiment, the primary battery 48 is configured to be loaded from any side of the tractor or ZTR. That is, although the illustrated embodiments show the primary battery 48 being loaded from the front, it is contemplated that in, other embodiments, the primary battery 48 is loaded from any side of the tractor or the ZTR tractor 10.

In one embodiment, the lawn mower 10 includes a second battery receptacle 206 that is configured to receive the second battery 208. In one embodiment, the second battery 208 is removably coupled to the frame 12 and is transported by the frame 12. In one embodiment, the auxiliary battery 208 is configured to be used when the charge of the primary battery 48 is completely depleted. In one embodiment, the auxiliary battery 208 is configured to provide enough power to drive the lawn tractor 10 (i.e., power the traction motor) back to a charging station/area (e.g., shed/garage, etc.) if the primary battery 48 dies/is depleted. In one embodiment, this auxiliary battery configuration improves the electrically powered riding lawn tractor 10 by limiting driving range concerns. In one embodiment, the second battery 208 is smaller than the primary battery 48.

In one embodiment, the second battery 208 is configured to be compatible with power tools/power hand tools. In one embodiment, the second battery 208 is configured to be compatible with existing power hand tools that user already owns.

In one embodiment, voltage of the second battery 208 is lower than voltage of the primary battery 48. In one embodiment, capacity of the second battery 208 is less than capacity of the primary battery 48.

In one embodiment, referring to FIGS. 30 and 31, the lawn mower 10 includes a male terminal block 222 that is configured to engage with a female terminal block 326 disposed on the secondary battery module 208. In one embodiment, the lawn mower 10 includes a female terminal block 222 that is configured to engage with a male terminal block 326 disposed on the secondary battery module 208.

In one embodiment, the second battery 208 is configured such that, if the second battery 208 is inserted in the lawn mower 10, the second battery 208 automatically turns on once the main battery 48 is depleted. In one embodiment, the second battery 208 is configured such that it requires an operator intervention. In one embodiment, when the primary battery 48 is depleted, the operator actuates a manual switch or provides a control system signal to turn on the second battery 208.

In one embodiment, when the lawn mower 10 is being operated by the auxiliary battery pack 208, a load shedding operation is employed to extend the range of the lawn mower 10 further. In one embodiment, the load shedding mode is turned on automatically or is actuated by the operator using a manual switch or a control system signal. In one embodiment, the load shedding operation includes disabling light, disabling the blades, etc. In one embodiment, the auxiliary battery pack 208 is configured to power only the wheels of the lawn mower 10 when the primary battery 48 is dead. In one embodiment, the auxiliary battery pack 208 may be a 20 volts battery. In one embodiment, the auxiliary battery pack 208 may be a 40 volts battery. In one embodiment, additionally, a mode is provided to operate all systems from the auxiliary battery 208 for a short period. In one embodiment, this mode is actuated by the operator using a manual switch 328 or a control system signal.

In one embodiment, referring to FIG. 36, the frame 12 comprises a container portion 166 and a cover 168. In one embodiment, the container portion 166 is disposed forwardly of the steering system 20 and the operator support 14. In one embodiment, the container portion 166 has side walls 170 defining an upwardly facing opening 172 into the storage space 36 in which articles 174 to be transported can be stored.

Figure 38:
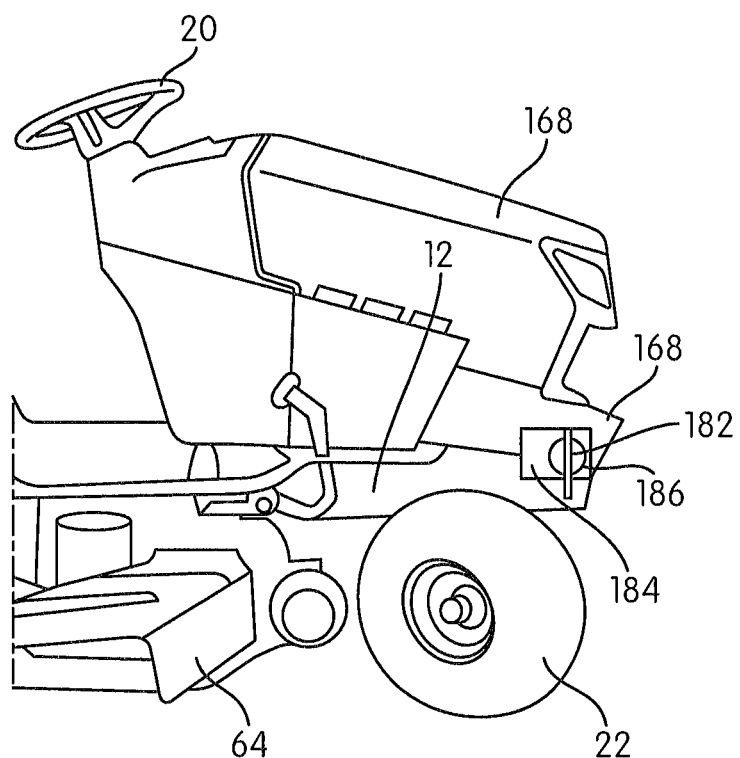
FIG. 38 shows a partial perspective view of the lawn mower and its moveable hood in accordance with an embodiment of the present patent application.

In one embodiment, the cover 168 is constructed and arranged to be movable between an open condition (as shown in FIG. 36) permitting access to the storage space 36 and a closed condition (as shown in FIG. 38) preventing access to the storage space 36. In one embodiment, as will be explained in detail below, the cover 168 is hingedly or pivotably connected to the tractor 10 to facilitate its movement between its open condition and its closed condition. In one embodiment, the cover 168, in its closed condition, may completely cover the opening 172 so as to completely prevent access to the storage space 36. In one embodiment, as will be explained in detail below, the cover 168 is removable from the tractor 10.

In one embodiment, the container portion 166 is referred to as tool/equipment carrying system and the cover 168 is referred to as hood of the lawn tractor 10.

In one embodiment, as shown in FIG. 36, the articles 174 stored in the storage space 36 are tools (e.g., hand or electric). In one embodiment, the electric tools are powered by the lawn mower 10. In one embodiment, the articles 174 are lawn and garden tools (e.g., hand or electric). In one embodiment, the electric lawn and garden tools are powered by the lawn mower 10. In one embodiment, the storage space 36 may also be used to transport fertilizer, mulch, soil, and any other articles as would be appreciated by one skilled in the art.

Figure 39:
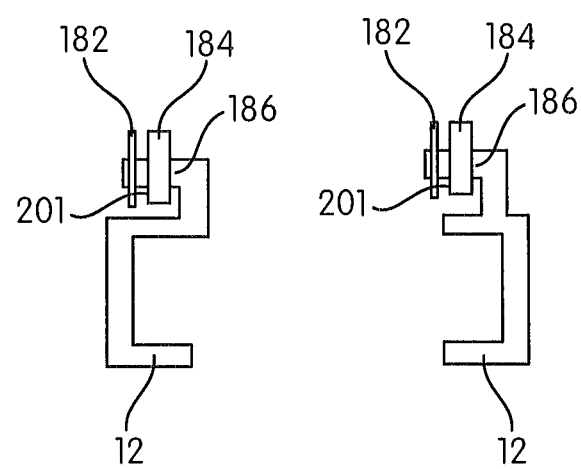
FIG. 39 shows a mounting arrangement for the moveable hood in accordance with an embodiment of the present patent application.

In one embodiment, referring to FIGS. 38 and 39, the tractor frame 12 has pins 186 attached thereto. In one embodiment, the hood 168 is held on the pins 186 via a mounting bracket 184. In one embodiment, the movement of the pins 186 is limited by one or more cotter pins 182. In one embodiment, the cotter pins 182 are disposed in the pins 186. In one embodiment, the cotter pins 182 are configured to engage the side 201 of the mounting bracket 184, when the pins 186 are engaged with the mounting bracket 184, to limit the movement of the pins 186. In one embodiment, the cotter pins 182 are also configured to hold the pins 186 and the mounting bracket 184 together. In one embodiment, instead of the cotter pins, any other fasteners, as would be appreciated by one skilled in the art, are used to hold the pins 186 and the mounting bracket 184 together. In one embodiment, other hinge/attachment/connection assemblies, as would be appreciated by one skilled in the art, with different configurations are used to connect the hood 168 to the tractor 10 as long as the hinge/attachment/connection assembly provides pivotal movement of the hood 168 with respect to the tractor 10 and/or enables removal of the hood 168 from the tractor 10.

Figure 37:
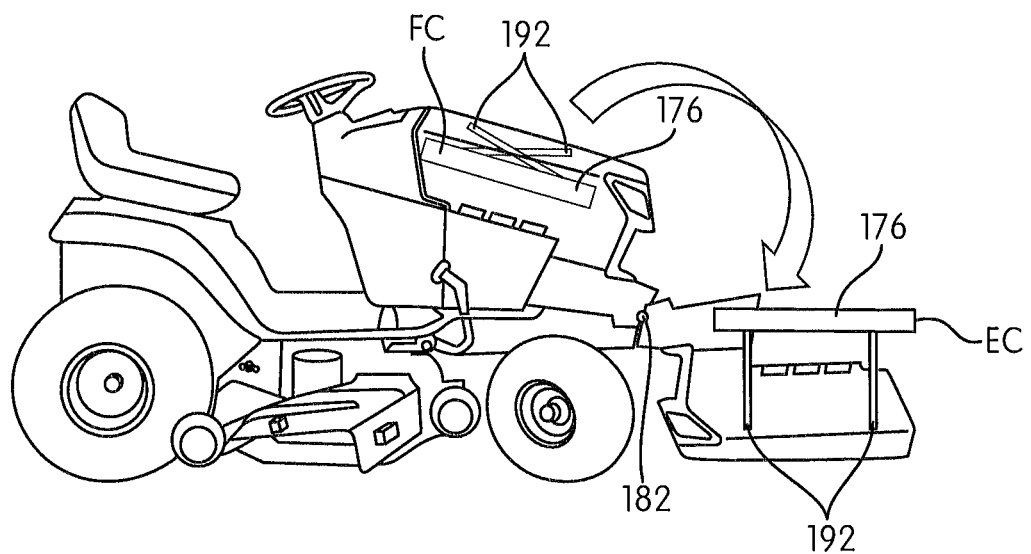
FIG. 37 shows a perspective view of the lawn mower and a work space/surface stored therein in accordance with an embodiment of the present patent application.
Figure 40:
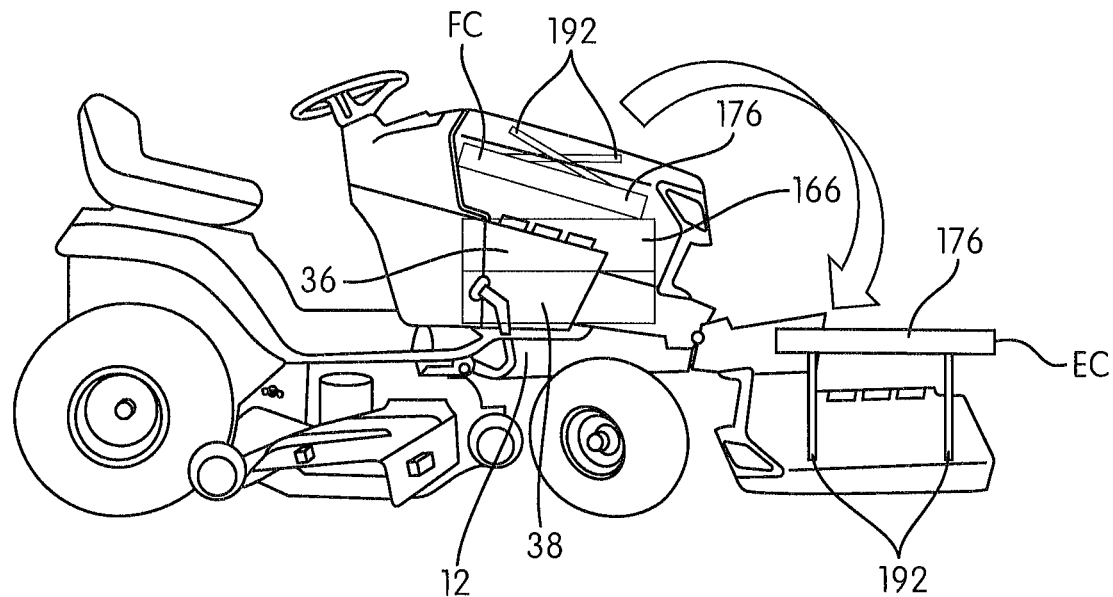
FIG. 40 shows another perspective view of the lawn mower and the work space/surface stored therein in accordance with an embodiment of the present patent application.

In one embodiment, as shown in FIGS. 37 and 40, the tractor hood 168 is configured to pivot about the axis of the pins 186 to reveal the tool/equipment carry bay 166 and to permit access to the opening 172 of the tool/equipment carry bay 166.

In one embodiment, the tractor hood 168 is configured to be removable from the tractor 10 to reveal the tool/equipment carry bay 166. In one embodiment, as shown in FIG. 36, when the tractor hood 168 is removed, the hood 68 can be easily converted into a workspace 178 to support articles 188 thereon. In one embodiment, to remove the hood 168, one or more cotter pins 182 are removed first. This allows the hood 168 to simply slide off the pins 186. The hood 168 can, thus, be removed from the tractor 10.

In one embodiment, when the tractor hood 168 pivots out about the axis of the pins 186, a workspace 176 can be expanded for use. In one embodiment, as shown in FIGS. 37 and 40, the workspace 176 has an extended/use configuration EC and a folded/storage/collapsed configuration FC. In one embodiment, when in the extended configuration EC, the workspace 176 is configured to support articles thereon.

Figure 41:
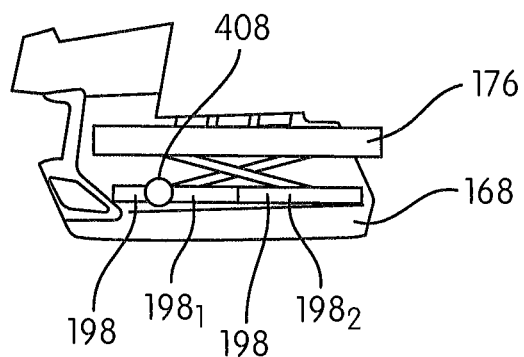
FIGS. 41-44 show various configurations of the work space/surface stored in the lawn mower in accordance with an embodiment of the present patent application.
Figure 42:
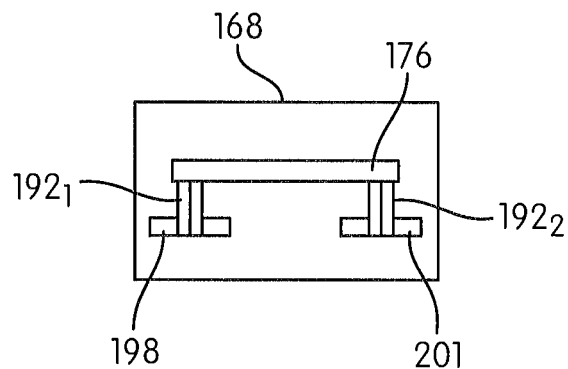
Figure 43:
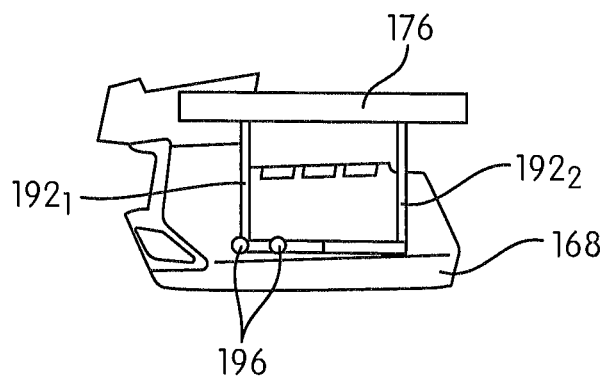
Figure 44:
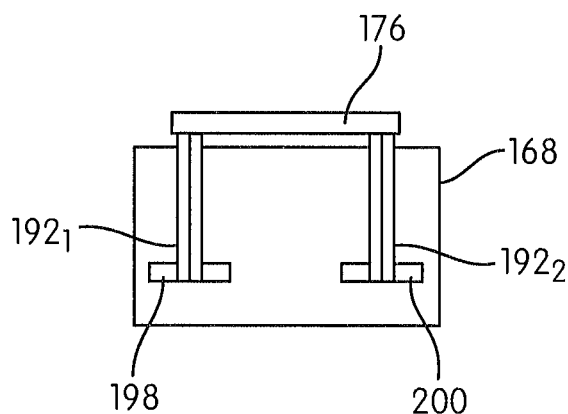

FIG. 41 shows a side view of the workspace 176 when it is in its folded configuration FC, while FIG. 43 shows a side view of the workspace 176 when it is in its extended configuration EC. FIG. 42 shows a front view of the workspace 176 when it is in its folded configuration FC, while FIG. 44 shows a front view of the workspace 176 when it is in its extended configuration EC.

In one embodiment, the workspace 176 includes four legs 192 ($192_1$, $192_2$, . . . ), four slide tracks 198 ($198_1$, $198_2$, . . . ) and two detent locks 196. In one embodiment, the workspace 176 also includes a lock 408. In one embodiment, the lock 408 is configured to lock the workspace 176 in its folded configuration FC. In one embodiment, the number of legs for the workspace 176 may vary.

In one embodiment, a portion of the each leg 192 is disposed in a corresponding slide rail/guide/track 198 to facilitate the movement of the leg 192 in the corresponding slide rail/guide/track 198. In one embodiment, each leg 192 includes members that enable the movement of the leg in the corresponding slide rail/guide/track 198.

In one embodiment, the slide rails/guides/tracks 198 are attached to the hood 168. In one embodiment, the slide rails/guides/tracks 198 are configured to guide their corresponding legs 192 therein during the movement of the corresponding leg. In one embodiment, this configuration of the legs 192 and the slide tracks/guides 198 facilitates the movement of the workspace 176 between the extended configuration EC and the folded configuration FC. In one embodiment, the legs 192 and the slide rails/guides/tracks 198 are of such dimensions as to permit the movement of the workspace 176 between the extended configuration EC and the folded configuration FC. In one embodiment, a spring arrangement is provided in each slide rail/guide/track and is operatively coupled with the corresponding leg. In one embodiment, the spring arrangement is configured to assist with the movement of the legs as the workspace 176 is being moved between the extended configuration EC and the folded configuration FC.

In one embodiment, the workspace 176 extends when the operator pulls up on the surface allowing the legs 192 to fold out. In one embodiment, the legs 192 are offset from each other allowing them to move relative to each other. In one embodiment, the workspace 176 is pulled up (i.e., to the extended configuration EC) until the detent lock 196 engages at the end of the slide track 198.

In one embodiment, the workspace 176 is fully collapsible into its folded configuration FC and is stored under the hood 168 as shown in FIG. 40. Also shown in FIG. 40, along with the workspace 176 in its folded configuration FC, are 1) the container portion 166 with the storage space 36 in which the articles to be transported can be stored and 2) battery receiving portion 38 configured to receive the primary battery 48 therein.

In one embodiment, the workspace 176 has variable height adjustment to accommodate operators of varying height. In one embodiment, the workspace 176 can be set to different working heights to enable the operator to use the workspace 176 while either standing or sitting. In one embodiment, means are provided on the legs or other portions of the workspace 176 to allow for multiple height adjustments. In one embodiment, the legs 192 are telescopically extendable. In one embodiment, the workspace 176 includes a lock mechanism that is configured to lock the workspace 176 at any desired height. That is, additional locks can be added to the workspace 176 to provide a variety of heights to the operator. Any adjustment mechanism known to one skilled in the art is used to provide the variable height adjustment to the workspace 176. In one embodiment, the workspace 176 has the extended configuration EC, the folded configuration CC, and a plurality of intermediate, variable height adjustment configurations. In one embodiment, the variable height adjustment of the workspace 176 is optional and the workspace 176 has only the extended configuration EC and the folded configuration FC.

As described in the present patent application, with the advent of battery operated electric lawn tractors, there is the possibility of new electrically operated features for the lawn mower 10. This is due to the availability of communication buses on the lawn mower 10 that are necessary to operate the electric motors and a robust electrical system that provides power to these electric motors. In one embodiment, a subset of these electrically operated features/systems includes semi-autonomous power steering system 200 (as shown and described with respect to FIGS. 14-18), stability control system for ZTR or non-ZTR lawn mowers (as shown and described with respect to FIGS. 26-28), automatic mowing blades control system 400 (as shown and described with respect to FIGS. 8-13A), automatic mower safety control system 300 (as shown and described with respect to FIGS. 19-21), and automatic ground speed control system 100 (as shown and described with respect to FIGS. 3-7). By incorporating elements of autonomous control system, the mowing operation can be enhanced to allow for faster, more precise operation of the lawn mower 10.

In one embodiment, any information from/to the lawn mower can be communicated wirelessly with systems and devices surrounding the lawn mower by WiFi, Bluetooth, NFC, by radio frequency, or through cell tower transmissions, just for example.

In one embodiment, the terms "one or more processors" as used herein are one or more physical processors of a computer system. In one embodiment, the one or more physical processors 32 are programmed with computer program instructions which, when executed cause the computer system to perform various functions or operational procedures as described in detail above.

It should be appreciated that the description of the functionality provided by the different modules/processors/controllers described herein is for illustrative purposes, and is not intended to be limiting, as any of modules/processors/controllers may provide more or less functionality than is described. For example, one or more of modules/processors/controllers may be eliminated, and some or all of its functionality may be provided by other ones of modules/processors/controllers. As another example, additional subsystems may be programmed to perform some or all of the functionality attributed herein to one of the modules/processors/controllers.

In one embodiment, the various systems and subsystems illustrated here may comprise one or more computing devices that are programmed to perform the functions described herein. In one embodiment, the computing devices include one or more electronic storages (e.g., database, or other electronic storages), one or more physical processors 32 programmed with one or more computer program instructions, and/or other components. In one embodiment, the computing devices include communication lines or ports to enable the exchange of information with a network (e.g., network) or other computing platforms via wired or wireless techniques (e.g., Ethernet, fiber optics, coaxial cable, WiFi, Bluetooth, near field communication, or other communication technologies). In one embodiment, the computing devices include a plurality of hardware, software, and/or firmware components operating together to provide the functionality attributed herein to the servers. For example, in one embodiment, the computing devices are implemented by a cloud of computing platforms operating together as the computing devices.

The electronic storages may comprise non-transitory storage media that electronically stores information. In one embodiment, the electronic storage media of the electronic storages includes one or both of system storage that is provided integrally (e.g., substantially non-removable) with the servers or removable storage that is removably connectable to the servers via, for example, a port (e.g., a USB port, a firewire port, etc.) or a drive (e.g., a disk drive, etc.). In one embodiment, the electronic storages include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. In one embodiment, the electronic storages include one or more virtual storage resources (e.g., cloud storage, a virtual private network, and/or other virtual storage resources). The electronic storages may store software algorithms, information determined by the processors, information received from the servers, information received from client computing platforms, or other information that enables the servers to function as described herein.

In one embodiment, the one or more processors 32 are programmed to provide information processing capabilities. As such, in one embodiment, the processors 32 include one or more of a digital processor, an analog processor, or a digital circuit designed to process information, an analog circuit designed to process information, a state machine, and/or other mechanisms for electronically processing information. In one embodiment, the processors 32 include a plurality of processing units. In one embodiment, these processing units are physically located within the same device, or the processors 32 may represent processing functionality of a plurality of devices operating in coordination. In one embodiment, the one or more processors 32 are programmed to execute computer program instructions to perform functions described herein. In one embodiment, the one or more processors 32 are programmed to execute computer program instructions by software; hardware; firmware; some combination of software, hardware, or firmware; and/or other mechanisms for configuring processing capabilities on the processors 32. It should be appreciated that the description of the functionality provided by the systems described herein is for illustrative purposes, and is not intended to be limiting, as systems may provide more or less functionality than is described. As another example, in one embodiment, additional systems are programmed to perform some or all of the functionality attributed herein to systems.

In one embodiment, the user interface 40 that is described in various embodiments of the present patent application include touch screen capabilities where the operator can provide input or control an information processing system (one or more processors 32) of the system through touch gestures by touching the user interface 40. In one embodiment, the user interface 40 is configured to switch to a power-saving mode if no input (e.g., video) signal is received. In one embodiment, the user interface 40 is a liquid crystal display (LCD), a plasma display, an organic light emitting diode display (OLED), a light emitting diode display (LED), a field emission display (FED), etc. In one embodiment, the size of the user interface 40 may vary. In one embodiment, the user interface is a flat panel display. In one embodiment, the thickness of the user interface 40 may vary. In one embodiment, the resolution of the user interface 40 may vary. In one embodiment, the visual information, data or content presented on the user interface 40 includes any graphical, text, audio, video, data, multimedia or other digital or electronic content. In one embodiment, the user interface 40 includes one or more ports that serve as an interface between the user interface 40 and other additional or peripheral devices. In one embodiment, the user interface 40 includes a Universal Serial Bus (USB) port, a High-Definition Multimedia Interface (HDMI) port, a Video Graphics Array (VGA) port, a video cable connection port, an RF (coaxial cable) connection port, etc. In one embodiment, these connection ports are used facilitate communication between the other additional or peripheral devices and the user interface 40. In one embodiment, the user interface 40 is in communication with other additional or peripheral devices using wired or wireless signal systems (e.g., Near Field Communication (NFC), Local Area Network (LAN), Wireless Local Area Network (WLAN), Bluetooth, RF, Wi-Fi etc.).

In one embodiment, the dimensions described in the present patent application, are up to 5 percent greater than or up to 5 percent less than those described above. In one embodiment, the dimensions described in the present patent application, are up to 10 percent greater than or up to 10 percent less than those described above. In one embodiment, the dimensions described in the present patent application, are up to 20 percent greater than or up to 20 percent less than those described above. In one embodiment, all the dimensions shown in the present patent application are in inches, in degrees or in feet.

Although the present patent application has been described in detail for the purpose of illustration, it is to be understood that such detail is solely for that purpose and that the present patent application is not limited to the disclosed embodiments, but, on the contrary, is intended to cover modifications and equivalent arrangements that are within the spirit and scope of the appended claims. In addition, it is to be understood that the present patent application contemplates that, to the extent possible, one or more features of any embodiment can be combined with one or more features of any other embodiment.

What is claimed is:

1. A lawn mower comprising:
    a frame supported on rotatable wheels for movement over a ground surface;
    an operator support coupled to the frame and configured to support the entire weight of an operator of the lawn mower during use thereof;
    a blade assembly comprising at least one blade that is configured to cut grass on the ground surface;
    a steering system configured to manipulate the steering direction of the wheels;
    a motor assembly configured to drive the wheels so as to move the frame along the ground surface;
    a first rechargeable battery module removably coupled to the frame and configured to power the motor assembly; and
    a second rechargeable battery module removably coupled to the frame, the second rechargeable battery module configured to be interchangeable for use with at least a non-lawn mower power tool,
    wherein, when the charge of the first rechargeable battery module is depleted, the second rechargeable battery module is configured to provide power to drive the wheels of the lawn mower.

2. The lawn mower of claim 1, wherein the first rechargeable battery module has wheels mounted towards the bottom of the first rechargeable battery module to provide rolling support for the first rechargeable battery module;
    wherein the first rechargeable battery module comprises a manually engageable transport handle; and
    wherein the handle and the wheels are constructed and arranged to enable the operator to manually pull the handle, thereby enabling the operator to roll the first rechargeable battery module to a desired location by pushing or pulling the handle in a desired direction.

3. The lawn mower of claim 1, further comprising a coupling configured to engage the first rechargeable battery module with the frame without lifting the first rechargeable battery module off the ground,
    wherein the coupling facilitates manipulation of the first rechargeable battery module into a final connected position on the frame, including lifting of the first rechargeable battery module through the coupling.

4. The lawn mower of claim 1, wherein the motor assembly is configured to drive the at least one blade relative to the ground surface to cut grass.

5. The lawn mower of claim 1, wherein the first rechargeable battery module further comprises:
    one or more AC power outlets for powering equipment;
    a battery charge port configured to transfer a charge current from an external power source to the lawn mower, wherein the first rechargeable battery module is charged using a charging mechanism that is selected from the group consisting of conductive charging, inductive charging and wireless charging; and
    a state of the charge indicator that is configured to display a state-of-charge of the first rechargeable battery module.

6. The lawn mower of claim 1, wherein the frame comprises a battery compartment, wherein the battery compartment includes guides and rollers that are configured to engage with a guide rail interface disposed on the first rechargeable battery module to facilitate sliding movement of the first rechargeable battery module into the battery compartment of the lawn mower and into a final connected position on the frame; and
    wherein, when the first rechargeable battery module is in the final connected position on the frame, a male terminal block disposed on one of the frame and the first rechargeable battery module is engaged with a female terminal block on the other of the frame and the first rechargeable battery module so as to enable the first rechargeable battery module to power the motor assembly.

7. The lawn mower of claim 3, wherein the coupling includes a pivot bar disposed on the frame of the lawn mower and a pivot latch disposed on the first rechargeable battery module, wherein an engagement between the pivot latch and the pivot bar serves as a pivot point about which the first rechargeable battery module pivots as the first rechargeable battery module moves into the final connected position on the frame, and
    wherein the coupling is configured to bear a substantial portion of the weight of the first rechargeable battery module while the first rechargeable battery module is pivoted into the final connected position on the frame.

8. The lawn mower of claim 6, wherein, when the male and female terminal blocks are engaged with each other, the power is able to flow from the first rechargeable battery module into the lawn mower supplying power for driving the wheels of the lawn mower.

9. The lawn mower of claim 8, wherein, when the male and female terminal blocks are engaged with each other, the power is able to flow from the first rechargeable battery module into the lawn mower supplying power for driving the at least one blade to cut grass on the ground surface.

10. The lawn mower of claim 1, wherein the first rechargeable battery module is configured to be loaded from a lateral side of the lawn mower;
    wherein the first rechargeable battery module further comprising a latch configured to secure the first rechargeable battery module in a final connected position on the frame, and
    wherein the latch is configured to be actuated as the first rechargeable battery module is loaded into the final connected position on the frame.

11. The lawn mower of claim 1, wherein the second rechargeable battery module is transported by the frame,
    further comprising a second rechargeable battery module receptacle that is configured to receive the second rechargeable battery module.

12. The lawn mower of claim 11, wherein the second rechargeable battery module is configured such that, if the second rechargeable battery module is inserted in the lawn mower, the second rechargeable battery module is configured to automatically turn on once the first rechargeable battery module is depleted.

13. The lawn mower of claim 11, wherein the second rechargeable battery module is configured such that it requires an operator intervention, and
    wherein, when the first rechargeable battery module is depleted, the operator actuates a manual switch or provides a control system signal to turn on the second rechargeable battery module.

14. A lawn mower comprising:
    a frame supported on rotatable wheels for movement over a ground surface;
    an operator support coupled to the frame and configured to support the entire weight of an operator of the lawn mower during use thereof;
    a blade assembly comprising at least one blade that is configured to cut grass on the ground surface;
    a steering system configured to manipulate the steering direction of the wheels;
    a motor assembly configured to drive the wheels so as to move the frame along the ground surface;
    a first rechargeable battery module removably coupled to the frame and configured to power the motor assembly;
    a second rechargeable battery module removably coupled to and transported by the frame, wherein the second rechargeable battery module is configured to be used when the charge of the first rechargeable battery module is depleted; and
    a second rechargeable battery module receptacle that is configured to receive the second rechargeable battery module,
    wherein, when the lawn mower is being operated by the second rechargeable battery module, a load shedding operation is employed to extend the range of the lawn mower further,
    wherein the load shedding mode includes disabling lights of the lawn mower, and/or disabling the blades of the lawn mower, and
    wherein the load shedding mode is either turned on automatically or actuated by the operator using a manual switch or a control system signal.

15. The lawn mower of claim 11, further comprising a mode to operate all systems of the lawn mower using the second rechargeable battery module for a short period, and
    wherein the mode is actuated by the operator using a manual switch or a control system signal.

16. A lawn mower comprising:
    a frame supported on rotatable wheels for movement over a ground surface;
    an operator support coupled to the frame and configured to support the entire weight of an operator of the lawn mower during use thereof;
    a blade assembly comprising at least one blade that is configured to cut grass on the ground surface;
    a steering system configured to manipulate the steering direction of the wheels;
    a motor assembly configured to drive the wheels so as to move the frame along the ground surface;
    a first rechargeable battery module removably coupled to the frame and configured to power the motor assembly;
    a second rechargeable battery module removably coupled to and transported by the frame,
    wherein the second rechargeable battery module is configured to be used when the charge of the first rechargeable battery module is depleted; and
    a second rechargeable battery module receptacle that is configured to receive the second rechargeable battery module,
    wherein the second rechargeable battery module is configured to be compatible with other power tools.

17. The lawn mower of claim 11, wherein the voltage of the second rechargeable battery module is lower than the voltage of the first rechargeable battery module.

18. The lawn mower of claim 11, wherein the capacity of the second rechargeable battery module is less than the capacity of the first rechargeable battery module.

19. A method of operating a lawn mower, the lawn mower comprising a frame supported on rotatable wheels for movement over a ground surface;
    an operator support coupled to the frame and configured to support the entire weight of an operator of the lawn mower during use thereof; a blade assembly comprising at least one blade that is configured to cut grass on the ground surface; a steering system configured to manipulate the steering direction of the wheels; a motor assembly configured to drive the wheels so as to move the frame along the ground surface; and a first rechargeable battery module and a second rechargeable battery module both removably coupled to the frame and configured to power the motor assembly, the second rechargeable battery module configured to be interchangeable for use with at least a non-lawn mower power tool, the method comprising:
        providing power solely from the first rechargeable battery module to the motor assembly to drive the wheels of the lawn mower;
        removing the second rechargeable battery module from the non-lawn mower power tool and coupling the second rechargeable battery module to the frame of the lawn mower; and
        providing power solely from the second rechargeable battery module to the motor assembly when the charge of the first rechargeable battery module is depleted so as to drive the wheels of the lawn mower.

* * * * *